United States Patent
Adachi et al.

(10) Patent No.: US 7,713,449 B2
(45) Date of Patent: May 11, 2010

(54) POLYMER ELECTROLYTIC MATERIAL, POLYMER ELECTROLYTIC PART, MEMBRANE ELECTRODE ASSEMBLY, AND POLYMER ELECTROLYTE FUEL CELL

(75) Inventors: Shinya Adachi, Ritto (JP); Daisuke Izuhara, Otsu (JP); Masataka Nakamura, Otsu (JP); Nobuaki Ito, Otsu (JP)

(73) Assignee: Toray Industries, Inc., Chuo-ku, Tokyo (JP)

( * ) Notice: Subject to any disclaimer, the term of this patent is extended or adjusted under 35 U.S.C. 154(b) by 1215 days.

(21) Appl. No.: 10/548,110

(22) PCT Filed: Mar. 5, 2004

(86) PCT No.: PCT/JP2004/002894

§ 371 (c)(1),
(2), (4) Date: Sep. 6, 2005

(87) PCT Pub. No.: WO2004/079844

PCT Pub. Date: Sep. 16, 2004

(65) Prior Publication Data

US 2006/0180796 A1 Aug. 17, 2006

(30) Foreign Application Priority Data

| Mar. 6, 2003 | (JP) | ............................ 2003-059569 |
| Apr. 22, 2003 | (JP) | ............................ 2003-116685 |
| Apr. 24, 2003 | (JP) | ............................ 2003-120115 |

(51) Int. Cl.
- H01B 1/12 (2006.01)
- H01M 8/02 (2006.01)
- C08G 79/04 (2006.01)
- C08G 75/02 (2006.01)
- C08G 75/20 (2006.01)
- C08J 9/28 (2006.01)

(52) U.S. Cl. ............ 252/511; 252/500; 252/182.1; 429/30; 429/33; 429/40; 429/46; 429/188; 429/314; 204/296; 205/637; 528/337; 528/373; 528/171

(58) Field of Classification Search ............ 429/30, 429/33, 41, 188, 311, 314, 317, 303, 42, 429/500, 511; 252/182.1; 204/296; 205/637

See application file for complete search history.

(56) References Cited

U.S. PATENT DOCUMENTS

| 5,013,765 | A | 5/1991 | Sluma et al. |
| 5,403,675 | A | 4/1995 | Ogata et al. |
| 5,741,408 | A * | 4/1998 | Helmer-Metzmann et al. ............... 204/252 |
| 6,103,414 | A | 8/2000 | Cabasso et al. |
| 6,365,294 | B1 * | 4/2002 | Pintauro et al. ............... 429/33 |
| 6,444,343 | B1 * | 9/2002 | Prakash et al. ............... 429/33 |
| 6,447,943 | B1 * | 9/2002 | Peled et al. ............... 429/33 |
| 6,773,844 | B2 | 8/2004 | Nakano et al. |
| 6,794,480 | B2 | 9/2004 | Goto et al. |
| 6,828,353 | B1 * | 12/2004 | Charnock et al. ............... 521/27 |
| 2002/0045085 | A1 * | 4/2002 | Formato et al. ............... 429/33 |
| 2002/0091225 | A1 | 7/2002 | McGrath et al. |
| 2008/0075999 | A1 | 3/2008 | Izuchara et al. |

FOREIGN PATENT DOCUMENTS

| JP | 53-26777 | 3/1978 |
| JP | 56-34329 | 8/1981 |
| JP | 64-22932 | 1/1989 |
| JP | 5-271460 | 10/1993 |
| JP | 8-180891 | 7/1996 |
| JP | 10-340732 | 12/1998 |
| JP | 2-208322 | 3/2000 |
| JP | 2001-504636 | 4/2001 |
| JP | 2001-192531 | 7/2001 |
| JP | 2001-294705 | 10/2001 |
| JP | 2001-294706 | 10/2001 |
| JP | 2002-110200 | 4/2002 |
| JP | 2002-226575 | 8/2002 |
| JP | 2002-524631 | 8/2002 |
| JP | 2002-260687 | 9/2002 |
| JP | 2002-293889 | 10/2002 |
| JP | 2002-324559 | 11/2002 |
| JP | 2003-12835 | 1/2003 |

(Continued)

OTHER PUBLICATIONS

Walker et al., "Proton-Conducting Polymers with Reduced Methanol Formation," J. Apl. Polymer Sci., 1999, V(74), pp. 67-73.*

(Continued)

Primary Examiner—Stanley Silverman
Assistant Examiner—Kallambella Vijayakumar
(74) Attorney, Agent, or Firm—Morrison & Foerster LLP

(57) ABSTRACT

A polymer electrolytic material has excellent proton conductivity and excellent fuel shutting property, and accordingly provide a polymer electrolytic fuel cell with a high efficiency. This polymer electrolytic material has an unfreezable water ratio Rw1 defined by the following expression (S1) in a range of 20 to 100% by weight in hydrated state:

$$Rw1 = [Wnf/(Wfc+Wnf)] \times 100 \qquad (S1)$$

in which Wnf represents the unfreezable water content per 1 g of the polymer electrolytic material in dry state and Wfc represents the low freezing point water content per 1 g of the polymer electrolytic material in dry state.

39 Claims, No Drawings

FOREIGN PATENT DOCUMENTS

| JP | 2003-217342 | | 7/2003 |
| --- | --- | --- | --- |
| JP | 2003-217343 | | 7/2003 |
| JP | 2003-217365 | | 7/2003 |
| JP | 2005-019055 | | 1/2005 |
| JP | 2005-174897 | | 6/2005 |
| WO | WO-98/22989 | | 5/1998 |
| WO | WO 00/15691 | * | 3/2000 |
| WO | WO-01/19896 | | 3/2001 |
| WO | WO-2004-036679 | | 4/2004 |

OTHER PUBLICATIONS

Bailly, Christian et al.(1987). "The Sodium Salts of Sulphonated Poly(Aryl-Ether-Ether-Ketone) (PEEK): Preparation and Characterization," *Polymer* vol. 28:1009-1016.

Nolte, R. et al. (1993). "Partially Sulfonated Poly(Arylene Ether Sulfone)- A Versatile Proton Conducting Membrane Material for Modern Energy Conversion Technologies," *Journal of Membrane Science* vol. 83:211-220.

Tang, Hao et al.(1999). "Polyphosphazene Membranes. III. Solid-State Characterization and Properties of Sulfonated Poly[bis(3-methylphenoxy) phosphazene]," *Journal of Applied Polymer Science* vol. 71:387-399.

Wang, Feng et al. (2002). "Direct Polymerization of Sulfonated Poly(Arylene Ether Sulfone) Random(statistical) Copolymers: Candidates for New Proton Exchange Membranes," *Journal of Membrane Science* vol. 197:231-242.

Young, S.K et al.(2002). "Nafion®/ORMOSIL1 Nanocomposites via polymer-in situ sol-gel reactions. 1. Probe of ORMOSIL Phase Nanostructures By $^{29}$Si Solid-state NMR Spectroscopy," *Polymers* vol. 43 2311-2320.

Wang, Huanting et al. (2002). "Nafion-bifunctional Silica Composite Proton Conductive Membranes," *Journal of Material Chemistry* vol. 12: 834-837.

Ishikiryama, Kazuhiko et al.(1995). "Pore Size Distribution (PSD) Measurements of Silica Gels by Means of Differential Scanning Calorimetry," *Journal of Colloid and Interface Science* vol. 171:91-102.

Smith, C.D. et al. (1991). "Unique Characteristics Derived From Poly( Arylene Ether Phosphine Oxide)s," High Performance Polymers vol. 3(4):211-229.

Yanagimachi, Satomi et al. (2002). "Synthesis of Phosphonated poly(4-phenoxybenzoyl-1,4-phenylene)," *Polymer Preprints*, Japan vol. 51(4):750.

Wang, F et al.(2000). "Synthesis of Sulfonated Poly (Arylene Ether Sulfone)S Via Direct Polymerization," *Polymer Preprints* vol. 41(1):237-238.

Lee, W. et al. (1996). "Proton Transport Through Polyethylene-Tetrafluoroethylene-Copolymer-Based Membrane Containing Sulfonic Acid Group Prepared by RIGP." *J. Electochem Soc.*, 143 (9): 2795-2799.

Greenley, R. (1999). "Q and e Values for Free Radical Copolymerizations of Vinyl Monomers and Telogens." Chapter II in *Polymer Handbook*. John Wiley & Sons, Inc. pp. 309-319.

Takenaka, H. et al. (1985). "Studies on Solid Polymer Electrolyte Water Electrolysis II, Preparation Methods for Membrane-Electrocatalyst Composite." *Denki Kagaku* 53(4): 261.

Ticianelli, E. A. et al. "Method to Advance Technology of Proton Exchange Membrane Fuel Cells." *Mass Transfer* 135(9): 2209-2214.

Hatakana, T. (2002). "Direct Methanol Fuel Cell." R & D Review of Toyota CRDL, 37(1):59-64 (English language translation of abstract).

International Search Report mailed on Jun. 29, 2004, directed to International Patent Application No. PCT/JP2004/002894; 8 pages.

International Preliminary Report on Patentability and Written Opinion mailed Feb. 13, 2006, directed to International Patent Application No. PCT/JP2004/002894; 14 pages.

International Search Report mailed on Dec. 6, 2005, directed to International Patent Application No. PCT/JP2005/015703; 4 pages.

International Preliminary Report on Patentability and Written Opinion mailed Mar. 20, 2007, directed to International Patent Application No. PCT/JP2005/015703; 7 pages.

* cited by examiner

POLYMER ELECTROLYTIC MATERIAL, POLYMER ELECTROLYTIC PART, MEMBRANE ELECTRODE ASSEMBLY, AND POLYMER ELECTROLYTE FUEL CELL

TECHNICAL FIELD

The invention relates to a polymer electrolytic material, a polymer electrolytic part, a membrane electrode assembly, and a polymer electrolytic fuel cell.

BACKGROUND ART

Fuel cells are electric power generation apparatuses with little emission of substances, a high energy efficiency, and a low load on the environments. Therefore, they have again been in the limelight along with the increased concerns for global environmental preservation in recent years. As electric power generation apparatuses for relatively small scale decentralized power generation facilities and transportable bodies such as automobiles and ships, the fuel cells are expected to be future power generation apparatuses. Further, it is expected that the fuel cells are to be disposed in compact type mobile apparatuses such as cellular phones and personal computers in place of the secondary batteries such as nickel-hydrogen batteries and lithium ion batteries.

With respect to polymer electrolyte fuel cells (hereinafter, sometimes referred to also as PEFC), direct type fuel cells in which fuel such as methanol is directly supplied (hereinafter, sometimes referred to also as DFC) are also spotlighted in addition to conventional cells using hydrogen gas as fuel. Although the DFC has a low output as compared with a conventional PEFC, the fuel is a liquid and no reformer is required, so that the energy density is increased and the power generation duration per single charge is long.

A polymer electrolytic fuel cell generally is composed as a cell unit by forming a membrane electrode assembly (MEA) composed of electrodes, an anode and a cathode, which cause reaction of generating electricity, and a polymer electrolytic member to be a proton conductor between the anode and the cathode and sandwiching the MEA with separators. In this case, each electrode is composed of an electrode substrate (also called as a gas diffusion electrode or an electric collector) for promoting gas diffusion and collecting electricity (or supplying electricity) and an electrode catalytic layer where electrochemical reaction is actually carried out. For example, in the case of an anode of PEFC, fuel such as hydrogen gas is reacted in the catalytic layer of the anode to generate proton and electron and the electron is transmitted to the electrode substrate and the proton is transmitted to the polymer electrolytic member. Therefore, the anode is required to have good gas diffusivity, electron conductivity, and proton conductivity. On the other hand, in a cathode, an oxidizing gas such as oxygen and air is reacted with the proton transmitted from the polymer electrolytic member and the electron transmitted from the electrode substrate to produce water in the catalytic layer of the cathode. Therefore, the cathode is required to efficiently discharge produced water in addition to the gas diffusivity, electron conductivity, and proton conductivity.

Particularly, with respect to electrolytic membranes for DFC using organic compounds such as methanol as fuel among solid polymer electrolyte fuel cells, in addition to the properties required for the electrolytic membranes for conventional PEFC using hydrogen as fuel, fuel permeation suppression is also required. The fuel permeation in the electrolytic membrane is called as fuel cross-over (FCO) or chemical short to cause a problem of decrease of fuel cell output and energy capacity.

Further, in a direct fuel cell, properties different from those of conventional PEFC using hydrogen gas as fuel are required. That is, with respect to the direct fuel cell, in the anode, fuel such as an aqueous methanol solution is reacted in the catalytic layer of the anode to generate proton, electron, and carbon dioxide and the electron is transmitted to the electrode substrate, the proton is transmitted to the polymer electrolyte, and the carbon dioxide passes the electrode substrate and is release to the outside of the system. Therefore, in addition to the required characteristics of the anode of a conventional PEFC, permeability of fuel such as an aqueous methanol solution and discharge property of carbon dioxide are also required. Further in the cathode of the direct fuel cell, in addition to the reactions similar to those in a conventional PEFC, reaction of fuel such as methanol passed through the electrolytic membrane and an oxidizing gas such as oxygen or air is caused in the catalytic layer of the cathode to produce water. Therefore, the water to be produced is more than that produced in a conventional PEFC and it is required to further efficiently discharge water.

Conventionally, perfluoro type proton conductive polymer membranes represented by Nafion (trade name, manufactured by Du Pont de Nemours & Co.) have been used as polymer electrolytic membranes. However, these perfluoro type proton conductive polymer membranes have high permeation quantities of fuel such as methanol in the direct type fuel cells and thus there are problems that the cell output and the energy capacity are insufficient. Further, the perfluoro type proton conductive polymers are every expensive in cost due to used of fluorine.

For that, non-fluoro type proton conductive polymer electrolytes are desired in markets and some developments of polymer electrolytic membranes base on non-fluoro type polymers have been tried.

For example, in 1950's, styrene type cation exchange resins have been investigated. However, they have been found insufficient in the strength as membranes in the state for use of general fuel cells and consequently, they have failed to give sufficient cell lives.

Fuel cells using sulfonated aromatic polyether ether ketones as electrolytes have been investigated. For example, it is disclosed (reference to Non-patent Document No. 1) that aromatic polyether ether ketones (hereinafter, sometimes abbreviated as PEEK) hardly soluble in organic solvents are made soluble in organic solvents and easy to form membranes by sulfonation to a far extent. However, these sulfonated PEEK are improved also in hydrophilicity and become water-soluble or deteriorated in the strength at the time of water absorption. The polymer electrolytic fuel cells generally produce water as a byproduct by the reaction of fuel and oxygen and in DFC, water is contained in the fuel in almost all cases and therefore, in the case particularly such sulfonated PEEK become water-soluble, they are not suitable to be used as electrolytes for fuel cells as they are.

[Non-patent Document No. 1]: Polymer, 1987, vol. 28, 1009.

Non-patent Document No. 2 describes sulfonated compounds of PSF (UDELP-1700) and PES which are aromatic polyether sulfones (reference to Non-patent Document No. 2). There is description that the sulfonated PSF completely become water soluble and cannot be evaluated as electrolytes. Meanwhile, although the sulfonated PES do not become water soluble, they have a problem of high water absorption and therefore, cannot be expected to be highly effective to suppress fuel cross-over.

[Non-patent Document No. 2]: Journal of Membrane Science, 83 (1993) 211-220.

Further, Non-patent Document No. 3 describes sulfonated compounds of polyphosphazenes as phosphorus polymer-based polymer proton conductors. However, the sulfonated polyphosphazenes are considerably hydrophilic in the main chains themselves and the water contents are too high to expect them to have a high fuel cross-over suppression effect.

[Non-patent Document No. 3]: Journal of Applied Polymer Science, 71 (1999) 387-399.

Further, a variety of other types of polymer electrolytic membranes produced by introducing anionic groups into non-fluoro aromatic polymers have been proposed (Patent Documents Nos. 1 and 2, Non-patent Document No. 1).

[Patent Document No. 1]: US Patent Application laid-open No. 2002/91225

[Patent Document No. 2]: U.S. Pat. No. 5,403,675

[Non-patent Document No. 4]: Journal of Membrane Science, Vol. 197, 231-242 (2002).

However, these conventional polymer electrolytic membranes become easy to take water in the inside if the introduction amounts of the ionic groups to obtain high conductivity and have a defective point that the cross-over of fuel such as methanol is significant. The polymer electrolytic membranes contain low freezing point water in a large quantity in the membranes and unfreezable water at a low ratio and therefore, it is supposed that fuel such as methanol is easy to pass through the low freezing point water and the fuel cross-over becomes significant.

Patent Document No. 3 discloses polymer electrolytic materials comprising sulfonated polyether type copolymers containing fluorene components. However, the document does not sufficiently description of groups effective for shutting the fuel or of membrane formation methods and according to follow up experiments by inventors, membrane formation is difficult by the method described and no polymer electrolytic membrane is formed.

Further, there are descriptions of polymer electrolytic materials of sulfonated polyether type copolymers containing both fluorene component and phenylene component in Examples 19 and 24 of Patent Document No. 4. However, the fluorene component is introduced only at 20% by mole and the production method and the membrane formation method are different from those of the invention, so that the swelling to the fuel is significant and the cross-over of fuel is considerable and thus the polymer electrolytic materials are not practical for use and the polymer electrolytic materials have a low unfreezable water ratio.

[Patent Document No. 3]: Japanese Patent Application Laid-Open No. 2002-226575

[Patent Document No. 4]: Japanese Patent Application Laid-Open No. 2002-524631.

Further, composite membranes of proton conductive polymers and other polymers are also proposed. For example, composite membranes comprising sulfonated polyphenylene oxide and polyvinylidene fluoride (Patent Document No. 5) have been known. Also, composite membranes comprising sulfonated polystyrene and polyvinylidene fluoride (Patent Document No. 6) have been known. However, the polymer electrolytic membranes described in these documents are membranes of blended polymers of ion conductive polymers and polyvinylidene fluoride and easy to cause significant phase separation structure in μm order owing to bad compatibility of the polymers and thus it has been difficult to satisfy both of high conductivity and fuel cross-over suppression simultaneously. In the polymer electrolytic membranes, low freezing point water and bulk water exist in inter-phases and the ratio of the unfreezable water in the electrolytic membranes is low, so that it is supposed to be difficult to suppress the fuel cross-over.

Further, membranes of composites of proton conductive polymers and copolymers of siloxanes having nitrogen atom-containing groups and metal oxides have been known (Patent Document No. 7). Also, composites of Nafion (trade name, manufactured by Du Pont de Nemours & Co.) and siloxanes have been known (Non-patent Documents Nos. 5 and 6). However, since the membranes described in these documents use Nafion, perfluoro type proton conductive polymers, even if the membranes are composite membranes with other polymers, it is difficult to satisfy both of high proton conductivity and low fuel cross-over simultaneously.

Further, ion exchange materials obtained by polymerizing compositions containing monomers having unsaturated bonds and monomers capable of introducing crosslinking structure after impregnation of porous substrates with the compositions and then sulfonating the produced polymerization products (reference to Patent Document No. 8). However, in the case of using the membranes for direct methanol type fuel cell (hereinafter, also referred to as DMFC), although it takes a long time to carry out sulfonation, the proton conductivity is insufficient and it is difficult to obtain proton conductivity high enough for practical use of the DMFC.

[Patent Document No. 5]: U.S. Pat. No. 6,103,414

[Patent Document No. 6]: Japanese Patent Application Laid-Open No. 2001-504636

[Patent Document No. 7]: Japanese Patent Application Laid-Open No. 2002-110200

[Patent Document No. 8]: Japanese Patent Application Laid-Open No. 2003-12835

[Non-patent Document No. 5]: Polymers, Vol. 43, 2311-2320 (2002)

[Non-patent Document No. 6]: Journal of Material Chemistry, Vol. 12, 834-837 (2002).

In these conventional techniques, there are problems that the electrolytes to be obtained are expensive: that waterproofness (anti-swelling) is insufficient and therefore, the strength is insufficient or fuel cross-over is significant: and that the oxidation resistance and radical resistance are inferior.

The invention aims to provide a polymer electrolytic material excellent in proton conductivity and also excellent in the fuel shutting property and accordingly to provide a polymer electrolytic fuel cell with a high efficiency.

DISCLOSURE OF THE INVENTION

Inventors of the invention have found that the high proton conductivity and fuel cross-over suppressing capability of polymer electrolytic material are considerably affected by the existence state and the content of water contained in polymer electrolytic material and have accomplished the invention.

That is, the invention has constitutions as follows.

(1) A polymer electrolytic material has an unfreezable water ratio $Rw1$ defined by the following expression (S1) in a range of 20 to 100% by weight in hydrated state:

$$Rw1 = [Wnf/(Wfc + Wnf)] \times 100 \qquad (S1)$$

wherein $Wnf$ represents the unfreezable water content per 1 g of the polymer electrolytic material in dry state and $Wfn$ represents the low freezing point water content per 1 g of the polymer electrolytic material in dry state.

(2) The polymer electrolytic material according to (1) having an unfreezable water ratio Rw2 defined by the following expression (S2) in a range of 50 to 100% by weight in hydrated state:

$$Rw2=[Wnf/(Wnf+Wfc+Wf)]\times 100 \qquad (S2)$$

wherein Wf represents the bulk water content per 1 g of the polymer electrolytic material in dry state.

(3) The polymer electrolytic material according to (1) or (2) having the Wnf in a range of 0.05 to 2 in hydrated state.

(4) The polymer electrolytic material according to one of (1) to (3) having a non-crosslinked structure and Rw1 60% by weight or higher.

(5) The polymer electrolytic material according to one of (1) to (4) being in a membrane-like form.

(6) The polymer electrolytic material according to (5) having methanol permeability per unit surface area for an aqueous solution of 30% by weight methanol 40 μmol·min$^{-1}$·cm$^{-2}$ or lower and proton conductivity per unit surface area 4 S·cm$^{-2}$ or higher.

(7) The polymer electrolytic material according to (5) having methanol permeability per unit surface area and per unit thickness for an aqueous solution of 30% by weight methanol 1000 nmol·min$^{-1}$·cm$^{-1}$ or lower and proton conductivity per unit surface area and per unit thickness 10 mS·cm$^{-1}$ or higher.

(8) The polymer electrolytic material according to one of (5) to (7) having total luminous transmittance 30% or higher in hydrated state.

(9) The polymer electrolytic material according to one of (1) to (8) comprising an ionic group.

(10) The polymer electrolytic material according to (9), wherein the ionic group is at least one type group selected from a sulfonic acid group, a sulfonimide group, a sulfuric acid group, a phosphonic acid group, a phosphoric acid group, and a carboxylic acid group.

(11) The polymer electrolytic material according to (10), wherein the ionic group is a sulfonic acid group.

(12) The polymer electrolytic material according to (11), wherein the density of the sulfonic acid group is 0.1 to 5.0 mmol/g.

(13) The polymer electrolytic material according to (12), wherein the density of the sulfonic acid group is 0.5 to 3.5 mmol/g.

(14) The polymer electrolytic material according to (13), wherein the density of the sulfonic acid group is 1.0 to 3.5 mmol/g.

(15) The polymer electrolytic material according to one of (9) to (14) containing an aromatic phosphorus type polymer comprising a group defined by the following general formula (I) in the main chain:

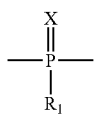
(I)

wherein $R_1$ represents an organic group: X represents oxygen, sulfur, or selenium; and two or more of substituent groups comprising different $R_1$ and/or X may be contained in the polymer electrolytic material.

(16) The polymer electrolytic material according to one of (9) to (15), wherein the aromatic phosphorus type polymer has a carbon-phosphorus-carbon bond in the main chain.

(17) The polymer electrolytic material according to one of (9) to (16), wherein the aromatic phosphorus type polymer is an aromatic polyether phosphine oxide.

(18) The polymer electrolytic material according to one of (9) to (16), wherein the aromatic phosphorus type polymer is an aromatic poly(ether phosphine oxide/ether ketone) copolymer.

(19) The polymer electrolytic material according to one of (9) to (18) having voids and a porosity 5 to 80% by volume and an average pore diameter of the voids smaller than 50 nm.

(20) The polymer electrolytic material according to one of (1) to (19) comprising a polymer having a crosslinked structure.

(21) The polymer electrolytic material according to (20), wherein the crosslinked structure is formed by radiation crosslinking.

(22) The polymer electrolytic material according to one of (1) to (21) containing a divalent group having an aromatic ring.

(23) The polymer electrolytic material according to (22) containing as the divalent group having an aromatic ring, a group defined by the following general formula (II):

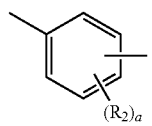
(II)

wherein $R_2$ represents a hydrogen atom, a halogen atom, a monovalent organic group, or an ionic group; a represents an integer of 0 to 4; and two or more groups having different $R_2$ and/or a may be contained in the polymer electrolytic material.

(24) The polymer electrolytic material according to (22) or (23) containing as the divalent group having an aromatic ring, a group defined by the following general formula (III):

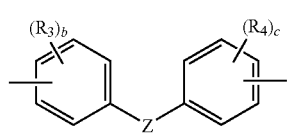
(III)

wherein $R_3$ and $R_4$ represent a hydrogen atom, a halogen atom, a monovalent organic group, or an ionic group; b and c represent an integer of 0 to 4; Z represents direct bond, —O—, —S—, —Se—, —CQ$_1$Q$_2$-, an alkylene, an arylene, an alkylidene group, or a cycloalkylidene group; $Q_1$ and $Q_2$ may be same or different and represent a hydrogen atom, a halogen atom, an alkyl, a halogen-substituted alkyl or aryl; either one of $Q_1$ and $Q_2$ is at least one group selected from a hydrogen atom, a halogen group, an alkyl, and a halogen-substituted alkyl; and two or more groups having different $R_3$, $R_4$ and/or b and c may be contained in the polymer electrolytic material.

(25) The polymer electrolytic material according to (24), wherein Z in the general formula (III) represents direct bond or —CQ$_1$Q$_2$- wherein $Q_1$ and $Q_2$ may be same or different and represent a hydrogen atom, a halogen-substituted alkyl or aryl; either one of $Q_1$ and $Q_2$ is at least one group selected from a hydrogen atom a halogen-substituted alkyl.

(26) The polymer electrolytic material according to one of (22) to (25) containing as the divalent group having an aromatic ring, a group defined by the following general formula (IV):

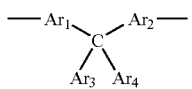
(IV)

wherein $Ar_1$ to $Ar_4$ represent an aryl or an arylene and may having a substituent group; $Ar_1$ to $Ar_4$ may be bonded one or more optional positions; and two or more groups having different $Ar_1$ to $Ar_4$ may be contained in the polymer electrolytic material.

(27) The polymer electrolytic material according to (26) containing as the divalent group having an aromatic ring, a group defined by the following general formula (IV-2):

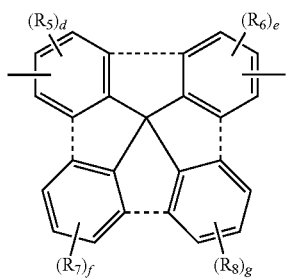
(IV-2)

wherein the dotted lines may be bonded or may not be bonded; $R_5$ to $R_8$ represent a halogen atom, a monovalent organic group or an ionic group; d and e represent an integer of 0 to 4; f and g represents an integer of 0 to 5; and two or more groups having different $R_5$ to $R_8$ and/or d to g may be contained in the polymer electrolytic material.

(28) The polymer electrolytic material according to (27), wherein d to g in the general formula (IV-2) satisfy $d+e+f+g \geq 2$.

(29) The polymer electrolytic material according to one of (22) to (28) containing as the divalent group having an aromatic ring, a group defined by the following general formula (IV-3):

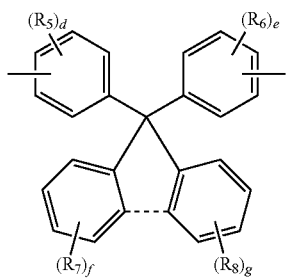
(IV-3)

wherein the dotted line may be bonded or may not be bonded; $R_5$ to $R_8$ represent a halogen, a monovalent organic group or an ionic group; d and e represent an integer of 0 to 4; f and g represents an integer of 0 to 5; and two or more groups having different $R_5$ to $R_8$ and/or d to g may be contained in the polymer electrolytic material.

(30) The polymer electrolytic material according to (29), wherein d to g in the general formula (IV-3) satisfy $d+e+f+g \geq 2$.

(31) The polymer electrolytic material according to (30), wherein at least 2 of $R_5$ to $R_8$ represent an alkyl.

(32) The polymer electrolytic material according to one of (22) to (31) comprising a polymer defined by the following general formula (V):

(V)

wherein E represents a divalent group having an aromatic ring and defined by general formula (II), (III), (IV), (IV-2) or (IV-3); $Ar_5$ to $Ar_6$ represent an (un)substituted arylene; W represents a divalent electron attractive group; Y represents oxygen, sulfur, or selenium; E, $Ar_5$, $Ar_6$, W and/or Y may represent two or more groups, respectively.

(33) The polymer electrolytic material according to (32), wherein W in the general formula (V) represents at least one group selected from —CO—, —$SO_2$—, —$P(R_1)O$— wherein $R_1$ represents an optional organic group.

(34) The polymer electrolytic material according to (32), wherein W in the general formula (V) represents —CO— and Y represents oxygen.

(35) The polymer electrolytic material according to (32), wherein —$Ar_5$—W—$Ar_6$— in the general formula (V) includes a group unit defined by the following general formula (VI)

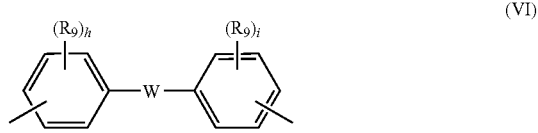
(VI)

wherein W represents a divalent electron attractive group; $R_9$ represents at least one kind ionic group selected from sulfonic acid group, a sulfonimide group, a sulfuric acid group, a phosphonic acid group, a phosphoric acid group, and a carboxylic acid group; and h and i represents an integer of 1 to 4.

(36) The polymer electrolytic material according to (35), wherein W in the general formula (VI) represents —CO—.

(37) The polymer electrolytic material according to (35) or (36), wherein a group defined by the general formula (IV-3) is contained as the group represented by E.

(38) A polymer electrolytic member using the polymer electrolytic material according to one of (1) to (37).

(39) A membrane electrode assembly using the polymer electrolytic material according to one of (1) to (37).

(40) A polymer electrolytic fuel cell using the polymer electrolytic material according to (1) to (37).

(41) The polymer electrolytic fuel cell according to (40), wherein the fuel cell is a direct type fuel cell using at least one mixture selected from mixtures of an organic compound having 1 to 6 carbon atoms and water as fuel.

(42) The polymer electrolytic fuel cell according to (40), wherein the content of the organic compound having 1 to 6 carbon atoms in the fuel to be supplied to the membrane electrode assembly is 20 to 70% by weight.

(43) A polymer electrolytic material having voids with a porosity of 5 to 80% by volume and an average pore diameter of the voids smaller than 50 nm and containing an ionic group in the inside of the voids.

(44) A polymer electrolytic member using the polymer electrolytic material according to (43).

(45) A membrane electrode assembly using the polymer electrolytic material according to (43).

(46) A polymer electrolytic fuel cell using the polymer electrolytic material according to (43).

(47) The polymer electrolytic fuel cell according to (46), wherein the fuel cell is a direct type fuel cell using at least one mixture selected from mixtures of an organic compound having 1 to 6 carbon atoms and water as fuel.

(48) The polymer electrolytic fuel cell according to (46), wherein the content of the organic compound having 1 to 6 carbon atoms in the fuel to be supplied to the membrane electrode assembly is 20 to 70% by weight.

(49) A polymer electrolytic membrane production method comprising obtaining a membrane-like polymer from a monomer composition containing a monomer into which an ionic group is introducible and a cavity source or forming a membrane from a polymer composition containing a polymer into which an ionic group is introducible and a cavity source; removing the cavity source from the membrane; and then introducing an ionic group into the polymer.

(50) The polymer electrolytic membrane production method according to (49), wherein the removal of the cavity source from the membrane and introduction of an ionic group into the polymer are carried out in a single step.

(51) The polymer electrolytic membrane production method according to (50), wherein the removal of the cavity source from the membrane and introduction of an ionic group into the polymer are carried out by immersing the membrane in a solution containing a solvent capable of removing the cavity source and an ionic group introducing agent added to the solvent.

According to the invention, a polymer electrolytic material excellent in proton conductivity and also excellent in fuel shutting property can be provided and accordingly, a polymer electrolytic fuel cell having a high efficiency can be provided.

BEST MODE FOR CARRYING OUT THE INVENTION

In this invention, the water existing in a polymer electrolytic material is defined and classified to bulk water: water having a freezing point observed at 0° C. or higher;
low freezing point water: water having a freezing point observed at lower than 0° C. and −30° C. or higher; and
unfreezable water: water having a freezing point not observed at −30° C. or higher and the properties of the polymer electrolytic material are significantly improved by controlling the ratio of them, particularly the ratio of the unfreezable water, With respect to a measurement method for the water, there is a description in Non-patent Document No. 7.

[Non-patent Document No. 7]: Journal of Colloidal and Interface Science, Vol. 171, 92-102 (1995).

It is important that a polymer electrolytic material of the invention has an unfreezable water ratio Rw1 defined by the following expression (S1) in a range of 20 to 100% by weight in hydrated state:

$$Rw1 = [Wnf/(Wfc + Wnf)] \times 100 \quad (S1)$$

wherein Wnf represents the unfreezable water content per 1 g of the polymer electrolytic material in dry state and Wfn represents the low freezing point water content per 1 g of the polymer electrolytic material in dry state.

In the polymer electrolytic material, it is supposed that fuel such as methanol permeates mainly the low freezing point water and that if the ratio of the water is high, the fuel cross-over tends to be increased. On the other hand, unfreezable water is assumed to exist in the periphery of an ionic group or a polar group in the polymer electrolytic material and it is supposed that the unfreezable water does not easily permeate the fuel such as methanol. Accordingly, high proton conductivity and low fuel cross-over can be accomplished simultaneously by making such a polymer electrolytic material (membrane) with a high content ratio of unfreezable water available and in a polymer electrolytic fuel cell, a high output and high energy capacity can be accomplished.

If Rw1 is too small, the fuel cross-over suppressing effect becomes insufficient. In such a viewpoint, it is preferable that Rw1 is as close to 100% by weight as possible, however in the case the low freezing point water is not at all contained, the proton conductivity may possibly be decreased and therefore, the upper limit of Rw1 is preferably 99.9% by weight or so.

The above-mentioned Rw1 is more preferably 40 to 99.9% by weight, furthermore preferably 60 to 99.9% by weight, even more preferably 80 to 99.9% by weight, and even more preferably 90 to 99.9% by weight.

The numeral range of Rw1 in the invention is preferably distinguished between the case that the polymer electrolytic material has a crosslinked structure and the case the material has non-crosslinked structure. It is because inventors of the invention have confirmed that a proper range of Rw1 differs between the case of the crosslinked structure and the case of the non-crosslinked structure according to experiments.

In the case the polymer electrolytic material of the invention has a crosslinked structure, Rw1 is required to be 20 to 100% by weight, preferably 40 to 99.9% by weight, and more preferably 60 to 99.9% by weight. In the case the polymer electrolytic material of the invention has a non-crosslinked structure, Rw1 is preferably 60 to 100% by weight, more preferably 80 to 99.9% by weight, further more preferably 90 to 99.9% by weight.

Herein, the crosslinked structure means the state that there is practically no fluidity to heat or the state that the material is practically insoluble in a solvent. On the other hand, the non-crosslinked structure means the structure is not a crosslinked structure. The structure is determined by the following method.

After a polymer electrolytic material (about 0.1 g) to be a sample is washed with pure water, the material is dried at 40° C. for 24 hours in vacuum and weighed. The polymer electrolytic material is immersed in a solvent in an amount 100 times as much by weight and heated at 70° C. for 40 hours in a closed container under stirring condition. Next, the resulting solution is filtered by filtration paper (No. 2) manufactured by Advantec Co. At the time of filtration, the filtration paper and the residue are washed with the same solvent in an amount 100 times as much by weight so as to sufficiently elute the eluted substance to the solvent. The filtrate is dried and the weight of the eluted substance is measured. In the case the elution weight is less than 10% by weight to the initial weight, it is determined that the material is practically insoluble in the solvent. This experiment is carried out for 5 kinds of solvents, toluene, hexane, N-methylpyrrolidone, methanol, and water and in the case the material is practically insoluble in all of the solvents, the polymer electrolytic material is determined to have the crosslinked structure and those which are found having no crosslinked structure are determined to have the non-crosslinked structure.

The polymer electrolytic material of the invention is preferable to have an unfreezable water ratio Rw2 defined by the following expression (S2) in a range of 50 to 100% by weight in hydrated state:

$$Rw2=[Wnf/(Wnf+Wfc+Wf)]\times 100 \qquad (S2)$$

wherein Wf represents the bulk water content per 1 g of the polymer electrolytic material in dry state.

Similar to the low freezing point water, the bulk water has high permeability to fuel such as methanol and it is supposed that if the bulk water and low freezing point water is high, the fuel cross-over tends to be increased. On the other hand, as described above, it is assumed that fuel such as methanol does not easily permeate the unfreezable water. Accordingly, it is expected that the fuel cross-over suppression is made effective if the unfreezable water ratio Rw2 is 50% by weight or more. From such a viewpoint, it is preferable that Rw2 is as close to 100% by weight as possible, however in the case the bulk water and the low freezing point water are not at all contained, the conductivity may possibly be decreased and therefore, the upper limit of Rw2 is preferably 99.9% by weight or so.

Rw2 is more preferably 60 to 99.9% by weight and furthermore preferably 70 to 99.9% by weight.

Further, the polymer electrolytic material of the invention is preferable to have Wnf in a range of 0.05 to 2 in the hydrated state.

If Wnf is 0.05 or higher, the proton conductivity can be assured and if it is 2 or lower, it is expected that the fuel cross-over is effectively suppressed. Wnf is more preferably 0.065 to 1 and furthermore preferably 0.08 to 0.8.

The respective numeral values of Wnf, Wfc, and Wf are the values measured by differential scanning calorimetry (DSC).

That is, the polymer electrolytic material is immersed in water at 20° C. for 12 hours and taken out of water and the excess water adhering to the surface is wiped out and removed with gauze as quick as possible and then put in an air-tightly closable specimen container made of aluminum coated with alumina whose weight (Gp) is previously measured and closed therein by crimping and the total weight (Gw) of the sample and the air-tightly closable specimen container is measured as quickly as possible and immediately, the DSC measurement is carried out. The measurement temperature program is that cooling from a room temperature to −30° C. is carried out at 10° C./min speed and then heating to 5° C. is carried out at 0.3° C./min and the bulk water amount (Wf) is calculated from the DSC curve during the heating process according to the mathematical expression (n1) and the low freezing point water amount (Wfc) is calculated by the following mathematical expression (n2) and the unfreezable water amount (Wnf) is calculated by subtracting these values from the total water ratio (Wt) [the following mathematical expression (n3)]

$$W_f = \int_{T_0}^{>T_0} \frac{\frac{dq}{dt}}{m\Delta H_0} dt \qquad (n1)$$

$$W_{fC} = \int_{<T_0}^{>T_0} \frac{\frac{dq}{dt}}{m\Delta H(T)} dt \qquad (n2)$$

$$W_{nf} = W_t - W_f - W_{fC} \qquad (n3)$$

Herein, the bulk water amount (Wf), low freezing point water amount (Wfc), unfreezable water amount (Wnf), and total water ratio (Wt) are values by weight per unit weight of the dry sample. The reference character m represents the weight of the dry sample; dq/dt represents heat flux signal of DSC; T0 represents the freezing point of the bulk water; ΔH0 represents freezing enthalpy at the freezing point (T0) of the bulk water.

It is preferable for the polymer electrolytic material of the invention to have a membrane-like form. It is because in the case of using it for a fuel cell, it is used in form of a membrane as the polymer electrolytic membrane and electrode catalyst layer.

In the case of having the membrane-like form, the polymer electrolytic material of the invention is preferable to have methanol permeability per unit surface area and per unit thickness for an aqueous solution of 30% by weight methanol 40 μmol·min$^{-1}$·cm$^{-2}$ or lower in the condition of 20° C. It is because in a fuel cell using a membrane of the polymer electrolytic material, the fuel permeability is desired to be low so as to keep high fuel concentration in terms of attainment of high output and high energy capacity in a high fuel concentration region.

From such a viewpoint, it is most preferably 0 μmol·min$^{-1}$·cm$^{-2}$, however, from a viewpoint of assuring the proton conductivity, it is preferably 0.01 μmol·min$^{-1}$·cm$^{-2}$ or higher.

In the case of having the membrane-like state, the polymer electrolytic material of the invention is preferable to have proton conductivity per unit surface area 4 S·cm$^{-2}$ or higher. The proton conductivity can be measured by immersing a membrane-like sample in pure water at 25° C. for 24 hours, taking out the sample in environments of 25° C. and 50 to 80% relative humidity, and subjecting the sample to the measurement by a constant potential a.c. impedance method as quick as possible.

Control of the proton conductivity per unit surface area to be 4 S·cm$^{-2}$ or higher makes it possible to obtain sufficient proton conductivity, which is sufficient cell output in the case the material is used as a polymer electrolytic membrane for a fuel cell. Although the proton conductivity is more preferable as it is higher, a membrane with a high proton conductivity tends to be dissolved in or broken by fuel such as methanol water and the fuel permeation quantity tends to be increased, a practical upper limit is 50 S·cm$^{-2}$.

Also, the polymer electrolytic material of the invention is preferable to have methanol permeability per unit surface area and per unit thickness for an aqueous solution of 30% by weight methanol 1000 nmol·min$^{-1}$·cm$^{-1}$ or lower in the above-mentioned condition, more preferably 500 nmol·min$^{-1}$·cm$^{-1}$ or lower, and furthermore preferably 250 nmol·min$^{-1}$·cm$^{-1}$ or lower. The energy capacity decrease can be prevented by controlling it to be 1000 nmol·min$^{-1}$·cm$^{-1}$ or lower in the case of using the material for DFC. On the other hand, in terms of attainment of proton conductivity, it is preferable to be 1 nmol·min$^{-1}$·cm$^{-1}$ or higher.

The proton conductivity per unit surface area and per unit thickness measured by the above-mentioned condition is preferably 10 mS·cm$^{-1}$ or higher, more preferably 40 mS·cm$^{-1}$ or higher, and furthermore preferably 60 mS·cm$^{-1}$ or higher. High output as a cell can be obtained by controlling the value to be 10 mS·cm$^{-1}$ or higher. On the other hand, since the membrane with a high proton conductivity tends to be easily dissolved in or broken by fuel such as methanol water and the fuel permeation amount tends to be increased, the practical upper limit is 5000 mS·cm$^{-1}$.

The polymer electrolytic material of the invention is preferable to simultaneously satisfy both of the above-mentioned low methanol permeability and high proton conductivity. Although it is easy to satisfy either of them even by a conventional technique, only in the case both are satisfied, high output and high energy capacity can be attained simultaneously.

The above-mentioned methanol permeability and proton conductivity are defined as methanol permeability A and proton conductivity A in Examples described later.

In the case the material is combined with an electrode composed of an electrode substrate and an electrode catalyst layer to be MEA, it is preferable to set an anode and a cathode on the opposite to each other with vain as little as possible in terms of the catalyst use amount (cost) and the cell output. Accordingly, from a viewpoint of positioning of the anode and the cathode, it is preferable for a membrane of the polymer electrolytic material of the invention to have total luminous transmittance of 30% or higher in the state the membrane contains water and it is more preferably 50%. The upper limit is 99.5% in consideration of light reflection in the membrane surface. Herein, the total luminous transmittance means the value measured by using the polymer electrolytic membrane immersed in water at 25° C. for 6 hours or longer, wiping the water droplets on the surface, and then subjecting the membrane to the measurement by SM Color Computer SM-7-CH manufactured by Suga Shikenki Co., Ltd.

In the case the polymer electrolytic material of the invention is a composite of a polymer composing the material and another substance (a porous substrate in the case described later), the measurements of methanol permeability, the proton conductivity, and the total luminous transmittance are carried out using the entire body of the composite as the polymer electrolytic material.

That the polymer electrolytic material of the invention contains an ionic group is one of preferable embodiments. Containing the ionic group, the polymer electrolytic material is provided with a high proton conductivity.

The ionic group in the polymer electrolytic material in the invention is preferable to be an atom group having negative charge and having proton exchange capability. As such a functional group, a sulfonic acid group (—SO$_2$(OH)), a sulfuric acid group (—OSO$_2$(OH)), a sulfonimide group (—SO$_2$NHSO$_2$R (R represents an organic group)), a phosphonic acid group (—PO(OH)$_2$), a phosphoric acid group (—OPO(OH)$_2$), and a carboxylic acid group (—CO(OH)), and their salts are preferable to be used. The polymer composing the polymer electrolytic material may contain two or more types of these ionic groups and depending on the combination, more preferable results may possible be obtained. The combination is adequately determined in accordance with the polymer structure. Among them, in terms of the high proton conductivity, it is preferable to contain one of the sulfonic acid group, the sulfonimide group, and the sulfuric acid group and in terms of the hydrolysis resistance, it is more preferable to contain at least the sulfonic acid group.

In the case the polymer electrolytic material of the invention contains the sulfonic acid group, the sulfonic acid group density is preferably 0.1 to 5.0 mmol/g, more preferably 0.5 to 3.5 mmol/g, and furthermore preferably 1.0 to 3.5 mmol/g in terms of the proton conductivity and fuel cross-over suppression. Control of the sulfonic acid group density to be 0.1 mmol/g or higher makes it possible to keep the conductivity, that is the output property and its control to be 5.0 mmol/g or lower makes it possible to provide sufficient fuel shutting property and mechanical strength in the hydrated state in the case the polymer electrolytic material is used as an electrolytic membrane for a fuel cell.

The sulfonic acid group density means the mole content of the sulfonic acid group introduced per unit weight of the polymer electrolytic material in dry state and as the value is higher, it is implied that the sulfonation degree is higher. The sulfonic acid group density can be measured by elementary analysis, neutralization titration, or nuclear magnetic resonance spectrometry. The elementary analysis is preferable in terms of the easiness and the precision of the sulfonic acid group density and generally analysis is carried out by this method. However, in the case it is difficult to precisely calculate the sulfonic acid group density by the elementary analysis, e.g. in the case the polymer electrolytic material contains a sulfur source other than the sulfonic acid group, the neutralization titration method is to be employed. Further, in the case determination of the sulfonic acid group density is difficult by these methods, it may be possible to employ the nuclear magnetic resonance spectrometry.

One of preferable embodiments of the polymer electrolytic material of the invention is that the polymer electrolytic material contains the ionic group and an aromatic phosphorus type polymer comprising a group defined by the following general formula (I) in the main chain:

wherein R$_1$ represents an organic group: X represents oxygen, sulfur, or selenium; and two or more of substituent groups comprising different R$_1$ and/or X may be contained in the polymer electrolytic material.

Introduction of pentavalent phosphorus atom as shown in the above-mentioned general formula (I) in the main chain provides excellent heat resistance, weathering proofness, antioxidation property, radical resistance and owing to a tetrahedral structure, the main chain is remarkably rigid and stable and is suppressed from swelling in water or an aqueous methanol solution and accordingly, fuel cross-over is suppressed and also the strength deterioration of the membrane of the material is suppressed. Further, owing to the existence of the polar group in the general formula (I), the solubility in many common solvents is improved to make the production and formation process easy.

In the case a conventional ionic group-containing aromatic hydrocarbon polymer is alone used as the polymer electrolytic material, if the content of the ionic group is increased to obtain the high proton conductivity, the polymer electrolytic material itself is dissolved in the aqueous methanol solution or significantly swollen and therefore, clusters of water with a large diameter are formed in the inside to increase the low freezing point water and bulk water in the polymer electrolytic material. In the low freezing point water and bulk water, the fuel easily moves and accordingly, no sufficient effect to suppress fuel cross-over can be obtained and with the conventional aromatic hydrocarbon type polymer, it has been impossible to satisfy both of the proton conductivity and the effect of the fuel cross-over suppression.

On the other hand, with respect to the aromatic phosphorus type polymer to be used for the polymer electrolytic material of the invention, owing to the rigid polymer skeleton and use of the substituent group with high hydrophobicity for the organic substituent group $R_1$ hung on the phosphorus atom makes it possible to suppress the swelling in the aqueous methanol solution and therefore, both the high proton conductivity and the fuel cross-over suppression effect can be satisfied and also an effect to suppress the swelling deformation and mechanical strength decrease can be provided. Further, surprisingly, it has been found that introduction of pentavalent phosphorus atom is effective to suppress the desulfonation reaction, which has been observed commonly in the case of the conventional ionic group-containing aromatic hydrocarbon type polymer.

As the organic group $R_1$ in the above-mentioned general formula (I), hydrocarbon groups having 1 to 20 carbon atoms and their derivative residual groups are preferable and hydrocarbon groups having 1 to 8 carbon atoms and their derivative residual groups are more preferable. The organic group $R_1$ is preferably a hydrophobic group in terms of both of the waterproofness of the polymer electrolytic material and fuel cross-over suppression and the group is more preferable to contain an aromatic ring in terms of the rigidity of the main chain and stability owing to the steric hindrance. Examples of the preferable organic group (substituent group) are an alkyl, an alkenyl, an aminoalkyl, a hydroxyalkyl, a halogen-substituted alkyl, an aryl, an alkyl-substituted aryl, a halogen-substituted aryl, an alkoxyaryl, an aminoaryl, and a hydroxyaryl. Practical examples of the substituent group $R_1$ are methyl, ethyl, n-propyl, isopropyl, n-butyl, isobutyl, tert-butyl, n-pentyl, neopentyl, cyclohexyl, cyclopentyl, benzyl, chloromethyl, dichloromethyl, bromomethyl, diboromomethyl, 2-chloroethyl, 1,2-dichloroethyl, 2-bromoethyl, 1,2-dibromoethyl, 3-chloropropyl, 2,3-dichloropropyl, 3-bromopropyl, 2,3-dibromopropyl, 2-chloro-1-methylethyl, 1,2-dichloro-1-methylethyl, 2-bromo-1-methylethyl, 1,2-dibromo-1-methylethyl, 4-chlorobutyl, 3,4-dichlorobutyl, 4-bromobutyl, 3,4-diboromobutyul, 3-chloro-1-methylpropyl, 2,3-dichloro-1-methylpropyl, 3-bromo-1-methylpropyl, 2,3-diboromo-1-methylpropyl, 1-chloromethylpropyl, 1-chloro-1-chloromethylpropyl, 1-bromomethylpropyl, 1-boromo-1-boromomethylpropyl, 5-chloropentyl, 4,5-dichloropehtyl, 5-boromopentyl, 4,5-diboromopentyl, 1-hydroxymethyl, 2-hydroxylethyl, 3-hydroxypropyl, 4-hydroxylbutyl, 5-hydroxypentyl, 1-aminomethyl, 2-aminomethyl, 3-aminopropyl, 4-aminobutyl, 5-aminopentyl, methylthiomethyl, methylthioethyl, methylthiopropyl, methylthiobutyl, ethylthiomethyl, ethylthioethyl, ethylthiopropyl, propylthiomethyl, propylthioethyl, butylthiomethyl, triphenylphosphine oxide, 4-chlorophenyl, 3,4-dichlorophenyl, 3,5-dichlorophenyl, 4-bromophenyl, 3,4-bromophenyl, 3,5-bromophenyl, 4-methoxyphenyl, 3,4-dimethoxyphenyl, 1-naphthyl, 2-naphthyl, 5,6,7,8-tetrahydro-2-naphthyl, 5,6,7,8-tetrahydro-1-naphthyl, benzyl, 4-bromophenylmethyl, 3,4-diboromophenylmethyl, 3,5-dibromophenylmethyl, 2-phenylethyl, 2-(4-bromophenyl)ethyl, 2-(3,4-dibromophenyl)ethyl, 2-(3,5-dibromophenyl)ethyl, 3-phenylpropyl, 3-(4-bromophenyl)propyl, 3-(3,4-dibromophenyl)propyl, 3-(3,5-diboromophenyl)propyl, 4-phenylbutyl, 4-(4-bromophenyl)butyl, 4-(3,4-dibromophenyl)butyl, 4-(3,5-dibromophenyl)butyl, 2-pyridyl, 3-pyridyl, 4-pyridyl, 1-pyrrolidinomethyl, 1-pyrrolidinoethyl, 1-pyrrolidinopropyl, 1-pyrrolidinobutyl, pyrrol-1-yl, pyrrol-2-yl, pyrrol-3-yl, thiophene-2-yl, thiophene-3-yl, dithiane-2-yl, triazine-2-yl, furan-2-yl, furan-3-yl, vinyl, and allyl.

Among them, methyl, ethyl, propyl, isopropyl, cyclohexyl, vinyl, allyl, aminoalkyl, hydroxyalkyl, halogen-substituted alkyl, benzyl, phenyl, naphthyl, biphenyl, halogen-substituted phenyl, methoxyphenyl, ethoxyphenyl, aminoaryl, hydroxyaryl, and halogen-substituted aryl are preferable and in terms of the solubility in organic solvents and easiness of the polymer synthesis to a high polymerization degree, phenyl or methyl are more preferable to be employed.

In terms of the water-proofness, heat resistance, fuel cross-over suppression, mechanical strength, and durability, preferable examples of the aromatic phosphorus type polymer of one embodiment of the invention are practically aromatic polyphosphine oxides, that is those which have portions defined by C—P(=O) ($R_1$)—C in the main chains; aromatic polyphosphinates that is those which have portions defined by C—P(=O) ($R_1$)—O—C in the main chains; aromatic polyphosphonates, that is those which have portions defined by C—O—P(=O)($R_1$)—O—C in the main chains; aromatic polyphosphates, that is those which have portions defined by C—O—P(=O) (OR)—O—C in the main chains (R represents an organic group and two or more substituent groups with different R may be contained in the polymer electrolytic material); copolymers of them with aromatic polyketones and aromatic polysulfones; and polymers obtained by partially or entirely substituting the oxygen atoms of them with sulfur atoms and selenium atoms. Two or more types of the structures of them may be contained in the polymer electrolytic material and combination of these structures may sometimes provide preferable results. The combination may adequately be determined in accordance with the proton conductivity, fuel cross-over suppressing effect, water-proofness, heat resistance, membrane formability, and mechanical strength.

Among them, in consideration of the long term use of the polymer electrolytic material generally in a strongly acidic aqueous solution, in terms of the hydrolysis resistance, polymers having carbon-phosphorus-carbon in the main chains are preferable. Further, in terms of the synthesis of the high molecular weight polymers and availability of monomers, aromatic polyether phosphine oxides (hereinafter, referred to as aromatic PEPO) are especially preferable.

Aromatic PEPO can be obtained by polymerization by a method described, for example, in "High. Perform. Polym." 3, 211 (1991) and the polymerization degree may adequately be adjusted in consideration of the solubility in general solvents and mechanical strength. Also, an aromatic poly(ether phosphine oxide/ether ketone) copolymer and an aromatic poly(ether phosphine oxide/ether sulfone) copolymer can be obtained by copolymerization by the above-mentioned method by replacing a needed amount of bis(haloaryl)phosphine oxide monomer with a bis(haloaryl) ketone monomer and a bis(haloaryl) sulfone monomer.

The following polymers are preferable to be used as the aromatic PEPO. That is, those which comprise at least a group defined by the following general formula (A1) and a divalent phenol residual group defined by the following general formula (A2):

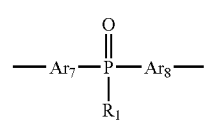

A1 wherein $R_1$ of the general formula (A1) represents an organic group; and two or more of substituent groups having different $R_1$ may be contained in the polymer electrolytic material; $Ar_7$ and $Ar_8$ of the general formula A1 represent an aromatic ring and both of them to be bonded to a single phosphorus atom may be same or different; and two or more of aromatic rings with different $R_1$, $Ar_7$, and/or $Ar_8$ may be contained in the polymer electrolytic material: and $$-O-E_1-O- \quad (A2)$$

wherein $E_1$ of the formula (A2) represents a divalent group having an aromatic ring and two or more groups with different $E_1$ may be contained.

As the aromatic ring $Ar_7$ and $Ar_8$, phenylene, naphthylene, anthracylene, and diphenylene can be exemplified.

Among groups defined by the above-mentioned general formula (A1), in terms of the solubility in general solvents, mechanical strength, and availability of the monomers, the ollowing groups (a1) to (a12) are preferable and in terms of the synthesis of the polymer with a high polymerization degree and availability of the monomers, the groups (a1) and (a8) are particularly preferable.

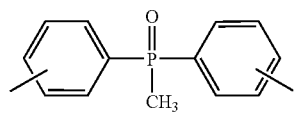 (a1)

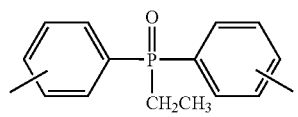 (a2)

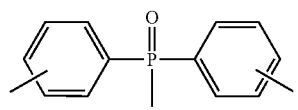 (a3)

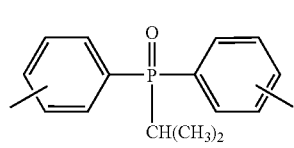 (a4)

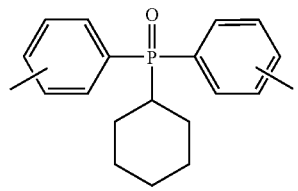 (a5)

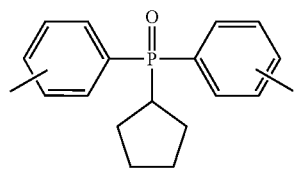 (a6)

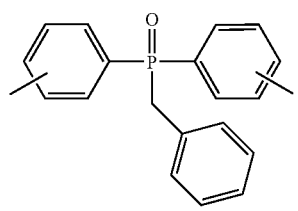 (a7)

-continued

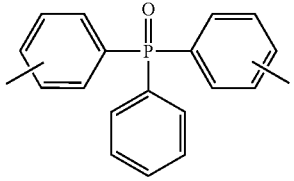 (a8)

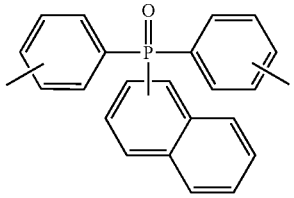 (a9)

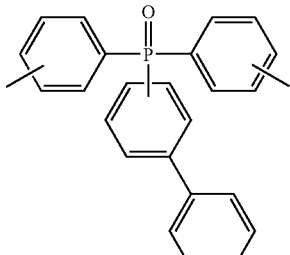 (a10)

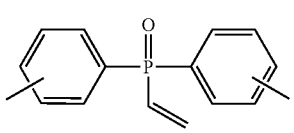 (a11)

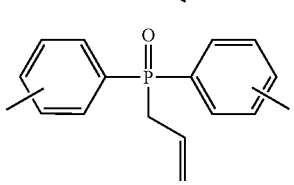 (a12)

With respect to these diaryl phosphine oxide groups, they may be partially substituted with the respectively corresponding phosphine groups, which are trivalent phosphorus functional groups. Accordingly, the electrolytic material is provided with the antioxidation property, however in consideration of the mechanical strength, the substitution ratio is preferably 50% or lower, more preferably 25% or lower, and furthermore preferably 10% or lower.

With respect to these diaryl phosphine oxide groups, they may be partially substituted with the respectively corresponding ketone or sulfone groups. Accordingly, the electrolytic material is provided with the solubility in common solvents, however in consideration of the effect to suppress the fuel cross-over, the substitution ratio is preferably 75% or lower, more preferably 50% or lower, and furthermore preferably 25% or lower. Particularly, in terms of the membrane formability and water-proofness property, aromatic poly(ether phosphine oxide/ether ketone) copolymer is more preferable to be employed.

Practical examples of the divalent phenol composing the divalent phenol residual group defined by the general formula (A2) are hydroquinone, 1,2-dihydroxybenzene, 1,3-dihydroxybenzene, 4,4'-dihydroxybiphenyl, 3,4'-dihydroxybiphenyl, 2,4'-dihydroxybiphenyl, 2,3'-dihydroxybiphenyl, 3,3'-dihydroxybiphenyl, 2,2'-dihydroxybiphenyl, 1,1-bis(4- hydroxyphenyl)methane, 1,1-bis(4-hydroxyphenyl)ethane, 1,1-bis(4-methyl-2-hydroxyphenyl)methane, 1,1-bis(3,5-dimethyl-4-hydroxyphenyl)methane, 2,2-bis(4-hydroxyphenyl)-4-methylpentane, 1,1-bis(4-hydroxyphenyl)cyclohexane, 1,1-bis(4-hydroxyphenyl)cycloheptane, 1,1-bis(4-hydroxyphenyl)cyclooctane, 1,1-bis(4-hydroxyphenyl)cyclodecane, 1,1-bis(4-hydroxyphenyl)cyclododecane, 2,2-bis(4-hydroxyphenyl)propane, 2,2-bis(3-methyl-4-hydroxyphenyl)propane, 2,2-bis(3,5-dimethyl-4-hydroxyphenyl)propane, 1,1-bis(4-hydroxyphenyl)-1-phenylethane, 1,1-bis(4-hydroxyphenyl)-2-ethylhexane, 2,2-bis(3-phenyl-4-hydroxyphenyl)propane, 1,1-bis(3-methyl-4-hydroxyphenyl)methane, 4,4'-biphenol, 2,2-bis(4-hydroxyphenyl)butane, 1,1-bis(4-hydroxyphenyl)-2-methylpropane, 1,1-bis(4-hydroxyphenyl)-1-phenylmethane, 2,2-bis(4-hydroxyphenyl)octane, 1,1-bis(3-methyl-4-hydroxyphenyl)cyclohexane, 2,2-bis(3-allyl-4-hydroxyphenyl)propane, 2,2-bis(3-isopropyl-4-hydroxyphenyl)propane, 2,2-bis(3-tert-butyl-4-hydroxyphenyl)propane, 2,2-bis(3-sec-butyl-4-hydroxyphenyl)propane, bisphenol fluorene, 1,1-bis(2-methyl-4-hydroxy-5-tert-butylphenyl)-2-methylpropane, 4,4'-[1,4-phenylene-bis(2-propylidene)]-bis(2-methylphenyl), 1,1-bis(3-phenyl-4-hydroxyphenyl)cyclohexane, 4,4'-dihydroxyphenyl ether, 1,1-bis(2-hydroxyphenyl)methane, 2,4'-methylenebisphenol, 1,1-bis(3-methyl-4-hydroxyphenyl)methane, 1,1-bis(4-hydroxyphenyl)propane, 1,1-bis(2-hydroxy-5-methylphenyl)ethane, 1,1-bis(4-hydroxyphenyl)-3-methylbutane, 1,1-bis(2-hydroxy-3,5-dimethylphenyl)methane, 1,1-bis(4-hydroxyphenyl)cyclopentane, 1,1-bis(3-methyl-4-hydroxyphenyl)cyclopentane, 3,3-bis(4-hydroxyphenyl)pentane, 3,3-bis(3-methyl-4-hydroxyphenyl)pentane, 3,3-bis(3,5-dimethyl-4-hydroxyphenyl)pentane, 2,2-bis(2-hydroxy-3,5-dimethylphenyl)propane, 2,2-bis(4-hydroxyphenyl)nonane, 1,1-bis(3-methyl-4-hydroxyphenyl)-1-phenylethane, 1,1-bis(3,5-dimethyl-4-hydroxyphenyl)cyclohexane, 2,2-bis(4-hydroxyphenyl)decane, 1,1-bis(4-hydroxyphenyl)decane, 1,1-bis(2-hydroxy-3-tert-butyl-5-methylphenyl)methane, 1,1-bis(4-hydroxyphenyl)diphenylmethane, terpenediphenyl, 1,1-bis(3-tert-butyl-4-hydroxyphenyl)cyclohexane, 1,1-bis(2-methyl-4-hydroxy-5-tert-butylphenyl)-2-methylpropane, 2,2-bis(3-cyclohexyl-4-hydroxyphenyl)propane, 1,1-bis(3,5-di-tert-butyl-4-hydroxyphenyl)methane, 1,1-bis(3,5-di-sec-butyl-4-hydroxyphenyl)methane, 1,1-bis(3-cyclohexyl-4-hydroxyphenyl)cyclohexane, 1,1-bis(2-hydroxy-3,5-di-tert-butylphenyl)ethane, 1,1-bis(3-nonyl-4-hydroxyphenyl)methane, 2,2-bis(3,5-di-tert-butyl-4-hydroxyphenyl)propane, 1,1-bis(2-hydroxy-3,5-di-tert-butyl-6-methylphenyl)methane, 1,1-bis(3-phenyl-4-hydroxyphenyl)-1-phenylethane, 4,4-bis(4-hydroxyphenyl)pentanoic acid, bis(4-hydroxyphenyl)acetic acid butyl ester, 1,1-bis(3-fluoro-4-hydroxyphenyl)methane, 1,1-bis(2-hydroxy-5-fluorophenyl)methane, 2,2-bis(4-hydroxyphenyl)-1,1,1,3,3,3-hexafluoropropane, 2,2-bis(3-fluoro-4-hydroxyphenyl)propane, 1,1-bis(3-flubro-4-hydroxyphenyl)-1-phenylmethane, 1,1-bis(3-fluoro-4-hydroxyphenyl)-1-(p-fluorophenyl)methane, 1,1-bis(4-hydroxyphenyl)-1-(p-fluorophenyl)methane, 2,2-bis(3-chloro-4-hydroxy-5-methylphenyl)propane, 2,2-bis(3,5-dichloro-4-hydroxyphenyl)propane, 2,2-bis(3-chloro-4-hydroxyphenyl)propane, 1,1-bis(3,5-dibromo-4-hydroxyphenyl)methane, 2,2-bis(3,5-dibromo-4-hydroxyphenyl)propane, 2,2-bis(3-nitro-4-hydroxyphenyl)propane, 3,3'-dimethyl-4,4'-biphenol, 3,3',5, 5'-tetramethyl-4,4'-biphenol, 3,3',5, 5'-tetra-tert-butyl-4,4'-biphenol, bis(4-hydroxyphenyl) ketone, 3,3'-difluoro-4,4'-biphenol, 3,3',5, 5'-tetrafluoro-4,4'-biphenol, bis(4-hydroxyphenyl)dimethylsilane, bis(4-hydroxyphenyl)sulfone, bis(3-methyl-4-hydroxyphenyl)sulfone, bis(3,5-dimethyl-4-hydroxyphenyl)sulfone, bis(3,5-dibromo-4-hydroxyphenyl)sulfone, bis(4 -hydroxyphenyl)thio ether, bis(3-methyl-4-hydroxyphenyl)ether, bis(3-methyl-4-hydroxyphenyl)thio ether, bis(3,5-dimethyl-4-hydroxyphenyl)ether, bis(3,5-dimethyl-4-hydroxyphenyl) thioether, 1,1-bis(2,3,5-trimethyl-4-hydroxyphenyl)-1-phenylmethane, 2,2-bis(4-hydroxyphenyl)dodecane, 2,2-bis(3-methyl-4-hydroxyphenyl)dodecane, 2,2-bis(3,5-dimethyl-4-hydroxyphenyl)dodecane, 1,1-bis(3-tert-butyl-4-hydroxyphenyl)-1-phenylethane, 1,1-bis(3,5-di-tert-butyl-4-hydroxyphenyl)-1-phenylethane, 1,1-bis(2-methyl-4-hydroxy-5-cyclohexyphenyl)-2-methylpropane, 1,1-bis(2-hydroxy-3,5-di-tert-butylphenyl)ethane, 2,2-bis(4-hydroxyphenyl)propanoic acid methyl ester, 2,2-bis(4-hydroxyphenyl)propanoic acid ethyl ester, 1,3-bisphenol, 1,3-biscresol, 2,2',3,3',5,5'-hexamethyl-4,4'-bisphenol, bis(2-hydroxyphenyl)methane, 2,4'-methylenebisphenol, 1,2-bis(4-hydroxyphenyl)ethane, 2-(4-hydroxyphenyl)-2-(2-hydroxyphenyl)propane, bis(2-hydroxy-3-allylphenyl)methane, 1,1-bis(2-hydroxy-3,5-dimethylphenyl)-2-methylpropane, 1,1-bis(2-hydroxy-5-tert-butylphenyl)ethane, bis(2-hydroxy-5-phenylphenyl)methane, 1,1-bis(2-methyl-4-hydroxy-5-tertbutylphenyl)butane, bis(2-methyl-4-hydroxy-5-cyclohexylphenyl)methane, 2,2-bis(4-hydroxyphenyl)pentadecane, 2,2-bis(3-methyl-4-hydroxyphenyl)pentadecane, 2,2-bis(3,5-dimethyl-4-hydroxyphenyl)pentadecane, 1,2-bis(3,5-di-tert-butyl-4-hydroxyphenyl)ethane, bis(2-hydroxy-3,5-di-tert-butylphenyl)methane, 2,2-bis(3-styryl-4-hydroxyphenyl)propane, 1,1-bis(4-hydroxyphenyl)-1-(p-nitro phenyl)ethane, bis(3,5-difluoro-4-hydroxyphenyl)methane, bis(3,5-difluoro-4-hydroxyphenyl)-1-phenylmethane, bis(3,5-difluoro-4-hydroxyphenyl)diphenylmethane, bis(3-fluoro-4-hydroxyphenyl)diphenylmethane, 2,2-bis(3-chloro-4-hydroxyphenyl)propane, 3,3'-5,5'-tetra-tert-butyl-2,2'-biphenyl, 2,2'-diallyl-4,4'-diphenol, 1,1-bis(4-hydroxyphenyl)-3,3,5-trimethyl-cyclohexane, 1,1-bis(4-hydroxyphenyl)-3,3,5,5-tetramethyl-cyclohexane, 1,1-bis(4-hydroxyphenyl)-3,3,4-trimethyl-cyclohexane, 1,1-bis(4-hydroxydiphenyl)-3,3-dimethyl-5-ethyl-cyclohexane, 1,1-bis(4-hydroxyphenyl)-3,3,5-trimethyl-cyclopentane, 1,1-bis(3,5-dimethyl-4-hydroxyphenyl)-3,3,5-trimethyl-cyclohexane, 1,1-bis(3,5-diphenyl-4-hydroxyphenyl)-3,3,5-trimethyl-cyclohexane, 1,1-bis(3-methyl-4-hydroxyphenyl)-3,3,5-trimethyl-cyclohexane, 1,1-bis(3-phenyl-4-hydroxyphenyl)-3,3,5-trimethyl-cyclohexane, 1,1-bis(3,5-dichloro-4-hydroxyphenyl)-3,3,5-trimethyl-cyclohexane, 9,9-bis(4-hydroxyphenyl)fluorene, 9,9-bis(3,5-dimethyl-4-hydroxyphenyl)fluorene, 1,1-bis(3,5-dibromo-4-hydroxyphenyl)-3,3,5-trimethyl-cyclohexane, and ω, ω-bis(4-hydroxyphenyl)-1,4-diisopropylbenzene. One kind of them may be used along a plurality of the kinds of them may be used in combination.

Among these divalent phenol composing the divalent phenol residual group, in terms of the solubility in general solvents and synthesis of the polymer with a high polymerization degree, hydroquinone, 1,2-dihydroxybenzene, 1,3-dihydroxybenzene, 4,4'-dihydroxybiphenyl, 3,4'-dihydroxybiphenyl, 2,4'-dihydroxybiphenyl, 2,3'-dihydroxybiphenyl, 3,3'-dihydroxybiphenyl, 2,2'-dihydroxybiphenyl, 1,1-bis(4-hydroxyphenyl)methane, 9,9-bis(4-hydroxyphenyl)fluorene, 9,9-bis(3,5-dimethyl-4-hydroxyphenyl)fluorene, and 2,2-bis (4-hydroxyphenyl)-1,1,1,3,3,3-hexafluoropropane are preferable to be employed. The use ratio of the divalent phenol residual group defined by the above-mentioned general formula (A2) is preferably 45 to 55 mol. % to the total mole number of the group defined by the above-mentioned formula (A1) and the divalent phenol residual group and more preferably 48 to 52 mol. %. Control of the divalent phenol residual group defined by the formula (A2) to be 45 to 55 mol. % makes it easy to increase the molecular weight of the polymer and gives good mechanical strength.

The polymer electrolytic material of the invention may be copolymerized with polyphenols in accordance with the properties of the polymer electrolytic material to be obtained. Examples of such polyphenols are practically tris(4-hydroxyphenyl)methane, 4,4'-[1-[4-[1-(4-hydroxyphenyl)-1-methylethyl]phenyl]ethylidene]bisphenol, 2,3,4,4'-tetrahydroxybenzophenone, 4-[bis(4-hydroxyphenyl)methyl]-2-methoxyphenol, tris(3-methyl-4-hydroxyphenyl)methane], 4-[bis(3-methyl-4-hydroxyphenyl)methyl]-2-methoxyphenol, 4-[bis(3,5-dimethyl-4-hydroxyphenyl)methyl]-2-methoxyphenol, 1,1,1-tris(4-hydroxyphenyl)ethane, 1,1,1-tris(3-methyl-4-hydroxyphenyl)ethane, 1,1,1-tris(3,5-dimethyl-4-hydroxyphenyl)ethane, tris(3-methyl-4-hydroxyphenyl)methane, tris(3,5-dimethyl-4-hydroxyphenyl)methane, 2,6-bis[(2-hydroxy-5-methylphenyl)methyl]-4-methylphenol, 4-[bis(3,5-dimethyl-4-hydroxyphenyl)methyl]-1,2-dihydroxybenzene, 2-[bis(2-methyl-4-hydroxy-5-cyclohexylphenyl)methyl]-phenol, 4-[bis(2-methyl-4-hydroxy-5-cyclohexylphenyl)methyl]-1,2-dihydroxybenzene, 4-methylphenyl-1,2,3-trihydroxybenzene, 4-[(4-hydroxyphenyl)methyl]-1,2,3-trihydroxybenzene, 4-[1-(4-hydroxyphenyl)-1-methyl-ethyl]-1,3-dihydroxybenzene, 4-[(3,5-dimethyl-4-hydroxyphenyl)methyl]-1,2,3-trihydroxybenzene, 1,4-bis[1-bis(3, 4-dihydroxyphenyl)-1-methylethyl]benzene, 1,4-bis[1-bis-(2,3,4-trihydroxyphenyl)-1-methylethyl]benzene, 2,4-bis[(4-hydroxyphenyl)methyl]-1,3-dihydroxybenzene, 2-[bis(3-methyl-4-hydroxyphenyl)methyl]phenol, 4-[bis(3-methyl-4-hydroxyphenyl)methyl]phenol, 2-[bis(2-methyl-4-hydroxyphenyl)methyl]phenol, 4-[bis(3-methyl-4-hydroxyphenyl)methyl]-1,2-dihydroxybenzene, 4-[bis(4-hydroxyphenyl)methyl]-2-ethoxyphenol, 2-[bis(2,3-dimethyl-4-hydroxyphenyl)methyl]phenol, 4-[bis(3,5-dimethyl-4-hydroxyphenyl)methyl]phenol, 3-[bis(3,5-dimethyl-4-hydroxyphenyl)methyl]phenol, 2-[bis(2-hydroxy-3,6-dimethylphenyl)methyl]phenol, 4-[bis(2-hydroxy-3,6-dimethylphenyl)methyl]phenol, 4-[bis(3,5-dimethyl-4-hydroxyphenyl)methyl]-2-methoxyphenol, 3,6-[bis(3,5-dimethyl-4-hydroxyphenyl)methyl]-1,2-dihydroxybenzene, 4,6-[bis(3,5-dimethyl-4-hydroxyphenyl)methyl]-1,2,3-trihydroxybenzene, 2-[bis(2,3,6-trimethyl-4-hydroxyphenyl)methyl]phenol, 2-[bis(2,3,5-trimethyl-4-hydroxyphenyl)methyl]phenol, 3-[bis(2,3,5-trimethyl-4-hydroxyphenyl)methyl]phenol, 4-[bis(2,3,5-trimethyl-4-hydroxyphenyl)methyl]phenol, 4-[bis(2,3,5-trimethyl-4-hydroxyphenyl)methyl]-1,2-dihydroxybenzene, 3-[bis(2-methyl-4-hydroxy-5-cyclohexylphenyl)methyl]phenol, 4-[bis(2-methyl-4-hydroxy-5-cyclohexylphenyl)methyl] phenol, 4-[bis(2-methyl-4-hydroxy-5-cyclohexylphenyl) methyl]-2-methoxyphenol, 2,4,6-[tris(4-hydroxyphenylmethyl)]-1,3-dihydroxybenzene, 1,1,2,2-tetra(3-methyl-4-hydroxyphenyl)ethane, 1,1,2,2-tetra(3,5-dimethyl-4-hydroxyphenyl)ethane, 1,4-[[bis(4-hydroxyphenyl)methyl]] benzene, 1,4-di[bis(3-methyl-4-hydroxyphenyl)methyl] benzene, 1,4-di[bis(3,5-dimethyl-4-hydroxyphenyl)methyl] benzene, 4-[1,1-bis(4-hydroxyphenyl)ethyl]aniline, (2,4-dihydroxyphenyl)(4-hydoxyphenyl)ketone, 2-[bis(4-hydroxyphenyl)methyl]phenol, and 1,3,3-tri(4-hydroxyphenyl)butane. One of them may be used alone and a plurality of them may be used in combination.

The copolymerization ratio of the polyphenol is preferably less than 5 mol. % and more preferably less than 1 mol. %. The membrane formability can be maintained by controlling the ratio to be less than 5 mol. %.

One of preferable embodiments of the polymer electrolytic material of the invention contains a divalent group having an aromatic ring (hereinafter, referred to as embodiment 2 in some cases).

In the case a conventional polymer having an ionic group is used alone as a polymer electrolytic material, if the content of the ionic group is increased so as to increase the proton conductivity, the polymer electrolytic material is converted to be easily soluble in fuel such as an aqueous alcohol solution and therefore, the water content of the polymer electrolytic material is increased and the low freezing point water and bulk water in the polymer electrolytic material are increased to result in fuel cross-over and accordingly, it becomes impossible to suppress the fuel cross-over and at the same time to maintain the high proton conductivity.

On the other hand, in the embodiment 2, some of divalent groups having aromatic rings work as components effective to provide fuel shutting property and some works as components effective to provide membrane formability and others work as components having both effects. Use of a polymer into which the components effective to provide fuel shutting property and/or the components effective to provide membrane formability makes it possible to obtain a polymer electrolytic material having high proton conductivity, small fuel cross-over, soluble in many common solvents, and easy to be subjected to formation process such as membrane formation. Further, owing to the existence of the components providing the fuel shutting property, swelling in fuel such as water and alcohol is suppressed and the membrane strength deterioration can be suppressed.

On the other hand, in this embodiment, since a polymer containing a component effective to provide the fuel shutting property or a component effective to provide membrane formability, a polymer electrolytic material having high proton conductivity, excellent in mechanical strength, capable of suppressing fuel cross-over, soluble in solvents, and excellent in membrane formability can be obtained. The types of the polymer composing the polymer electrolytic material may be, for example, a block polymer, a random polymer, and a reciprocating polymer.

A polymer electrolytic material comprising a group defined by the following general formula (II) as the divalent group having an aromatic ring in the embodiment 2 is preferable. The group defined by the general formula (II) is a component effective to provide membrane formability.

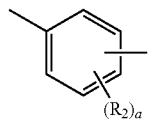

(II)

(In the formula, $R_2$ represents a hydrogen atom, a halogen atom, a monovalent organic group, or an ionic group; a represents an integer of 0 to 4; and two or more groups having different $R_2$ and/or a may be contained in the polymer electrolytic material.)

As the monovalent organic group to be used for $R_2$ in the general formula (II), an alkyl, an aryl, an alkylallyl, a cycloalkyl, an arylalkyl, a hologenated alkyl, an alkylaryl, and a halogenated aryl can be exemplified. As the ionic group, a sulfonic acid group, a sulfuric acid group, a sulfonimide group, a phosphonic acid group, a phosphoric acid group, and a carboxylic acid group can be exemplified.

A polymer electrolytic material comprising a group defined by the following general formula (III) as the divalent group having an aromatic ring in the embodiment 2 is also preferable. The group defined by the general formula (III) is a component effective to provide membrane formability.

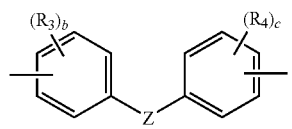

(III)

(In the formula, $R_3$ and $R_4$ represent a hydrogen atom, a halogen atom, a monovalent organic group, or an ionic group; b and c represent an integer of 0 to 4; Z represents direct bond, —O—, —S—, —Se—, —CQ$_1$Q$_2$-, an alkylene, an arylene, analkylidene group, or a cycloalkylidene group; $Q_1$ and $Q_2$ may be same or different and represent a hydrogen atom, a halogen atom, an alkyl, a halogen-substituted alkyl or aryl; either one of $Q_1$ and $Q_2$ is at least one group selected from a hydrogen atom, a halogen group, an alkyl, and a halogen-substituted alkyl; and two or more groups having different $R_3$, $R_4$ and/or b and c may be contained in the polymer electrolytic material.)

As the monovalent organic group to be used for $R_3$ and $R_4$ in the general formula (III), an alkyl, an aryl, an alkylallyl, a cycloalkyl, an arylalkyl, a hologenated alkyl, an alkylaryl, and a halogenated aryl can be exemplified. As the ionic group, a sulfonic acid group, a sulfuric acid group, a sulfonimide group, a phosphonic acid group, a phosphoric acid group, and a carboxylic acid group can be exemplified.

In the above-mentioned general formula (III), the availability of raw materials and the extent of the effect to provide the membrane formability, Z is further preferable to represent —CQ$_1$Q$_2$- and in this case $Q_1$ and $Q_2$ may be same or different and represent a hydrogen atom, a halogen atom, an alkyl, a halogen-substituted alkyl or aryl; either one of $Q_1$ and $Q_2$ is at least one group selected from a hydrogen atom and a halogen-substituted alkyl.

A polymer electrolytic material comprising a group defined by the following general formula (IV) as the divalent group having an aromatic ring in the embodiment 2 is also preferable. Inventors of the invention have found that the group defined by the general formula (IV) is a component remarkably high effect to provide the fuel shutting property and is thus capable of significantly suppress the fuel cross-over.

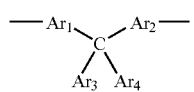

(IV)

(In the formula, $Ar_1$ to $Ar_4$ represent an aryl or an arylene and may having a substituent group; $Ar_1$ to $Ar_4$ may be bonded one or more optional positions; and two or more groups having different $Ar_1$ to $Ar_4$ may be contained in the polymer electrolytic material.)

As practical examples of the group defined by the general formula (IV), groups defined by the following general formulas (B1) to (B6) can be exemplified.

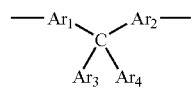

(B1)

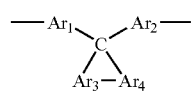

(B2)

(B3)

(B4)

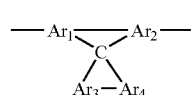

(B5)

(B6)

Herein, practical examples of $Ar_1$ to $Ar_4$ are an aryl group such as a phenyl, an alkylphenyl, an arylphenyl, a halogen-substituted phenyl, a halogen-substituted alkylphenyl, a naphthyl, an alkylnaphthyl, a halogen-substituted naphthyl, an anthracyl; and arylene groups corresponding to them. In terms of the solubility in solvents, easiness of polymerization of the high molecular weight polymer, and availability, more preferable groups for $Ar_1$ to $Ar_4$ are an aryl group such as a phenyl, an alkylphenyl, an arylphenyl, a naphthyl, and arylene groups corresponding to them.

Among the groups defined by the general formula (IV), in terms of the fuel cross-over suppressing effect and the industrial availability, the group defined by the following formula (IV-2) is more preferable and the group defined by the following formula (IV-3) is furthermore preferable.

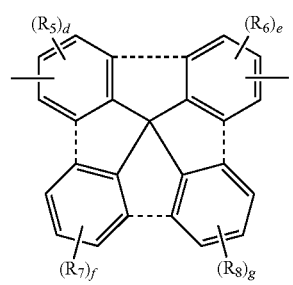

(IV-2)

-continued

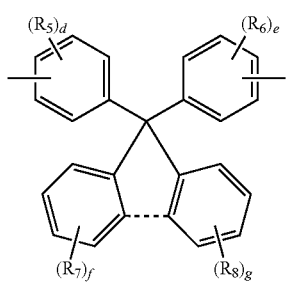
(IV-3)

(In the formulas (IV-2) and (IV-3), the dotted lines may be bonded or may not be bonded; $R_5$ to $R_8$ represent a halogen atom, a monovalent organic group or an ionic group; d and e represent an integer of 0 to 4; f and g represents an integer of 0 to 5; and two or more groups having different $R_5$ to $R_8$ and/or d to g may be contained in the polymer electrolytic material.)

In the formulas (IV-2) and (IV-3), in the case d to g satisfy $d+e+f+g \geqq 2$, the groups defined by the formulas (IV-2) and (IV-3) have both effects of providing the fuel shutting property and providing membrane formability and therefore, it is preferable. Also, if at least two among $R_5$ to $R_8$ in the general formula (IV-3) are an alkyl, the raw material is made easily available and both effects of providing the fuel shutting property and providing membrane formability are more significant and therefore, it is more preferable.

As the monovalent organic group to be used for $R_5$ to $R_8$ in the formulas (IV-2) and (IV-3), an alkyl, an aryl, an alkylallyl, a cycloalkyl, an arylalkyl, a hologenated alkyl, an alkylaryl, and a halogenated aryl can be exemplified. As the ionic group, a sulfonic acid group, a sulfuric acid group, and a sulfonimide group can be exemplified.

More preferable examples of the group defined by the general formula (IV-2) or (IV-3) are groups defined by the following formulas (b1) to (b6).

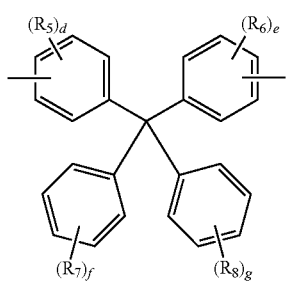
(b1)

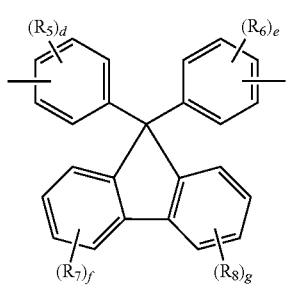
(b2)

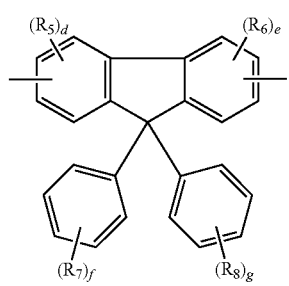
(b3)

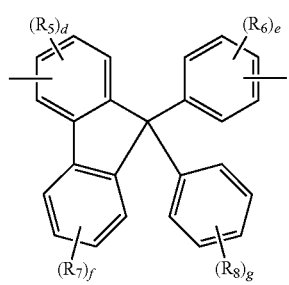
(b4)

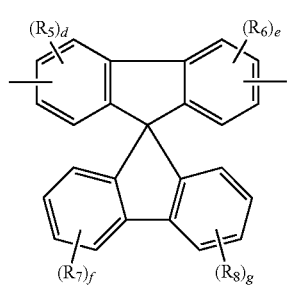
(b5)

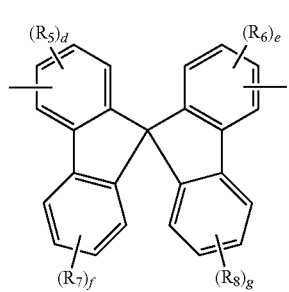
(b6)

As the types of the polymer to be used for the polymer electrolytic material (the embodiment 2) of the invention, polymers having an ionic group and excellent in hydrolysis resistance are preferable. Practical examples of it are ionic group-containing aromatic hydrocarbon type polymers such as ionic group-containing polyphenylene oxides, ionic group-containing polyether ketones, ionic group-containing polyether ether ketones, ionic group-containing polyether sulfones, ionic group-containing polyether ether sulfones, ionic group-containing polyether phosphine oxides, ionic group-containing polyether ether phosphine oxides, ionic group-containing polyphenylene sulfides, ionic group-containing polyamides, ionic group-containing polyimides, ionic group-containing polyether imides, ionic group-containing polyimidazoles, ionic group-containing polyoxazoles, ionic group-containing polyphenylenes.

A synthesis method of these polymers is not particularly limited if the above-mentioned properties and conditions are satisfied and for example, the ionic group may be introduced into the polymers obtained by polymerization or the ionic group may be introduced into a monomer and then the monomer may be polymerization to obtain the polymers.

Among them, in terms of the easiness of production of a high molecular weight polymer with good mechanical strength and good solubility in solvents, and hydrolysis resistance, a polymer defined by the following general formula (V) is more preferable.

(V)

(In the formula, E represents a divalent group having an aromatic ring and defined by general formula (II), (III), (IV), (IV-2) or (IV-3); $Ar_5$ to $Ar_6$ represent an (un)substituted arylene; W represents a divalent electron attractive group; Y represents oxygen, sulfur, or selenium; E, $Ar_5$, $Ar_6$, W and/or Y may represent two or more groups, respectively.)

With respect to E in the formula (V), it is preferable that a divalent phenol residual group defined by one of (IV), (IV-2), and (IV-3) is contained in terms of the membrane formability of the polymer electrolytic material and fuel cross-over decreasing effect and the content is preferably 25 to 100 mol. % and more preferably 40 to 100 mol. %, to the amount of E. Control of the content to be 25 mol. % or higher, an actually effective fuel cross-over decreasing effect can be expected.

Further, in terms of the availability of the raw material and the extent of the fuel cross-over decreasing effect, those which contain a group defined by the general formula (IV-3) as E are particularly preferable.

In the general formula (V), in terms of the easiness of synthesis and easiness of obtaining high molecular weight polymers, groups preferable for $Ar_5$ and $Ar_6$ are an (un)substituted phenylene group, a naphthylene group, and an anthracylene group, and the (un)substituted phenylene group is particularly preferable.

In terms of the availability of the raw material and easiness of synthesis of the high molecular weight polymers, a group for W in the general formula (V) is preferably at least one group selected from —CO—, —SO$_2$—, and —P(R)O— (R is an optional organic group), and among them, —CO— which is particularly excellent in the membrane formability, swelling suppression to fuel such as water and alcohol, and fuel shutting out property is particularly preferable. In terms of easiness of the synthesis of the high molecular weight polymers, a group for Y is more preferably oxygen and sulfur and in terms of the solubility in solvents, oxygen is even more preferable. In the above-mentioned general formula (V), it is particularly preferable that W is —CO— and Y is oxygen.

As the embodiment 2 of the invention, those containing a group unit for —$Ar_5$—W—$Ar_6$— in the general formula (V) defined by the following general formula (VI) are also preferable.

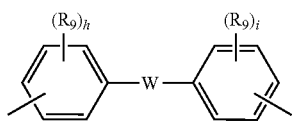

(VI)

(In the formula, W represents a divalent electron attractive group; $R_9$ represents at least one kind ionic group selected from sulfonic acid group, a sulfonimide group, a sulfuric acid group, a phosphonic acid group, a phosphoric acid group, and a carboxylic acid group; and h and i represents an integer of 1 to 4.)

Use of the polymer into which a group defined by the general formula (VI) for the polymer electrolytic material makes the polymer electrolytic material have high proton conductivity, soluble in many common solvents, easy for production and membrane formation processibility.

As a synthesis method of an aromatic polymer defined by the general formula (V), in the case above-mentioned Y is oxygen, the polymer can be synthesized by reaction of an aromatic active dihalide compound defined by the following general formula (C1) and a divalent phenol compound defined by the following general formula (C2).

(C1)

(In the formula (C1), G represents a halogen; and W, $Ar_5$, and $Ar_6$ respectively represent groups described above.)

(C2)

(In the formula (C2), E represents a group described above.)

The divalent group W in the aromatic active dihalide compound defined by the general formula (C1) is not, particularly limited if it is an electron attractive group. Practical examples of W are —CO—, —CONH—, —(CF$_2$)$_n$— (n is an integer of 1 to 10), —C(CF$_3$)$_2$—, —COO—, —SO$_2$—, —SO—, —PO(R$_1$)— (R$_1$ is an optional organic group), —CO-A-CO— (A is an optional divalent group containing an aromatic ring), and —SO$_2$—B—SO$_2$— (B is an optional divalent group containing an aromatic ring). Among them, in terms of easiness of synthesis of the high molecular weight polymer, membrane formability, and availability, —CO—, —SO$_2$—, and —PO(R$_1$)— are more preferable and in terms of the membrane formability and fuel shutting out property, —CO— is even more preferable.

A preferable embodiment of the organic group R$_1$ in the —PO(R$_1$)— is same as R$_1$ in the above-mentioned formula (I). Two or more different substituent groups for R$_1$ may be contained in this embodiment.

As $Ar_5$ and $Ar_6$ in the aromatic active dihalide compound defined by the general formula (C1), $Ar_5$ and $Ar_6$ are bonded to W and may be same and different. Also, two or more different aromatic active dihalide compounds defined by the general formula (C1) may be polymerized for the polymer electrolytic material.

Examples of the aromatic active dihalide compounds defined by the general formula (C1) are 4,4'-dichlorobenzophenone, 3,3'-disulfo-4,4'-dichlorobenzophenone and its salts, 4,4'-difluorobenzophenone, 3,3'-disulfo-4,4'-difluorobenzophenone and its salts, bis(4-chlorophenyl)sulfone, 3,3'-disulfo-4,4'-dichlorodiphenylsulfone and its salts, bis(4-fluorophenyl)sulfone, 3,3'-disulfo-4,4'-difluorodiphenylsulfone and its salts, bis(4-chlorophenyl)phenylphosphine oxide, sulfone compound and its salts of bis(4-chlorophenyl)phenylphosphine oxide, bis(4-fluorophenyl)phenylphosphine oxide, sulfone compound and its salts of bis(4-fluorophenyl)phenylphosphine oxide, bis(4-fluorophenyl)phenylphosphine oxide, bis(4-chlorophenyl)methylphosphine oxide, bis (4 -fluorophenyl)methylphosphine oxide, hexafluorobenzene, octafluorobiphenyl, 1,3-dicyanotetrafluorobenzene, 2,6-difluorobenzonitrile, 2,6-difluorobenzophenone, 2,6-difluorobenzotrinitrile, 4,4'-bis(4-fluorobenzoyl)diphenyl ether, 4,4'-bis(4-chlorobenzoyl)diphenyl ether, 4,4'-bis(4-fluorophenylsulfone)diphenyl ether, 4,4'-bis(4-chlorophenylsulfone)diphenyl ether, 4,4'-bis[phenoxy-4-(4-chlorobenzoyl)] diphenyl sulfone, and 4,4'-bis[phenoxy-4-(4-fluorobenzoyl)] diphenyl sulfone.

Among them, in terms of easiness of synthesis of the high molecular weight polymer and the industrial availability, more preferable examples are 4,4'-dichlorobenzophenone, 3,3'-disulfo-4,4'-dichlorobenzophenone and its salts, 4,4'-difluorobenzophenone, 3,3'-disulfo-4,4'-difluorobenzophenone and its salts, bis(4-chlorophenyl)sulfone, 3,3'-disulfo-4, 4'-dichlorodiphenylsulfone and its salts, bis(4-fluorophenyl) sulfone, 3,3'-disulfo-4,4'-difluorodiphenylsulfone and its salts, bis(4-chlorophenyl)phenylphosphine oxide, sodium salt of sulfone compound of bis(4-chlorophenyl)phenylphosphine oxide, bis(4-fluorophenyl)phenylphosphine oxide, sodium salt of sulfone compound of bis(4-fluorophenyl)phenylphosphine oxide, bis(4-chlorophenyl)methylphosphine oxide, and bis(4-fluorophenyl)methylphosphine and even more preferable examples are 4,4'-dichlorobenzophenone, 3,3'-disulfo-4,4'-dichlorobenzophenone and its salts, 4,4'-difluorobenzophenone, 3,3'-disulfo-4,4'-difluorobenzophenone and its salts, bis(4-chlorophenyl)sulfone, 3,3'-disulfo-4, 4'-dichlorodiphenylsulfone and its salts, bis(4-fluorophenyl) sulfone, and 3,3'-disulfo-4,4'-difluorodiphenylsulfone and its salts.

E in the divalent phenol in the general formula (C2) represents a divalent group having an aromatic ring and is defined by the above-mentioned general formula (II), (III), (IV), (IV-2), or (IV-3) and examples of compound defined by the general formula (C2) are hydroquinone, resorcinol, catechol, 4,4'-dihydroxybiphenyl, 3,3'-difluoro[(1,1'-biphenyl)-4,4'-diol], 3,3',5,5'-tetrafluoro[(1,1'-biphenyl)-4,4'-diol], 3,3'-dimethyl[(1,1'-biphenyl)-4,4'-diol], 5,5'-dimethyl[(1,1'-biphenyl)-2,2'-diol], 2,2'-methylenebisphenol, 2,2'-methylenebis[3,6-dimethylphenol], 2,2'-methylenebis[3,6-dimethylphenol], 4,4'-methylenebis[4-(1-methylethyl) phenol], 4,4'-methylenebis[2-methylphenol], 2,4'-methylenebisphenol, 4,4'-(1,2-ethane-di-yl)bisphenol, 4,4'-(1-methylethylidene)bisphenol, 4,4'-(1-methylethylidene) bis[2-methylphenol], 4,4'-(1-methylethylidene)bis[2-cyclohexylphenol], 2-[1-(4-hydroxyphenyl)-1-methylethylphenol], 3-[1-(4-hydroxyphenyl)-1-methylethylphenol], 4,4'-(2-methylpropylidene)bisphenol, 4,4'-(2-methylpropylidene)[2-methylphenol], 4,4'-cyclopentylidenebisphenol, 4,4'-cyclopentylidene[2-methylphenol], 4,4'-cyclopentylidene[2-cyclohexylphenol], 4,4'-cyclohexylidenebisphenol, 4,4'-cyclohexylidene[2-methylphenol], 4,4'-cyclohexylidene[2-cyclohexylphenol], 4,4'-(4-methylcyclohexylidenebisphenol), 4,4'-(4-methylcyclohexylidene [2-cyclohexylphenol]), 4-[1-[4-(4-hydroxyphenyl)-4-methyl-cyclohexyl]-1-methylethyl]phenol, 4-[1-[4-(4-hydroxy-3-methylphenyl)-4-methyl-cyclohexyl]-1-methylethyl]-2-methylphenol, dicyclopentadienylbis[4-methylphenol], bis (4-hydroxyphenyl)methanone, 4,4'-oxybisphenol, 4,4'-(dimethylsilylene)bisphenol, 4,4'-[2,2,2-trifluoro-1-(trifluoromethyl)ethylidene]bisphenol, 4,4'-methylenebis[2-fluorophenol], 2,2'-methylenebis[4-fluorophenol], 4,4'-isopropylidenebis[2-fluorophenol], 2,4-dihydroxybiphenyl, 2,5-dihydroxybiphenyl, 2,4-dihydroxy-methylbiphenyl, 2,5-dihydroxy-methylbiphenyl, 2,4-dihydroxy-ethylbiphenyl, 2,5-dihydroxy-methylbiphenyl, 2,4-dihydroxy-propylbiphenyl, 2,5-dihydroxy-propylbiphenyl, 2,4-dihydroxy-butylbiphenyl, 2,5-dihydroxy-butylbiphenyl, 2,4-dihydroxy-pentylbiphenyl, 2,5-dihydroxy-pentylbiphenyl, 2,4-dihydroxy-hexylbiphenyl, 2,5-dihydroxy-hexylbiphenyl, 2,4-dihydroxy-dimethylbiphenyl, 2,5-dihydroxy-dimethylbiphenyl, 2,4-dihydroxy-diethylbiphenyl, 2,5-dihydroxy-diethylbiphenyl, 2,4-dihydroxy-dieproylbiphenyl, 2,5-dihydroxy-diproylbiphenyl, 4-dihydroxy-dibutylbiphenyl, 2,5-dihydroxy-dibutylbiphenyl, phenoxyhydroquinone, phenoxyresorcinol, methylphenoxyhydroquinone, methylphenoxyresorcinol, ethylphenoxyhydroquinone, ethylphenoxyresorcinol, propylphenoxyhydroquinone, propylphenoxyresorcinol, butylphenoxyhydroquinone, butylphenoxyresorcinol, pentylphenoxyhydroquinone, pentylphenoxyresorcinol, hexylphenoxyhydroquinone, hexylphenoxyresorcinol, dimethylphenoxyhydroquinone, dimethylphenoxyresorcinol, diethylphenoxyhydroquinone, diethylphenoxyresorcinol, dipropylphenoxyhydroquinone, dipropylphenoxyresorcinol, dibutylphenoxyhydroquinone, dibutylphenoxyresorcinol,. 2,4-dihydroxybenzophenone, 2,5-dihydroxybenzophenone, 2,4-dihydroxymethylbenzophenone, 2,5-dihydroxymethylbenzophenone, 2,4-dihydroxyethylbenzophenone, 2,5-dihydroxyethylbenzophenone, 2,4-dihydroxypropylbenzophenone, 2,5-dihydroxypropylbenzophenone, 2,4-dihydroxybutylbenzophenone, 2,5-dihydroxybutylbenzophenone, 2,4-dihydroxypentylbenzophenone, 2,5-dihydroxypentylbenzophenone, 2,4-dihydroxyhexylbenzophenone, 2,5-dihydroxyhexylbenzophenone, 2,4-dihydroxydimethylbenzophenone, 2,5-dihydroxydimethylbenzophenone, 2,4-dihydroxydiethylbenzophenone, 2,5-dihydroxydiethylbenzophenone, 2,4-dihydroxydipropylbenzophenone, 2,5-dihydroxydipropylbenzophenone, 2,4-dihydroxydibutylbenzophenone, phenylthiohydroquinone, phenylthioresorcinol, methylphenylthiohydroquinone, methylphenylthioresorcinol, ethylphenylthiohydroquinone, ethylphenylthioresorcinol, propylphenylthiohydroquinone, propylphenylthioresorcinol, butylphenylthiohydroquinone, butylphenylthioresorcinol, pentylphenylthiohydroquinone, pentylphenylthioresorcinol, hexylphenylthiohydroquinone, hexylphenylthioresorcinol, dimethylphenylthiohydroquinone, dimethylphenylthioresorcinol, diethylphenylthiohydroquinone, diethylphenylthioresorcinol, dipropylphenylthiohydroquinone, dipropylphenylthioresorcinol, dibutylphenylthiohydroquinone, dibutylphenylthioresorcinol, 4-dihydroxyphenylphenylsulfone, 2,5-dihydroxyphenylphenylsulfone, 2,4-dihydroxyphenylmethylphenylsulfone, 2,5-dihydroxyphenylmethylphenylsulfone, 2,4-dihydroxyphenylethylphenylsulfone, 2,5-dihydroxyphenylethylphenylsulfone, 2,4-dihydroxyphenylpropylphenylsulfone, 2,5-dihydroxyphenylpropylphenylsulfone, 2,4-dihydroxyphenylbutylphenylsulfone, 2,5-dihydroxyphenylbutylphenylsulfone, 2,4-dihydroxyphenylpentylphenylsulfone, 2,5-dihydroxyphenylpentylphenylsulfone, 2,4-dihydroxyphenylhexylphenylsulfone, 2,5-dihydroxyphenylhexylphenylsulfone, 2,4-dihydroxyphenyldimethylphenylsulfone, 2,5-dihydroxyphenyldimethylphenylsulfone, 2,4-dihydroxyphenyldiethylphenylsulfone, 2,5-dihydroxyphenyldiethylphenylsulfone, 4-dihydoxy-4'-phenoxybenzophenone, 2,5-dihydoxy-4'-phenoxybenzophenone, 2,4-dihydoxy-4'-methylphenoxybenzophenone, 2,5-dihydoxy-4'-methylphenoxybenzophenone, 2,4-dihydoxy-4'-ethylphenoxybenzophenone, 2,5-dihydoxy-4'-ethylphenoxybenzophenone, 2,4-dihydoxy-4'-propylphenoxybenzophenone, 2,5-dihydoxy-4'-propylphenoxybenzophenone, 2,4-dihydoxy-4'- butylphenoxybenzophenone, 2,5-dihydoxy-4'-butylphenoxybenzophenone, 4-phenylmethyl-1,3-benzenediol, 2-phenylmethyl-1,4-benzenediol, 4-(1-methyl-phenylethyl)-1,3-benzenediol, 3-(1-methyl-phenylethyl)-1,4-benzenediol, 5,5'-(1-methylethylidene)bis[1,1'-(biphenyl)-2-ol], 5,5'-(1,1-cyclopentylidene)bis[1,1'-(biphenyl)-2-ol], 5,5'-(1,1-cyclohexylidene)bis[1,1'-(biphenyl)-2-ol], 5'-(1-phenylethylidene)bis[1,1'-(biphenyl)-2-ol], 5,5'-(1-phenylpropylidene)bis[1,1'-(biphenyl)-2-ol], 5,5'-(1-phenylbutylidene)bis[1,1'-(biphenyl)-2-ol], 2,2'-methylenebis[1,1'-biphenyl-4-ol], 2,2'-ethylenebis[1,1'-biphenyl-4-ol], 4,4'-(1-phenylethylidene)bisphenol, 4,4'-(1-phenylethylidene)-(2-methylphenol), 4,4'-(1-phenylethylidene)-(3-methylphenol), 4,4'-(1-phenylethylidene)-(2-phenylphenol), 4,4'-(4-methylphenylmethylene)bis(2-methylphenol), 4,4'-(4-methylphenylmethylene)bis(2,3-dimethylphenol), 4,4'-(diphenylmethylene)bisphenol, 4,4'-(diphenylmethylene)bis(2-methylphenol), 4,4'-(diphenylmethylene)bis(2-fluorophenol), 4,4'-(diphenylmethylene)bis(2,6-difluorophenol), 4,4'-[4-(1,1'-biphenyl)methylene]bisphenol, 4,4'-[4-(1,1'-biphenyl)methylene](2-methylphenol), 4,4'-(1-phenylmethylidene)bisphenol, 4,4'-(1-phenylmethylidene)bis(2-methylphenol), 4,4'-(1-phenylmethylidene)bis(2-cyclohexylphenol), 4,4'-(4-methyl-phenylmethylene)bis(5-methylphenol), 4,4'-(4-methyl-phenylmethylene)bis(2-cyclohexylphenol), 4,4'-(4-methyl-phenylmethylene)bis(2-cyclohexyl-5-methylphenol), 5,5-[4-(1,1'-biphenyl)methylene]bis[(1,1'-biphenyl)-2-ol], 4,4'-[4-(1,1'-biphenyl)methylene]bis(2-cyclohexylphenol), 4,4'-[4-(1,1'-biphenyl)methylene]bis(2-cyclohexyl-5-methylphenol), 4,4'-[(4-fluorophenyl)methylene]bisphenol, 4,4'-(phenylmethylene)bis(2-fluorophenol), 5,5'-(1-phenylethylidene)bis[(1,1'-biphenyl)-2-ol], 4,4'-(1-phenylethylidene)bis(2-cyclohexylphenol), 2,2-bis(4-hydroxyphenyl)-1,1,1,3,3,3-hexafluoropropane, 1,2-bis(4-hydroxyphenyl)-1,1,2,2-tetrafluoroethane, 4,4'-(9H-fluoren-9-ylidene)bis[2-methylphenol], 2,2'-(9H-fluoren-9-ylidene)bis[4-methylphenol], 4,4'-(9H-fluoren-9-ylidene)bis[2,5-dimethylphenol], 4,4'-(9H-fluoren-9-ylidene)bis[2,6-dimethylphenol], 4,4'-(9H-fluoren-9-ylidene)bis[2-cyclohexylphenol], 4,4'-(9H-fluoren-9-ylidene)bis[2-cyclohexyl-5-methylphenol], 4,4'-(diphenylmethylene)bis[2-methylphenol], 4,4'-(9H-fluoren-9-ylidene)bisphenol, 4,4'-(9H-fluoren-9-ylidene)bis[2-fluorophenol], 2,2'-(9H-fluoren-9-ylidene)bis[4-fluorophenol], 4,4'-(9H-fluoren-9-ylidene)bis[2-phenylphenol], 2,2'-(9H-fluoren-9-ylidene)bis[4-phenylphenol], 4,4'-dihydroxytetraphenylmethane, and 2,2'-dihydroxy-9,9'-spirofluorene.

Among these divalent phenols, in terms of industrial availability and effects of providing the membrane formability and fuel shutting property, more preferable examples are hydroquinone, resorcinol, 4,4'-dihydroxybiphenyl, 1,1-bis(4-hydroxyphenyl)methane, 1,1-bis(4-hydroxyphenyl)ethane, 1,1-bis(4-methyl-2-hydroxyphenyl)methane, 2,2-bis(4-hydroxyphenyl)propane, 4,4'-cyclohexylidenebisphenol, 4,4'-(1-phenylethylidene)bisphenol, phenylhydroquinone, 2,5-hydroxy-4'-methylbiphenyl, α, α'-bis(4-hydroxyphenyl)-1,4-isopropylbenzene, 2,2-bis(4-hydroxyphenyl)-1,1,1,3,3,3-hexafluoropropane, 1,2-bis(4-hydroxyphenyl)-1,1,2,2-tetrafluoroethane, 4,4'-(9H-fluoren-9-ylidene)bis[2-methylphenol], 4,4'-(9H-fluoren-9-ylidene)bis[4-methylphenol], 4,4'-(9H-fluoren-9-ylidene)bis[2-methylphenol], 2,2'-(9H-fluoren-9-ylidene)bis[2-phenylphenol], 4,4'-(9H-fluoren-9-ylidene)bis[2,5-dimethylphenol], 4,4'-(9H-fluoren-9-ylidene)bis[2,6-dimethylphenol], 4,4'-(9H-fluoren-9-ylidene)bis[2-cyclohexyphenol], 4,4'-(9H-fluoren-9-ylidene)bis[2-cyclohexyl-5-methylphenol], 4,4'-dihydroxytetraphenylmethane, and 4,4'-dihydroxytetra(3-methylphenyl)methane.

Among them, in terms of effects of providing the fuel shutting property and membrane formability, further preferable examples are hydroquinone, phenylhydroquinone, 2,5-hydroxy-4'-methylbiphenyl, 4,4'-(1-phenylethylidene)bisphenol, 2,2-bis(4-hydroxyphenyl)-1,1,1,3,3,3-hexafluoropropane, 1,2-bis(4-hydroxyphenyl)-1,1,2,2-tetrafluoroethane, 4,4'-(9H-fluoren-9-ylidene)bis[2-methylphenol], 4,4'-(9H-fluoren-9-ylidene)bisphenol, 4,4'-(9H-fluoren-9-ylidene)bis[2-phenylphenol], and 4,4'-dihydroxytetra(3-methylphenyl)methane and even more preferable examples ate hydroquinone, phenylhydroquinone, 2,5-hydroxy-4'-methylbiphenyl, 4,4'-(9H-fluoren-9-ylidene)bisphenol, 4,4'-dihydroxytetra(3-methylphenyl)methane, 4,4-(9H-fluoren-9-ylidene)bis[2-methylphenol], and 4,4'-(9H-fluoren-9-ylidene)bis[2-phenylphenol].

One kind of the divalent phenol compounds defined by the formula (C2) may be used alone or a plurality of kinds of them may be used in combination.

The use ratio of the aromatic active dihalide compounds defined by the formula (C1) and the divalent phenol compounds defined by the formula (C2) is preferably 45 to 55 mol. %, more preferably 48 to 52 mol. % for the divalent phenol compounds defined by the formula (C2) and preferably 55 to 45 mol. %, more preferably 52 to 48 mol. % for the aromatic active dihalide compounds defined by the formula (C1). If the use ratio of the divalent phenol compounds defined by the formula (C2) is in a range of 45 to 55 mol. %, the molecular weight of the polymer tends to be increased and the coatability for a coating becomes excellent and therefore, it is preferable.

The weight average molecular weight of the polyether type copolymers obtained from the aromatic active dihalide compounds defined by the formula (C1) and the divalent phenol compounds defined by the formula (C2) by a GPC method is preferably 10,000 to 5,000,000, more preferably 30,000 to 1,000,000. Adjustment of it to be 10,000 or higher, the membrane formability and strength can be obtained and crack formation in a formed membrane can be prevented. On the other hand, adjustment of it to be 5,000,000 or lower, the solubility can be sufficient and the solution viscosity increase can be suppressed and the good processibility can be obtained.

The polymers to be used for the polymer electrolytic material of the invention may be copolymerized with other components without departing from the true spirit and scope of the invention.

With respect to the polyvalent phenol, the same features and advantages of the embodiment 1 can be applied.

The structure of the polyether type copolymers can be confirmed by C=O absorption at 1,640 to 1,660 cm$^{-1}$ by, for example, infrared absorption spectrum and also the structure can be confirmed depending on the peak of the aromatic proton of 6.8 to 8.0 ppm by nuclear magnetic resonance spectrum (1H-NMR).

The above-mentioned polyether type copolymers can be obtained by heating the aromatic active dihalide compounds defined by the formula (C1) and the divalent phenol compounds defined by the formula (C2) in a solvent in the presence of an alkali metal compound.

Examples of the alkali metal compound to be used in this case may include sodium hydroxide, potassium hydroxide, lithium hydroxide, sodium carbonate, potassium carbonate, lithium carbonate, sodium hydrogen carbonate, potassium hydrogen carbonate, lithium hydrogen carbonate, sodium hydride, potassium hydride, lithium hydride, metal sodium, metal potassium, and metal lithium. They may be used alone and two or more of them may be used in combination. The use amount of the alkali metal compound is preferably 100 to 400 mol. % and more preferably 100 to 250 mol. % to the amount of the divalent phenol compound.

As the solvent to be used for the reaction, benzophenone, diphenyl ether, dialkoxybenzene (the number of carbon atoms of the alkoxy group is 1 to 4), trialkoxybenzene (the number of carbon atoms of the alkoxy group is 1 to 4), diphenylsulfone, dimethyl sulfoxide dimethylsulfone, diethyl sulfoxide, diethylsulfone, diisopropylsulfone, sulfolane, N-methyl-2-pyrrolidone, N-ethyl-2-pyrrolidone, dimethyl imidazolidinone, γ-butyrolactone, dimethylformamide, and dimethylacetamide. They may be used alone or two or more of them may be used in combination.

As the reaction concentration at the time of synthesizing polyether type copolymers, the weight of monomers is preferably 2 to 50% by weight in the total. weight of the reaction system including the solvent and the reaction temperature is preferably 50 to 250° C. To remove the metal salts generated at the time of polymer synthesis and unreacted monomers, it is preferable to filter the reaction solution, or re-precipitate the reaction solution in a solvent, which is a bad solvent to the polymer, or carry out washing with an aqueous acidic or alkaline solution.

Hereinafter, a method of introducing an ionic group into the embodiment 1 or embodiment 2 of the polymer electrolytic material of the invention will be described.

As the method of introducing an ionic group into the above-mentioned polyether type copolymer, the ionic group may be introduced into the polymer or a monomer having the ionic group may be polymerized.

Introduction of the phosphonic acid into the polymer is made possible by a method described, for example, in "Polymer Preprints", Japan, 51, 750 (2002). Introduction of the phosphonic acid group into a polymer is made possible by, for example, phosphoric acid esterification of a polymer having hydroxyl groups. Introduction of the carboxylic acid group into a polymer is made possible by, for example, oxidation of a polymer having alkyl groups and hydroxyalkyl groups.

Introduction of the sulfonimide group into a polymer is made possible by, for example, treating a polymer having sulfonic acid groups with an alkylsulfone amide. Introduction of the sulfuric acid group into a polymer is made possible by, for example, sulfuric acid esterification of a polymer having hydroxyl groups.

Introduction of the sulfonic acid group into a polymer is made possible by, for example, reaction of the polymer with chlorosulfonic acid. In the case of sulfonation of the polymer by this method, the extent of the sulfonation can easily be controlled by the use amount of the chlorosulfonic acid, reaction temperature, and reaction time. Further, although the reason is not clear, the ratios Rw1, Rw2 and/or Wnf of the unfreezable water in the invention can be obtained by sulfonation by the method and high conductivity and fuel cross-over suppression can be satisfied simultaneously. On the other hand, it is sometimes difficult to control the sulfonic acid group density by the method by reaction with concentrated sulfuric acid and fuming sulfuric acid and accordingly it tends to become difficult to obtain the ratios Rw1, Rw2 and/or Wnf of the unfreezable water in the invention and therefore, it is not desirable.

As the method of polymerizing the monomer having the ionic group, the polymerization can be carried out by a method described in "Polymer Preprints", 41(1), (2000) 237. In the case of obtaining the polymer by this method, the degree of the sulfonation can easily be controlled by the loading ratio of a monomer having the sulfonic acid group. Further, it is supposed because the sulfonic acid group can be introduced in random, the solubility is considerably improved as compared with that in the case the sulfonic acid group is introduced into the polymer later. Accordingly, a polymer soluble in solvents and excellent in mechanical strength can be obtained in the case the polymer is one containing the group defined by the above-mentioned formula (VI) by the method of polymerizing the monomer having the sulfonic acid group, so that the ratios Rw1, Rw2 and/or Wnf of the unfreezable water in the invention can be achieved and thus the high proton conductivity and the fuel cross-over suppression can be satisfied simultaneously.

With respect to the embodiment 1 and the embodiment 2 of the polymer electrolytic material of the invention, in the case they have a non-crosslinked structure, their weight average molecular weight by GPC method is preferably 10,000 to 5,000,000, more preferably 30,000 to 1,000,000. Adjustment of it to be 10,000 or higher, the mechanical strength sufficient to make the polymer usable for the polymer electrolytic material can be obtained. On the other hand, adjustment of it to be 5,000,000 or lower, sufficient solubility can be obtained and the solution viscosity can be prevented from increasing to be too high and the good processibility can be maintained.

In the case of using the polymer electrolytic material of the invention for a fuel cell, it can be used for a variety of polymer electrolytic members. Examples of the polymer electrolytic members are a polymer electrolytic membrane and an electrode catalyst layer.

Hereinafter, a method of producing a polymer electrolytic membrane of the preferable embodiment 1 and embodiment 2 of the polymer electrolytic material of the invention will be described. As the method of converting a sulfonic acid group-containing polymer into a membrane, a method involving forming a membrane from a polymer of —$SO_3M$ type (M is a metal) in a solution state, carrying out high temperature heat treatment thereafter, and carrying out proton replacement can be exemplified. The above-mentioned metal M may be a metal which can form a salt of sulfonic acid and in terms of the cost and the environmental load, Li, Na, K, Rb, Cs, Mg, Ca, Sr, Ba, Ti, V, Mn, Fe, Co, Ni, Cu, Zn, Zr, Mo, and W are preferable and among them, Li, Na, K, Ca, Sr, and Ba are more preferable and Li, Na, and K are even more preferable. Although the reason is not clear, the ratios Rw1, Rw2 and/or Wnf of the unfreezable water in the invention can be achieved by the membrane formation by the method and thus the high proton conductivity and the fuel cross-over suppression can be satisfied simultaneously.

The temperature of the heat treatment is preferably 200 to 500° C., more preferably 250 to 400° C., and even more preferably 300 to 350° C. in terms of the ratio of the unfreezable water of the membrane to be obtained and the fuel shutting property. Adjustment of the temperature to be 200° C. or higher is preferable for obtaining the ratio of the unfreezable water defined by the invention. On the other hand, adjustment of the temperature to be 500° C. or lower prevents decomposition of the polymer.

The heat treatment time is preferably 1 minute to 24 hours, more preferably 3 minutes to 1 hour, and furthermore preferably 5 minutes to 30 minutes in terms of the proton conductivity and productivity. If the heat treatment time is too short, the effect is slight and the ratio of unfreezable water of the invention cannot be obtained in some cases and if the heat treatment time is too long, the polymer decomposition may occur and the proton conductivity may sometimes be decreased and the productivity is decreased.

As a method of producing a membrane from a polymer of —SO$_3$M type in a solution, a method involving immersing a crushed polymer of —SO$_3$M type in an aqueous solution of a M salt or M hydroxide; washing the polymer with sufficient water; drying the polymer; then dissolving the dried polymer in a non-protonic polar solvent; applying the obtained solution to a glass plate or membrane by a proper coating method; removing the solvent; and carrying out acid treatment can be exemplified.

As the coating method, techniques of spraying coating, brush coating, dip coating, die coating, curtain coating, float coating, spin coating, screen printing and the like can be employed.

As the solvent to be used for the membrane formation, those which can dissolve the polymer compound and be removed thereafter may be used and preferable examples to be used are non-protonic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide; ester type solvents such as γ-butyrolactone and butyl acetate; carbonate type solvents such as ethylene carbonate and propylene carbonate; alkylene glycol monoalkyl ethers such as ethylene glycol monomethyl ether, ethylene glycol monoethyl ether, propylene glycol monomethyl ether, propylene glycol monoethyl ether; and alcohol type solvents such as isopropanol.

The membrane thickness of the polymer electrolytic membrane of the polymer electrolytic material of the invention is generally preferable to be 3 to 2,000 µm. To obtain strength of the membrane durable for practical use, it is preferable to be thicker than 3 µm and to decrease the membrane resistance, which is to improve the power generation capability, it is preferable to be thinner than 2,000 µm. The membrane thickness is more preferably in a range of 5 to 1,000 µm and furthermore preferably in a range of 10 to 500 µm.

The membrane thickness can be controlled by a variety of methods. For example, in the case of producing the membrane by a solvent cast method, it can be controlled in accordance with the solution concentration or the application thickness on the substrate and,also, for example, in the case of producing the membrane by a cast polymerization method, it can be controlled in accordance with the spacer thickness between the plates.

The polymer electrolytic material of the invention may be mixed with additives to be used generally for a polymer compound such as a plasticizer, a stabilizer, and a release agent in a range without departing from the true spirit and scope of the invention.

The polymer electrolytic membrane produced from the embodiment 1 or 2 of the polymer electrolytic material of the invention may be crosslinked in the polymer structure by means of radiating radiation beam based on the necessity. It is expected that the effect to suppress the fuel cross-over and swelling with fuel can further be suppressed by crosslinking and accordingly, the mechanical strength may be improved and become more preferable. As the types of the radiation beam, electron beam radiation and γ-ray radiation can be exemplified.

Another preferable embodiment of the polymer electrolytic material of the invention is an ionic group-containing polymer electrolytic material having voids and a porosity 5 to 80% by volume and an average pore diameter of the voids smaller than 50 nm (hereinafter, sometimes referred to as embodiment 3).

Hereinafter, the polymer electrolytic material (the embodiment 3) will be described in detail.

As a polymer composing the polymer electrolytic material (the embodiment 3) of the invention may be a thermosetting resin or a crystalline or non-crystalline thermoplastic resin and may contain an inorganic substance or an inorganic oxide or an organic-inorganic composite and those which can form voids and are so composed as to allow the ionic group in the inside of the voids are employed.

One of monomers composing the polymer is, therefore, preferable to have an ionic group or allow the ionic group to be introduced into the polymer itself. The "introduction" means the state that the ionic group is chemically bonded to the polymer itself; and the state that the ionic group is not easily isolated by physical means such as washing, that is, the ionic group is adsorbed strongly to the polymer surface of the substance having the ionic group or the substance having the ionic group is doped.

In the polymer composing the polymer electrolytic material (the embodiment 3) of the invention, it is preferable that a repeating unit having the ionic group and a repeating unit having no ionic group reciprocally exist and the repeating continuity of the repeating unit having the ionic group is properly disrupted to the extent that the proton conductivity is not deteriorated. Accordingly, the portions of the repeating unit having the ionic group are prevented from containing an excess amount of the low freezing point water, that is, the fuel cross-over can be suppressed low. Additionally, the waterproofness of the polymer electrolytic material can be improved and crack formation and breakage can be suppressed.

In other words, a copolymer of a monomer having an ionic group or into which an ionic group can be introduced and another monomer which has no ionic group or into which no ionic group can be introduce is preferable. Further, in terms of the balance between the fuel cross-over and the proton conductivity, it is preferable that the unit having the ionic group and the unit having no ionic group are joined reciprocally, in other words, the reciprocally polymerized portions exit much. The copolymer having many portions of the reciprocally copolymerized repeating units can be obtained by copolymerizing vinyl monomers having a positive e value and a negative e value. Herein, the e value means the charged state of the vinyl group of the monomers and radical terminals and the e value of the Qe concept described in detail in "POLYMER HANDBOOK" J. BRANDRUP, et al.

Examples usable for the vinyl monomers in the embodiment 3 are those defined by the following general formulas (D1) to (D3).

$$CH_2=C(J_1)COOJ_2 \tag{D1}$$

(In the formula, J$_1$ represents a substituent group selected from a hydrogen atom, a methyl, and a cyano group; and J$_2$ represents a substituent group selected from a hydrogen atom, an alkyl having 1 to 20 carbon atoms, an aryl, and their derivatives.)

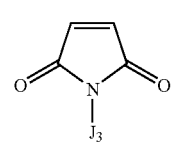

(D2)

(In the formula, $J_3$ represents a substituent group selected from an alkyl having 1 to 20 carbon atoms, an aryl, an aralkyl, and a cycloalkyl.)

$$CH_2=C(J_4)(J_5) \quad (D3)$$

(In the formula, $J_4$ represents a substituent group selected from a hydrogen atom and a methyl; and $J_2$ represents a substituent group selected from a hydrogen atom, a hydroxyl, a sulfonic acid group, an alkyl having 1 to 20 carbon atoms, a phenyl, a cyclohexyl, a cyano group, an amido; a halogen-containing alkyl, and their derivatives.)

Practical examples of the vinyl monomers are aromatic vinyl monomers such as acrylonitrile, methacrylonitrile, styrene, α-methylstyrene, p-methylstyrene, o-ethylstyrene, m-ethylstyrene, p-ethylstyrene, p-tert-butylstyrene, chlorostyrene, 1,1-diphenylethylene, vinylnaphthalene, vinylbiphenyl, indene, and acenaphthylene; (meth)acrylic acid type monomers such as methyl(meth)acrylate, cyclohexyl (meth)acrylate, isobornyl(meth)acrylate, adamantyl (meth)acrylate, phenyl(meth)acrylate, benzyl(meth)acrylate, 2-hydroxyethyl (meth)acrylate, 2-hydroxypropyl (meth)acrylate, 2-hydroxybutyl(meth)acrylate, lauryl (meth)acrylate, stearyl(meth)acrylate, isobutyl (meth)acrylate, and tert-butyl(meth)acrylate; N-methylmaleimide, N-n-butylmaleimide, N-phenylmaleimide, N-o-methylphenylmaleimide, N-m-methylphenylmaleimide, N-p-methylphenylmaleimide, N-o-hydroxyphenylmaleimide, N-m-hydroxyphenylmaleimide, N-p-hydroxyphenylmaleimide, N-o-methoxyphenylmaleimide, N-m-methoxyphenylmaleimide, N-p-methoxyphenylmaleimide, N-o-chlorophenylmaleimide, N-m-chlorophenylmaleimide, N-p-chlorophenylmaleimide, N-o-carboxyphenylmaleimide, N-m-carboxyphenylmaleimide, N-p-carboxyphenylmaleimide, N-o-nitrophenylmaleimide, N-m-nitrophenylmaleimide, N-p-nitrophenylmaleimide, N-ethylmaleimide, N-isopropylmaleimide, N-isobutylmaleimide, N-tert-butylmaleimide, N-cyclohexylmaleimide, N-benzylmaleimide, maleic anhydride, acrylic anhydride, methacrylic anhydride, crotonic anhydride, cinnamic anhydride, maleic acid, fumaric acid, citraconic acid, mesaconic acid, itaconic acid, methacrylsulfonic acid, 2-acrylamido-2-methylpropanesulfonic acid, sulfomethylstyrene, p-styrenesulfonic acid, sodium p-styrenesulfonate, potassium p-styrenesulfonate, vinylbenzoic acid, vinylbenzoic acid sodium salt, vinylbenzoic acid potassium salt, vinyl acetate, vinyl propionate, vinylsulfonic acid, vinyl sulfate; and fluorine-containing monomers such as 2,2,2-trifluoroethyl(meth)acrylate, 2,2,3,3-tetrafluoropropyl(meth)acrylate, 1H, 1H, 5H-octafluoropentyl(meth)acrylate, and 1H, 1H, 2H, 2H-heptafluorodecyl(meth)acrylate.

Among them, in terms of easiness of the introduction of the ionic group and the polymerization workability, aromatic vinyl monomers such as styrene, α-methylstyrene, vinylnaphthalene, vinylbiphenyl, indene, and acenaphthene are preferable to be used.

With respect to a combination, in the case an aromatic vinyl monomer with a negative e value such as styrene and α-methylstyrene is selected, use of a vinyl monomer with a positive e value and hard to introduce the ionic group into is preferable because of the reason described above and in terms of the fuel cross-over suppressing effect, acrylonitrile, methacrylonitrile, N-phenylmaleimide, N-isopropylmaleimide, N-cyclohexylmaleimide, N-benzylmaleimide, and fluorine-containing monomers such as 2,2,2-trifluoroethyl (meth)acrylate, 2,2,3,3-tetrafluoropropyl(meth)acrylate, 1H,1H,5H-octafluoropentyl(meth)acrylate, and 1H,1H,2H,2H-heptafluorodecyl(meth)acrylate are preferable.

The polymer electrolytic material (the embodiment 3) of the invention is preferable to have a crosslinked structure. The crosslinked structure is defined as described above. Owing to the crosslinked structure, expansion among the polymer chains due to penetration with water and fuel can be suppressed. Accordingly, an excess water content of the low freezing point water can be suppressed to low for the proton conductivity and also swelling and breakage by fuel can be suppressed and consequently, the fuel cross-over can be suppressed. Further, since the polymer chains can be restricted, the heat resistance, rigidity, and chemical resistance can be provided. Further, as described later, the morphology of the voids can be maintained excellently. Further, in the case of introducing the ionic group after polymerization, the ionic group can efficiently and selectively be introduced into the inner wall parts of the voids. The crosslinking may be chemical crosslinking and physical crosslinking. This crosslinked structure may be formed by copolymerization of polyfunctional monomers and radiating radiation beam such as electron beam and γ-ray. Particularly, crosslinking by polyfunctional monomers is preferable from a viewpoint of the cost.

Practical examples of the polyfunctinal monomers to be used for crosslinking structure formation are di-, tri-, tetra-, penta-, and hexa-(meth)acrylates of polyhydric alcohols such as ethylene glycol di(meth)acrylate, diethylene glycol di(meth)acrylate, triethylene glycol di(meth)acrylate, glycerol (di/tri)(meth)acrylate, trimethylolpropane (di/tri)(meth)acrylate, pentaerythritol (di/tri/tetra)(meth)acrylate, dipentaerythritol (di/tri/tetra/penta/hexa)(meth)acrylate, di(meth)acrylic acid biphenyl, and bisphenoxyethanol(meth)fluorenediacrylate; polyoxyethylene type polyethers such as polyethylene glycol di(meth)acrylate (preferably the average molecular weight of the polyethylene glycol portion: about 400 to 1,000), methoxypolyethylene glycol mono(meth)acrylate, di(meth)acrylate of bisphenol A ethylene oxide 30 mol addition product, di(meth)acrylate of glycerin ethylene oxide addition product, tri(meth)acrylate of glycerin ethylene oxide addition product, di(meth)acrylate of trimethylolpropane ethylene oxide addition product, tri(meth)acrylate of trimethylolpropane ethylene oxide addition product, di(meth)acrylate of sorbitol ethylene oxide addition product, di(meth)acrylate of sorbitol ethylene oxide addition product, tri(meth)acrylate of sorbitol ethylene oxide addition product, tetra(meth)acrylate of sorbitol ethylene oxide addition product, penta(meth)acrylate of sorbitol ethylene oxide addition product, and hexa(meth)acrylate of sorbitol ethylene oxide addition product; aromatic polyfunctional monomers such as o-divinylbenzene, m-divinylbenzene, p-divinylbenzene, divinylbiphenyl, and divinylnaphthalene; esters such as di(meth)acrylic acid ester, di(meth)acrylic acid diallyl ester, and divinyl adipate; diallyl compounds such as diethylene glycol bisallylcarbonate and diallyl phthalate; dienes such as butadiene, hexadiene, pentadiene, and 1,7-octadiene; monomers having a phosphazene skeleton obtained by introducing a polymerizable polyfunctional group and using dichlorophosphazene as a raw material; polyfunctional monomers having heteroatomic cyclic skeleton such as triallyl diisocyanurate; bismaleimide and methylenebisacrylamides.

Among them, in terms of the mechanical strength and chemical resistance at the time of introducing the ionic group, aromatic polyfunctional monomers such as divinylbenzene and di-, tri-, tetra-, penta-, and hexa-(meth)acrylates of polyhydric alcohols such as ethylene glycol di(meth)acrylate and bisphenoxyethanol(meth)fluorenediacrylate are particularly preferable.

The molecular weight of the copolymer obtained from the above-mentioned monomers is preferable to be 4,000 or more as the weight average molecular weight in terms of the form retention. Further, since the crosslinked structure can be usable, the upper limit is not particularly defined.

One kind of the polyfunctional monomers to be used for forming the crosslinked structure may be used alone or two or more kinds of them-may be used in combination.

The polymer electrolytic material (the embodiment 3) of the invention has voids and in the case of common use of the polymer electrolytic material, the voids are filled with a medium such as water. It is supposed that if there are voids in the polymer electrolytic material, the fuel cross-over would be increased in general, however, in the polymer electrolytic material (the embodiment 3) of the invention, formation of specified voids makes it possible to suppress the fuel cross-over and obtain high proton conductivity. Particularly, for example in the case of using methanol water as fuel, the polymer electrolytic material (the embodiment 3) of the invention has a small alteration of the swelling degree in the entire polymer electrolytic material corresponding to the methanol concentration in the methanol water, so that as the fuel has a higher concentration, the polymer electrolytic material advantageously has a more improved effect to suppress methanol cross-over as compared with an already existing material (e.g. a perfluoro type electrolytic polymer).

The porosity of the polymer electrolytic material of the embodiment 3 is 5 to 80% by volume, preferably 10 to 60% by volume, and more preferably 20 to 50% by volume. It is probable that the fuel cross-over is relevant to the water content in the polymer electrolytic material and the water content can be optimized by controlling the porosity. The porosity can be determined in accordance with the balance of the desired proton conductivity and the fuel cross-over value. In terms of the improvement of the proton conductivity, the porosity is adjusted to be 5% or higher and in terms of the fuel cross-over suppression, the porosity is adjusted to be 80% or lower.

The porosity of the polymer electrolytic material can be measured by measuring the volume A ($cm^3$) of the material after immersion in water at 25° C. for 24 hours and the weight W (g) after hot air drying at 60° C. for 6 hours and carrying out calculation using the value of the true density D ($g/cm^3$) of the dried polymer according to the following expression:

porosity (%)=[($A-W/D/A$)]×100.

In this connection, the true density D can be measured by a polymer density measurement apparatus "ULTRAPYCNOMETER 1000" manufactured by Yuasa Ionics Inc.

In the case crystal water and unfreezable water hard to be removed exist in the membrane in the above-mentioned measurement conditions, the volume of them occupying in the polymer is not regarded as the void in the invention.

The morphology of the voids may include pores penetrating from one surface side of the membrane in a membrane-like form to the surface of the other side (continuous pores) and independent pores and the continuous pores are preferable since the proton conductivity is good. The pores may be branched.

The voids may be continuous pores and independent pores and in terms of the balance between the proton conductivity and effect to suppress the fuel cross-over, amorphous mesh-like voids, in another way to say a three-dimensional mesh-like structure in which the polymer is sterically bonded, are preferable. In the case the voids are continuous pores, all of the paths penetrating from the front face to the back face are preferable to be 50 nm or smaller.

The average diameter of the voids is adjusted to be smaller than 50 nm, preferably 30 nm or smaller, and more preferably 10 nm or smaller. In the case it is 50 nm or larger, the effect to suppress the fuel cross-over tends to be insufficient. On the other hand, the lower limit the average diameter of the voids is preferably 0.1 nm or larger. Adjustment of it to be 0.1 nm or larger, the proton conductivity can be assured owing to penetration of the polymer electrolytic material with water.

The diameter of the voids is expressed as the average value of the diameter of the voids in a cross section of the polymer electrolytic material. The voids can be measured by observation by a scanning electron microscope (SEM) and a transmission electron microscope (TEM). The average value can be measured by dyeing an ultra thin specimen with 100 nm±30 nm cross section of the polymer electrolytic material with osmium tetraoxide; photographing the dyed cross section; defining the maximum diameter of the spot-like dyed portions in the image as the diameter of the voids; and calculating the average of not less than 20, preferably not less than 100 voids. In general, 100 voids are used for the measurement. In the case the measurement is better to be measured with a different dyeing agent or without using osmium tetraoxide, e.g. the case the membrane itself is dyes with osmium tetraoxide, the portions seemed to be like spots by shadows in the image are assumed to be voids for the measurement. In this connection, apparently linearly dyed portions (cracks at the time of producing the specimen) are excluded.

The polymer electrolytic material (the embodiment 3) of the invention contains the ionic group therein. The ionic group preferably exists in the insides of the voids. The insides mean the inner surfaces of the voids and the void portions themselves. Preferably, the ionic group exists in the inner surfaces of the voids. It is allowed that the ionic group exists in the part other than the insides of the voids. The existence state of the ionic group includes the state that the ionic group is chemically bonded to the polymer itself; and the state that the ionic group is not easily isolated by physical means such as washing, that is, a substance having the ionic group is adsorbed strongly to the polymer surface or the substance having the ionic group is held in the voids.

With respect to the ionic group in the embodiment 3, the same concept as that in the embodiment 1 can be applied.

To introduce the ionic group into the polymer electrolytic material (the embodiment 3) of the invention, the monomer before polymerization may have the ionic group and also the ionic group may be introduced after the polymerization. In terms of the option of the selectivity of the raw material and the easiness of the monomer adjustment, the ionic group is better to be introduced after polymerization.

The production method of the polymer electrolytic material of the invention is relevant to the embodiment 3 and involves steps of obtaining a membrane-like polymer from a monomer composition containing a monomer into which an ionic group can be introduced and a cavity source or forming a membrane from a polymer composition containing a monomer into which an ionic group can be introduced and a cavity source; removing the cavity source from the membrane; and introducing the ionic group into the polymer.

As the monomers into which anionic group can be introduced, as described above, an aromatic vinyl monomer with a negative e value such as styrene and α-methylstyrene among vinyl monomers can be employed.

Polymerization of vinyl monomers including the above-mentioned ones is preferable to be radical polymerization in terms of the workability. As a radical generable initiator, various kinds of peroxide compounds, azo compounds, peroxides, and cerium ammonium salts can be exemplified.

Practical examples of them are azonitrile compounds such as 2,2'-azobisisobutyronitrile, 1,1'-azobis(cyclohexane-1-carbonitrile), 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobis(2-methylbutyronitrile), 1-[(1-cyano-1-methylethyl)azo]formamide, and 2-phenylazo-4-methoxy-2,4-dimethylvaleronitrile; azoamidine compounds such as 2,2'-azobis(2-methyl-N-phenylpropionamidine) dibasic acid salts; cyclicazoamidine compounds such as 2,2'-azobis[2-(5-methyl-2-imidazolin-2-yl)propane] dibasic acid salts; azoamide compounds such as 2,2'-azobis[2-methyl-N-[1,1-bis(hydroxymethyl)-2-hydroxyethyl]propioneamide]; alkylazo compounds such as 2,2'-azobis(2,4,4-trimethylpentane); peroxides such as potassium persulfate, ammonium persulfate, hydrogen peroxide, and benzoyl peroxide; and cerium ammonium salts such as ammonium ceric sulfate and ammonium ceric nitrate.

Also, polymerization by a photo initiator using radiation beam, electron beam, and ultraviolet rays can be employed.

As the photo initiator, carbonyl compounds, peroxides, azo compounds, sulfur compounds, halogen compounds, and metal salts can be exemplified.

Further, in the case a polyfunctional monomer is contained, formation and membrane formation by cast polymerization using heat and light are preferable. The cast polymerization is a method of carrying out polymerization by injecting a mixture of the various kinds of monomers, a cavity source, and an initiator between two plates, sheets or membranes set at a prescribed clearance by a gasket or a spacer, and applying energy of heat or light. The method may be a batch type or continuous type method.

For example, a composition solution obtained by adding 0.01 to 2 part by weight of a photo initiator represented by "Darocure" and "Irgacure" (manufactured by CIBA Corp.) to a monomer composition to be used is injected between two quartz glass plates or sheets made of polyethylene, polypropylene, or a non-crystalline polyolefin, sealed, and irradiated with light of 0.01 to 100 mW/cm$^2$ luminance by an ultraviolet lamp for 0.1 seconds to 1 hour to carry out polymerization.

In the case higher priority is attached to the proton conductivity as a property required for the polymer, it is also preferable to introduce an ionic group deep to the inside of the polymer and for that, it is effective to previously add a cavity source for assisting the introduction of the ionic group previously into the monomers before polymerization and carry out polymerization. The cavity source is no need to have capability of directly introducing the ionic group by itself That is, it is an agent for making the ionic group easy to be introduced into not only the surface layer of the polymer but also portions where the ionic group can be introduced in the inside of the polymer in a manner that the substance capable of introducing the ionic group into the polymer is made to penetrate the polymer by decomposition, reaction, evaporation, sublimation, or elution of the agent by itself, and thereby at least a portion of the agent, the cavity source, is replaced with substance capable of introducing the ionic group into or a solvent containing the substance and thus removed.

The cavity source occupies a portion of the monomer composition or the polymer composition at the time of polymerization or membrane formation and is removed after the polymerization or membrane formation to form voids in the inside of the polymer electrolytic material.

The types of the cavity source may adequately be selected from organic compounds, solvents, soluble polymers, salts, and metals in accordance with the compatibility with the polymer materials, chemical solutions and solvents to be used for extraction and decomposition, and cavity source removal methods by heating, solvent immersion, light, electron beam, and radiation treatment. The cavity source may be in form of a liquid or a powder and a technique of positively leaving oligomers of the monomers used or unreacted monomers or byproducts as the cavity source may be employed. Also, just like metal alkoxides, those which become liquids and solids by reaction may be used.

Further, it is preferable to select those which do not cause adverse effect on the polymer electrolytic material even if a portion of the cavity source remains in the polymer and the products produced by reaction remain after the ionic group is introduced.

Also, it is preferable that the cavity source has a higher boiling temperature or decomposition temperature than the polymerization temperature in the case the cavity source is added before the polymerization.

Practical examples of the cavity source are ethylene carbonate, propylene carbonate methyl cellosolve, diglyme, toluene, xylene, trimethylbenzene, γ-butyrolactone, dimethylformamide, dimethylacetamide, N-methyl-2-pyrrolidone, 1,4-dioxane, tetrachloromethane, dichloromethane, nitromethane, nitroethane, acetic acid, acetic anhydride, dioctyl phthalate, di-n-octyl phthalate, trioctyl phosphate, decaline, decane, hexadecane, tetrabutoxytitanium, tetraisopropoxytitanium, tetramethoxysilane, and tetraethoxysilane and one kind of them may be used alone or two or more kinds of them may be used in combination.

The use amount of the cavity source may adequately be set in accordance with the combination of the cavity source to be employed and the monomers, desired porosity, and pore diameter and is preferably 1 to 80% by weight, more preferably 5 to 50% by weight, and even more preferably 10 to 30% by weight in the total composition including the cavity source. If it is 1% by weight or more, the ionic group is easy to be introduced deep to the inside of the polymer and the proton conductivity becomes desirable. On the other hand, if it is 80% by weight or less, the content of the low freezing point water is decreased and the fuel permeation amount is preferably lowered.

After the membrane-like polymer is obtained, or after the membrane is produced from the polymer composition, the cavity source is removed from the membrane. It is in order to form voids.

The means for removing the cavity source may be, for example, immersing the membrane in a solvent capable of removing the cavity source. The solvent capable of removing the cavity source may be selected properly from water and organic solvents. Preferable examples of the organic solvents are halo hydrocarbons such as chloroform, 1,2-dichloroethane dichloromethane, and perchloroethylene; nitrohydrocarbons such as nitromethane and nitroethane; alcohols such as methanol and ethanol; aromatic hydrocarbons such as toluene and benzene; aliphatic hydrocarbons such as hexane, heptane, and decane; esters such as ethyl acetate, butyl acetate, and ethyl lactate; ethers such as diethyl ether, tetrahydrofuran, and 1,4-dioxane; and nitriles such as acetonitrile. One kind of them may be used alone and two or more kinds of them may be used in combination.

After removal of the cavity source from the polymer, the solvent may be removed by drying or may not be removed.

The method for introducing the ionic group by the polymer reaction is as the method described for introducing the ionic group in the above-mentioned embodiment 1 and embodiment 2.

Next, the introduction of the ionic group into the polymer in the membrane will be described. In order to use the membrane formed from the polymer containing the cavity source as the polymer electrolytic material, it is important that the ionic group is made to exist at least in the insides of the voids of the membrane and for that, the ionic group is introduced by the ionic group introduction agent. The ionic group introduction agent means here is a compound capable of introducing the ionic group into portions of the ionic group repeating units composing the polymer and conventionally known agent may be used. Practical examples of the ionic group introduction agent are concentrated sulfuric acid, chlorosulfonic acid, fuming sulfuric acid, and sulfur trioxide in the case of introducing sulfonic acid group and in terms of easiness of the reaction controllability and productivity, the most preferable one is chlorosulfonic acid. In the case of introducing sulfonimide, sulfoneamide is preferable.

To introduce the ionic group to the copolymer in the membrane, practically, means of immersing the membrane in the ionic group introduction agent or a mixture of the ionic group introduction agent and a solvent may be employed. As the solvent to be mixed with the ionic group introduction agent, those which are not reactive or not intensely reactive with the ionic group introduction agent and capable of penetrating the polymer can be used. Examples of such solvents are halo hydrocarbons such as chloroform, 1,2-dichloroethane, dichloroethane, and perchloroethylene; nitro hydrocarbons such as nitromethane and nitroethane; and nitrites such as acetonitrile. The solvent and the ionic group introduction agent may be alone or a mixture of two or more types of them.

It is also preferable that removal of the cavity source from the membrane and introduction of the ionic group into the polymer are carried out in a single step.

More practically, it is preferable that the removal of the cavity source from the membrane and introduction of the ionic group (sulfonation) into the polymer are carried out simultaneously by immersing the membrane in a solution obtained by adding the ionic group introduction agent (e.g. the above-mentioned sulfonation agent) in a solvent capable of removing the cavity source. In this case, the cavity source in the membrane is removed while being replaced with the solution containing the ionic group. This method is preferable also in terms of the precise controllability of the ionic group introduction degree. In this case as the solvent capable of removing the cavity source, those which are not reactive or not intensely reactive with the ionic group introduction agent and capable of penetrating the polymer can be used. The solvents capable of removing the ionic group may be used alone or a mixture of two or more of them may be used.

In the case an ionic group introduction assisting agent for assisting introduction of the ionic group into the monomer before membrane formation/polymer composition is contained, it is preferable that the solvent is capable of removing also the ionic group introduction assisting agent.

From the above-mentioned viewpoint, examples of solvents capable of removing the cavity source are halo hydrocarbons such as chloroform, 1,2-dichloroethane, dichloromethane, and perchloroethylene; nitro hydrocarbons such as nitromethane and nitroethane; and nitrites such as acetonitrile.

The polymer electrolytic material of the invention may be copolymerized with other components or blended with other polymer compounds without departing from the true spirit and scope of the invention. Also, without deteriorating the properties, stabilizers such as various types of antioxidants, e.g. hindered phenol type, hindered amine type, thio ether type, and phosphorus type; and various additives such as a plasticizer and a coloring agent may be added.

The polymer electrolytic material of the invention may be mixed with various types of polymers, elastomers, filler, fine particles, and various additives for the purpose of improving the mechanical strength, thermal stability, and processibility to the extent that no adverse effects are caused on the above-mentioned properties.

The polymer electrolytic material of the invention can be used by packing the polymer composing the material in a membrane-like porous substrate and the polymer electrolytic membrane obtained in such a manner is preferable since it is prevented from deformation due to swelling.

As the shape of the porous material, those having a plurality of holes can be exemplified. Practically, meshes, fabrics, nonwoven fabrics, paper, and porous substrates having a plurality of independent through holes or a three-dimensional mesh structure are preferable.

In the three-dimensional mesh structure, the polymer composing the porous substrate has sterically continuous holes.

In the case the porous substrate has the three-dimensional mesh structure, the pore diameter is preferably 0.05 to 5 µm and more preferably 0.1 to 1 µm. The pore diameter can be calculated as the average of 20 or more pores, preferably 100 or more pores from the photograph of the surface taken by a scanning electron microscope (SEM) and generally the measurement is carried out for 100 pores. For example, since a three-dimensional mesh type porous substrate produced by a wet solidification method has a wide pore diameter distribution, it is preferable to calculate the average of pores as much as possible, for example, 100 to 500 pores.

In an embodiment to be used for the member of polymer electrolytic fuel cell, it is also preferable that the structure is made to be relatively more porous in the center part and relatively denser as a substrate in the peripheral part.

The porosity of the three-dimensional mesh type structure is preferably 10 to 95% and more preferably 50 to 90%. The porosity is percentage (%) calculated by subtracting the volume of the polymer from the entire volume of the porous substrate and dividing the result by the entire volume of the porous substrate.

The polymers to be used for the porous substrate to be used in the invention are polyimide (PI), polyvinylidene fluoride (PVDF), polyphenylene sulfide sulfone (PPSS), polytetrafluoroethylene (PTFE), polysulfone (PSF), polyether sulfone (PES), polycarbonate (PC), polyethylene (PE), polyamide, and their copolymers, copolymers with other monomers (e.g. hexafluoropropylene-vinylidene fluoride copolymer), and their blends may also be used. These polymers are preferable owing to antioxidation, strength, and easiness for wet solidification.

As a production method of the porous substrate having the three-dimensional mesh structure, a wet type solidification method is preferable to be employed.

The structure being made relatively more porous in the center part and relatively denser as a substrate in the peripheral part can be produced preferably by the following two methods.

A first method: a method of previously producing a dense membrane only for the peripheral part and thereafter producing the porous membrane of the center part. The dense membrane for the peripheral part is produced by applying a polymer solution for the entire surface to a substrate and then the center part may be cut out after drying the solution or the center part is un-coated by carrying out masking at the time of application. After that, the polymer solution to the center part and then the part is made porous.

A second method: a method of producing a membrane made porous in the entire body and closing the pores in the peripheral parts. To close the pores, a method of crushing them by heat press or a method of filling the pores with a non-protonic conductive polymer can be employed.

As the method of forming a plurality of independent through holes, a photolithographic method, a chemical etching method, a needle punching method, a water jet method, a laser method, and a neutron beam method can be exemplified.

As the method of filling a porous substrate with a polymer composing the polymer electrolytic material, for example, a solution of the polymer composing the polymer electrolytic material is produced and the solution is applied to the porous substrate or the porous substrate is immersed in the solution to fill the voids. If supersonic or pressure reduction is employed in combination at the time of application or immersion, the filling efficiency is improved and therefore, it is preferable. Further, a method of filling the voids with a monomer, which is a precursor of the polymer composing the polymer electrolytic material and thereafter, polymerizing the monomer or a method of evaporating the monomer and then carrying out plasma polymerization may be carried out.

The polymer electrolytic member of the invention is made of the polymer electrolytic material of the invention and the form of the member may be the membrane-like form as described above and besides may include plate-like, fibrous, hollow fiber-like, granular, bulky, and other forms in accordance with the uses.

Processing into these shapes can be carried out by extrusion molding, press molding, cast polymerization and the like and in the case of giving the three-dimensional structure to the polymer electrolytic material, the cast polymerization method employing heating and radiating light between glass plates or continuous belts is preferable.

The polymer electrolytic material or the polymer electrolytic member of the invention is usable for a variety of uses.

For example, medical and pharmaceutical uses such as in vitro circulation columns and artificial skins; applications for filtration; uses for ion exchange resins; various kinds of structural materials; and electrochemical uses are possible. For example, for the electrochemical uses, fuel cells, redox flow batteries, water electrolysis apparatus, and chloroalkali electrolytic apparatus can be exemplified and among them, fuel cells are particularly preferable.

The membrane electrode assembly of the invention is obtained by using the polymer electrolytic material of the invention.

The membrane electrode assembly (MEA) is an electrode comprising a membrane, an electrode catalyst layer, and the electrode substrate.

The electrode catalyst layer is a layer containing an electrode catalyst promoting the electrode reaction, an electron conductor, and an ion conductor.

As the electrode catalyst contained in the electrode catalyst layer, a noble metal catalyst such as platinum, palladium, ruthenium, rhodium, iridium, and gold may preferably be used. Among them, one kind of metals may be used alone or two or more kinds of metals may be used in combination in form of alloys and mixtures.

As the electron conductor (conductor) contained in the electrode catalyst layer, in terms of the electron conduction property and the chemical stability, carbon materials and inorganic conductive materials are preferable to be used. Especially, amorphous and crystalline carbon materials can be exemplified and carbon black such as channel black, thermal black, furnace black and acetylene black is preferable to be used owing to the electron conductivity and high specific surface area. Examples of the furnace black are Vulcan Xc-72, Vulcan P, Black Pearls 880, Black Pearls 1100, Black Pearls 1300, Black Pearls 2000, and Regal 400 manufactured by Cabot Corp.; Ketjenblack manufactured by Kejenblack International Corp.; EC, EC600JD, and #3150 and #3250 manufactured by Mitsubishi Chemical Corp. and examples of the acetylene black are Denka Black manufactured by Denki Kagaku Kogyo K.K. Besides the carbon black, natural graphite, and artificial graphite and carbon obtained from pitch, coke, polyacrylonitrile, phenol resins and furan resins can be used. The morphology of these carbon materials may be amorphous particles and besides, fibrous, scaly, tubular, conical, megaphone type ones are also usable. Further, those obtained by post treatment of these carbon materials may be used.

The electron conductor is preferable to be evenly dispersed with the catalyst particles in terms of the electrode capability. Therefore, the catalyst particles and the electron conductor are preferable to be previously dispersed well in form of a coating solution. Further, use of a catalyst-bearing carbon in which the catalyst and the electron conductor are united is one of preferable embodiments as the electrode catalyst layer. Use of the catalyst-bearing carbon improves the utilization factor of the catalyst and contributes to the improvement of the cell capabilities and cost down. Herein, also in the case of using the catalyst-bearing carbon for the electrode catalyst layer, a conductor agent may be added to further increase the electron conductivity. As the conductor agent, the above-mentioned carbon black is preferable to be used.

As the substance having ion conductivity (ion conductivity) to be used for the electrode catalyst layer, various organic and inorganic materials are generally known well and in the case of using them for a fuel cell, polymers (ion conductive polymers) having ionic group such as sulfonic acid group, carboxylic acid group, and phosphoric acid group for improving the ion conductivity are preferable to be used. Among them, in terms of the stability of the ionic group, polymers having ion, conductivity and composed of fluoroalkyl ether side chains and a fluoroalkyl main chain or the polymer electrolytic material of the invention are preferable to be used. Examples to be used preferably as the perfluoro type ion conductive polymers are Nafion manufactured by Du Pont de Nemours & Co.; Aciplex manufactured by Asaki Chemical Co., Ltd.; and Flemion manufactured by Asahi Glass Co., Ltd. These ion conductive polymers are formed in the electrode catalyst layer in form of a solution or a dispersion. In this case, the solvents to dissolve or disperse the polymers therein are not particularly limited and polar solvents are preferable in terms of the solubility of the ion conductive polymers.

Since the catalyst and the electron conductors are generally powders, the ion conductors generally take a function of hardening these ion conductors. It is preferable in the case of producing the electrode catalyst layer that the ion conductors are previously added to a coating solution and the coating solution is applied in the evenly dispersed state in terms of the electrode properties and the ion conductor may be applied after the electrode catalyst layer is applied.

Herein, a method for applying the ion conductor to the electrode catalyst layer is not particularly limited and spray coating, brush coating, dip coating, die coating, curtain coating, and flow coating can be employed. The amount of the ion conductor to be contained in the electrode catalyst layer should adequately be determined in accordance with the required electrode properties and the conductivity of the ion conductor and is not particularly limited, however it is preferably in a range of 1 to 80% by weight and more preferably in a range of 5 to 50% by weight. The ion conductor may possibly deteriorate the electrode properties in both cases; in the case it is insufficient, the ion conductivity is low and in the case it is excess, it inhibits the gas permeability.

Besides the above-mentioned catalyst, electron conductor, and ion conductor, the electrode catalyst layer may contain various substances. Particularly, to increase the bonding property of the substances contained in the electrode catalyst layer, polymers other than the above-mentioned ion conductive polymers may be added. Examples to be used as such polymers are polymers containing fluorine atoms such as polyvinyl fluoride (PVF), polyvinylidene fluoride (PVDF), polyhexafluoropropylene (FEP), polytetrafluoroethylene, polyperfluoroalkyl vinyl ether (PFA); their copolymers; copolymers of the monomer units composing these polymers and other monomers such as ethylene and styrene; or polymer blends. The content of these polymers in the electrode catalyst layer is preferably in a range of 5 to 40% by weight. In the case the polymer content is excess, the electron and ion resistance tend to be increased and the electrode properties tend to be deteriorated.

In the case the fuel is a liquid or a gas, the electrode catalyst layer is preferable to have a structure easy to permeate the liquid or the gas and also promote discharge of substances produced asides following the electrode reaction.

As the electrode substrate, those which have low electric resistance and are capable of collecting electricity or supplying electricity may be used. Further, in the case the electrode catalyst layer is used also as the electric collector in common, it is no need to use a particular electrode substrate. As the constituent material of the electrode substrate, for example carbonaceous and conductive inorganic substances can be exemplified and examples are a fired body of polyacrylonitrile, a fired body of pitch, a carbon material such as graphite and expanded graphite, stainless steel, molybdenum, and titanium. The morphology of them is not particularly limited and for example, they may be used in fibrous or granular state and in terms of the fuel permeability, fibrous conductive substances (conductive fibers) such as carbon fibers are preferable. As the electrode substrate using the conductive fibers, both structures of fabrics and nonwoven fabrics may be used. For example, Carbon Paper TGP series and SO series manufactured by Toray Industries Inc. and Carbon Cloth manufactured by E-TEK Corp. can be used. The fabrics are not particularly limited and-plain fabrics, satin fabrics, twill fabrics, twills, and tatters can be used. Further, as the nonwoven fabrics, those which are produced by a paper manufacturing method, a needle punch method, a spun bonding method, a water jet punching method, and a melt blow method can be used without any particularly limits. Further, knits may be used. With respect to these cloths, particularly in the case of using the carbon fibers, fabrics obtained by carbonizing or graphitizing plane fabrics using flame retarding spun yarns; nonwoven fabrics obtained by processing flame retarding yarns into nonwoven fabrics by a needle punching method or a water jet punching method and then carbonizing or graphitizing the resulting nonwoven fabrics; and mat nonwoven fabrics obtained from flame retarding yarns or carbonized yarns or graphitized yarns by paper manufacturing method are preferable to be used. Particularly, nonwoven fabrics are preferable to be used since cloths with a thin thickness and high strength can be obtained.

In the case the conductive fibers produced from carbon fibers are used for the electrode substrate, as the carbon fibers, polyacrylonitrile (PAN) type carbon fibers, phenol type carbon fibers, pitch type carbon fibers, and rayon type carbon fibers can be exemplified.

The electrode substrate may be subjected to treatment for water repellency for preventing decrease of the gas diffusion and permeability due to water stagnation; partial water repelling treatment and treatment for hydrophilicity for forming a water discharge path,; or may contain a carbon powder for decrease of the resistance.

In the polymer electrolytic fuel cell of the invention, it is preferable to form a conductive intermediate layer containing at least an inorganic conductive substance and a hydrophobic polymer. Particularly, in the case the electrode substrate is a carbon fiber fabric or nonwoven fabric with a high porosity, formation of the conductive intermediate layer can suppress the deterioration of the properties attributed to penetration of the electrode substrate with the electrode catalyst layer.

A method of producing the membrane electrode assembly (MEA) using either the electrode catalyst layer alone or both the electrode catalyst layer and the electrode substrate from the polymer electrolytic material of the invention is not particularly limited. Conventionally known methods (e.g. Chemical Plating Method described in Electrochemistry, 1985, 53, 269 and Thermal Press Joining Method of Gas Diffusion electrodes described in (J. Electrochem. Soc.): Electrochemical Science and Technology, 1988, 135(9), 2209) can be employed. A method of uniting them by thermal press is preferable method and the temperature and pressure may properly be selected in accordance with the thickness and the water content of the polymer electrolytic membrane and the electrode catalyst layer and the electrode substrate. The pressing may be carried out in the state that the polymer electrolytic material contains water or by using a polymer having the ion conductivity.

As the fuel to be used as the polymer electrolytic fuel cell of the invention, oxygen, hydrogen, and organic compounds having 1 to 6 carbon atoms such as methane, ethane, propane, butane, methanol, isopropyl alcohol, acetone, ethylene glycol, formic acid, acetic acid, diethyl ether, hydroquinone, and cyclohexane and mixtures of them with water can be exemplified and mixtures of one or more of them may be used. Particularly, in terms of power generation efficiency and system simplification of the entire cell body, fuel containing the organic compounds having 1 to 6 carbon atoms is preferable to be used and in terms of the electric power generation efficiency, an aqueous methanol solution is particularly preferable.

The content of the organic compounds having 1 to 6 carbon atoms in the fuel to be supplied to the membrane electrode assembly is preferably 20 to 70% by weight. Adjustment of the content to be 20% by weight or higher, practically high energy capacity can be obtained and adjustment of the content to be 70% by weight or lower, the power generation efficiency can be increased and practically high output can be obtained.

As uses of the polymer electrolytic fuel cell of the invention, an electric power supply source for a mobile body is preferable. The polymer electrolytic fuel cell can be used preferably as an electric power supply source for portable appliances such as a mobile phone, a personal computer, a PDA, a video camera (a cam corder), and a digital camera; domestic electric appliances such as an electromotive shaver and a vacuum cleaner; electromotive tools; and transportable bodies such as a vehicle, an automobile, e.g. a bus and a truck, a motorcycle, an electric power-assisted bicycle, an electric cart, an electric wheel chair, a ship, and a railway car.

EXAMPLES

Hereinafter, the invention will be described more in detail with reference to examples and these examples illustrates to enable the invention to be understood and it is not intended that the invention be limited to the described examples. Chemical structural formulas are inserted in the examples to assist better understanding of the invention purely by way of non-limiting the examples. The polymer polymerization components, arrangements, the number of the sulfonic acid groups, and the molecular weight are not to be considered as being limited by the following foregoing description and drawings, but are only limited by the scope of the appended claims.

[Measurement Method]

(1) Sulfonic Acid Group Density

With respect to a refined and dried polymer, it is measured by elementary analysis. The analysis of C, H, and N was carried out by a full automatic elementary analyzer, vario EL; the analysis of S was carried out by a flask combustion method-barium acetate titration; and the analysis of P was carried out by a flask combustion method-phosphorus vanadomolybdic acid colorimetry. The sulfonic acid group density (mmol/g) per unit gram was calculated from the composition ratio of each polymer.

(2) Weight Average Molecular Weight

The weight average molecular weight of each polymer was measured by GPC. Using as an united apparatus of an ultra-violet detector and a differential refractive index detector, HLC-8022GPC manufactured by TOSOH Corp. and as GPC columns, two TSK gel Super HM-H (inner diameter 6.0 mm and length 15 cm) manufactured by TOSOH Corp., the measurement was carried out with N-methyl-2-pyrrolidone solution containing N-methyl-2-pyrrolidone solvent and lithium bromide 10 mmol/L at 0.2 mL/min flow rate and the weight average molecular weight was calculated by conversion into the standardized polystyrene.

(3) Amount Wnf of Unfreezable Water and Ratios Rw1 and Rw2 of Unfreezable Water

After each polymer electrolytic material was immersed in water at 20° C. for 12 hours and taken out of the water and wiped with gauze to remove the excess water adhering to the surface as quickly as possible and then put in an air-tightly closable specimen container whose weight Gp was previously measured and closed therein by crimping and the total weight Gw of the sample and the air-tightly closable specimen container was measured as quickly as possible and immediately, the sample was subjected to differential scanning calorimetry (DSC).

The temperature program of DSC was that at first cooling from a room temperature to −30° C. was carried out at 10° C./min speed and then heating to 5° C. was carried out at 0.3° C./min and during the temperature increasing process, the measurement was carried out.

The apparatus for DSC measurement and conditions were as follows.

DSC apparatus: DSC Q100, manufactured by TA Instruments Corp.

Data processing apparatus: TRC-THADAP-DSC, manufactured by Toray Research Center Measurement temperature range: −3 to 5° C.

Scanning speed: at 0.3° C./min

Sample amount: about 5 mg

Sample pan: an air-tightly closable specimen container made of aluminum coated with an alumina coating After DSC measurement, a small hole was formed in the air-tightly closable specimen container containing the sample and after the sample was vacuum dried at 110° C. for 24 hours by a vacuum dryer, the total weight Gd of the sample and the air-tightly closable specimen container was measured as quickly as possible. The dried sample weight m was calculated according to $m = Gd - Gp$ and the total water weight Wt was calculated according to $Wt = (Gw - Gd)/m$.

The bulk water amount (Wf) was calculated from the DSC curve during the above-mentioned heating process according to the above-mentioned mathematical expression (n1) and the low freezing point water amount (Wfc) was calculated by the above-mentioned mathematical expression (n2) and the unfreezable water amount (Wnf) was calculated by subtracting the bulk water amount and the low freezing point water amount from the total water ratio (Wt) [the above-mentioned mathematical expression (n3)]

To carry out the calculation, the following values were employed as the freezing point $T_0$ of the bulk water and the freezing enthalpy $\Delta H_0$ of the bulk water at the freezing point $T_0$.

$T_0 = 0.0\ (°\ C.)$ $\Delta H_0 = 79.7\ (cal/g) = 334\ (J/g)$

In this connection, the measurement was carried out by Toray Research Center Co., on request.

(4) Membrane Thickness

Measurement was carried out by a contact type membrane thickness meter.

(5) Proton Conductivity A

After being immersed in pure water at 25° C. for 24 hours, a membrane-like sample was taken in environments at 25° C. and 50 to 80% relative humidity and the proton conductivity was measured by a constant potential a.c. impedance method as quickly as possible.

As a measurement apparatus, an electrochemical measurement system manufactured by Solartron (Solartron 1287, Electrochemical Interface and Solartron 1255B Frequency Response Analyzer) was employed. The sample was sandwiched between two disk type electrodes with φ2 mm and φ10 mm (made of a stainless steel) at 1 kg load. The effective electrode surface area was 0.0314 cm$^2$. An aqueous solution of 15% poly(2-acrylamido-2-methylpropanesulfonic acid) was applied to the interfaces of the sample and the electrodes. At 25° C., the constant potential impedance measurement with a.c. amplitude 50 mV was carried out to measure the proton conductivity A in the membrane thickness direction. The results were expressed in two ways, as the value per unit surface area and per unit surface area and unit thickness.

(6) Proton Conductivity B

After being immersed in pure water at 25° C. for 24 hours, a membrane-like sample was taken in environments at 25° C. and 50 to 80% relative humidity and the proton conductivity was measured by a constant potential a.c. impedance method as quickly as possible.

As a measurement apparatus, an electrochemical measurement system HAG 5010 manufactured by HOKUTO DENKO Co., Ltd. (HZ-3000, 50V 10A POWER UNIT, HZ-3000 Automatic Polarization System) and a Frequency Response Analyzer 5010 manufactured by N-F Circuit Designing Block were employed and at 25° C., the constant potential impedance measurement was carried out by a two-terminal method and the proton conductivity was calculated according to the Nykist graph. The a.c. amplitude was 500 mV and as the sample, a membrane with width of about 10 mm and length of about 10 to 30 mm was used. The sample was immersed immediately before the measurement and then subjected to be measurement. As electrodes, platinum wires (two wires) with 100 μm diameter were used. The electrodes were arranged in the front face and the back face sides of the sample membrane in parallel to each other and at right angles to the longitudinal direction of the sample membrane.

(7) Methanol Permeation Amount A

After being immersed in pure water at 25° C. for 24 hours, the membrane-like sample was subjected to the measurement at 20° C. using an aqueous solution of 30% by weight methanol.

The sample membrane was sandwiched between H type cells and pure water (60 mL) was poured in one cell and the aqueous solution of 30% by weight methanol (60 mL) was poured in one cell. The capacity of each cell was 80 mL. The aperture surface area between the cells was 1.77 cm². At 20° C., the contents in both cells were stirred. The methanol amount eluted in the pure water was measured at the time of 1 hour, 2 hours, and 3 hours from the starting by gas chromatography (GC-2010) manufactured by Simadzu Corp. and quantitatively analyzed. The methanol permeation amount per unit time was calculated from the inclination of the obtained graph. The results were expressed in two ways, as the value per unit surface area and per unit surface area and unit thickness.

(8) Methanol Permeation Amount B

The measurement was carried out in the same manner as the above described (7) of methanol permeation amount A except that an aqueous solution of 1 M methanol was used in place of the aqueous solution of 30% by weight methanol.

(9) Observation of Sulfonic Acid Distribution State

It was observed as the sulfur element distribution in membrane's cross-section direction by an electron microanalyzer (EPMA) JXA-8621 MX manufactured by JEOL Ltd. under the following conditions.

Secondary electron image: reflected electron image observation conditions
accelerating voltage: 15 kV
Elementary distribution analysis (wavelength dispersion method)
accelerating voltage: 15 kV
radiation current: 50 nA
measurement duration: 30 msec
number and length of pixel: 256×256 pixel. 0.336 μm/pixel
analysis beam diameter: to 1 μmφ
analysis x-ray-spectrometric crystal: SKα (5.373 Å).PET
sample preparation: after producing the cross-section sample by a microtome, carbon was deposited.

(9) Evaluation of MEA and Polymer Electrolytic Fuel Cell

Each membrane electrode assembly (MEA) was set in a cell manufactured by Electrochem. Corp. and an aqueous solution of 30% methanol was passed through the anode side and air was passed through the cathode side to carry out MEA evaluation. The evaluation was carried out by applying rated current to the MEA and the voltage was measured at the time. The electric current was successively increased until the voltage reached 10 mV or lower. The products of the current and the voltage at the respective measurement points were outputted power and the maximum value (per unit surface area of MEA) was regarded as the output (mW/cm²).

The energy capacity was calculated according to the following expression (n4) from the output and MCO of MEA.

MCO of MEA was evaluated by sampling the discharged gas from the cathode with a trapping tube. The sampled gas was subjected to the evaluation by a total organic carbon meter TOC-VCSH (measurement apparatus, manufactured by Shimadzu Corp.) or a MeOH permeation measurement apparatus Maicro GC CP-4900 (Gas chromatograph, manufactured by GL Science Corp.). The MCO was calculated by measuring the total of MeOH and carbon dioxide in the sampled gas.

$$\text{Energy capacity} = \frac{\text{output}}{1000} \times \frac{96500 \times 6 \times \text{volume} \times \frac{\text{concentration}}{100} \times \frac{1}{32}}{3600 \times \left(96500 \times \frac{MCO}{60} \times \frac{1}{1000000} \times 6 + \frac{\text{current density}}{1000}\right)} \quad (n4)$$

energy capacity: Wh
output: the maximum output density (mW/cm²)
volume: the volume of the fuel (in this example, calculated while being assumed to be 10 mL)
concentration: methanol concentration in fuel (%)
MCO: MCO in MEA (μmol·min⁻¹·cm⁻²)
current density: the current density (mA/cm²) at the time when the maximum output density was obtained.

Example 1

Sulfonated HQPEPO

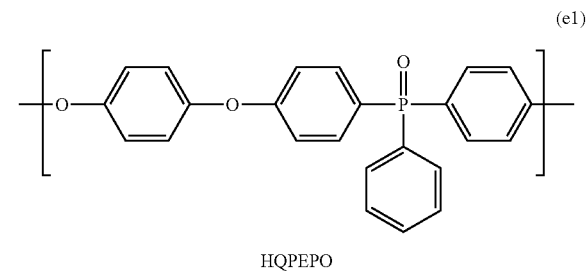

HQPEPO (Synthesis of Un-Sulfonated Polymer)

Potassium carbonate 17 g, hydroquinone 11 g, and bis(4-fluorophenyl)phenylphosphine oxide 31 g were used to carry out polymerization at 160° C. in N-methylpyrrolidone (NMP).

After the polymerization, refining was carried out by re-precipitation with a large quantity of methanol water to quantitatively obtain HQPEPO defined by the above-mentioned formula (e1).

(Sulfonation)

The above obtained polymer (HQPEPO) 5 g was dissolved in chloroform at a room temperature in $N_2$ atmosphere and under strongly stirring condition, chlorosulfonic acid 8 mL was slowly dropwise added and reaction was carried out for 30 minutes. The obtained white precipitate was separated by filtration, crushed, and washed sufficiently with water, and then dried to obtain the aimed sulfonated HQPEPO.

The obtained sulfonated HQPEPO had a sulfonic acid density of 2.1 mmol/g and a weight average molecular weight 200,000.

(Membrane Formation)

A solution of the above-mentioned sulfonated polymer was obtained using N,N-dimethylacetamide as a solvent and poured on and applied to a glass substrate and dried at 100° C. for 3 hours to remove the solvent. The obtained membrane was colorless and transparent and flexible membrane.

Rw1 was 68% by weight and Wnf was 0.58.

Two kinds of membranes with different thickness were obtained and one with a membrane thickness of 210 μm was found having
methanol permeation-amount A: 25 μmol·min$^{-1}$·cm$^{-2}$ and 520 nmol·min$^{-1}$·cm$^{-1}$ and the proton conductivity A: 5.2 S·cm$^{-2}$ and 98 mS·cm$^{-1}$.

The other one with membrane thickness of 105 μm was found having
methanol permeation amount B: 51 nmol·min$^{-1}$·cm$^{-1}$ and the proton conductivity B: 75 mS·cm$^{-1}$.

Although slightly inferior in the proton conductivity to that of Nafion 117 of Comparative Example 1, the synthesize polymer was excellent in the fuel shutting property.

(Production of the Membrane Electrode Assembly)

Two electrode substrates were produced by carrying out water repellent treatment for carbon fiber cloth substrates with 20% polytetrafluoroethylene (PTFE), applying a carbon black dispersion containing 20% PTFE thereto, and firing the substrates.

An anode catalyst coating solution containing Pt—Ru-bearing carbon and the Nafion solution was applied to one of the electrode substrates and dried to produce an anode.

Also, a cathode catalyst coating solution containing Pt-bearing carbon and the Nafion solution was applied to the other electrode substrate and dried to produce a cathode.

The polymer solid electrode membranes obtained in the above-mentioned manner were sandwiched between the anode and the cathode and heated and pressed to produce a membrane electrode assembly.

(Production of Polymer Electrolytic Fuel Cell)

The obtained membrane electrode assembly (MEA) was set in a cell manufactured by Electrochem. Corp. and an aqueous 3% methanol solution and air were passed through the anode side and cathode side, respectively, to obtain a polymer electrolytic fuel cell.

As compared with MEA using Nafion 117 of Comparative Example 1, the MEA of this Example showed an output value as high as 1.5 times and an energy capacity value as high as 1.8 times.

Comparative Example 1

Nafion 117

Commercialized Nafion 117 membrane (trade name, manufactured by Du Pont de Nemours & Co.) was subjected to evaluation of the proton conductivity and the methanol permeation amount. The Nafion 117 membrane was immersed in 5% hydrogen peroxide water at 100° C. for 30 minutes and successively in 5% diluted sulfuric acid at 100° C. for 30 minutes and then sufficiently washed with deionized water at 100° C.

Rw1 was 49% by weight: Rw2 was 44% by weight: and Wnf was 0.18.

Two kinds of membranes with different thickness were obtained and one with a membrane thickness of 210 μm was found having
methanol permeation amount A was 60 μmol·min$^{-1}$·cm$^{-2}$ and 1260 nmol·min$^{-1}$·cm$^{-1}$: methanol permeation amount B was 113 nmol·min$^{-1}$·cm$^{-}$:
the proton conductivity A was 5.0 S·cm$^{-2}$ and 105 mS·cm$^{-1}$: and the proton conductivity B was 80 mS·cm$^{-1}$.

Using the Nafion 117 membrane, production of the membrane electrode assembly and the polymer electrolytic fuel cell was carried out in the same manner as Example 1. The output value was 8 mW/cm$^2$ and the energy capacity value was 0.2 Wh.

Example 2

Sulfonated HQPEPO

Using the sulfonated HQPEPO obtained in the same manner as Example 1, the membrane formation was carried out in the following procedure.

(Membrane Formation)

After the above-mentioned sulfonated polymer was subjected to Na-substitution by immersion in saturated salt water, a solution of it using N,N-dimethylacetamide as a solvent was produced and poured on and applied to a glass substrate and dried at 100° C. for 4 hours to remove the solvent. Further, the membrane was heated to 200 to 300° C. in nitrogen gas atmosphere for 1 hour and heated in conditions of heating at 300° C. for 10 minutes and then spontaneously cooled. The membrane was immersed in 1N hydrochloric acid for 3 days or longer to carry out proton replacement and then immersed in a significantly excess amount of pure water for 3 days or longer to wash it sufficiently.

Rw1 was 80% by weight and Wnf was 0.53.

Two kinds of membranes with different thickness were obtained and one with a membrane thickness of 200 μm was found having
methanol permeation amount A: 17 μmol·min$^{-1}$·cm$^{-2}$ and 340 nmol·min$^{-1}$·cm$^{-1}$ and the proton conductivity A: 5.0 S·cm$^{-2}$ and 100 mS·cm$^{-1}$.

The other one with membrane thickness of 105 μm was found having
methanol permeation amount B: 33 nmol·min$^{-1}$·cm$^{-1}$ and the proton conductivity B: 77 mS·cm$^{-1}$.

As compared with those of Nafion 117 of Comparative Example 1, the membranes had similar proton conductivity and were excellent in the fuel shutting property.

Example 3

Sulfonated BPPEPO

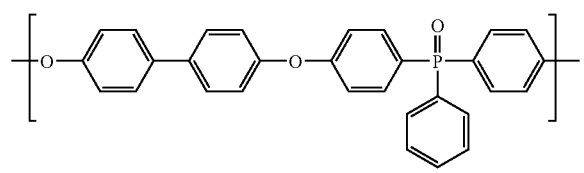

(e2)

BPPEPO

BPPEPO defined by the above formula (e2) was synthesized in the same manner as Example 1, except that dihydroxybiphenyl 19 g was used in place of hydroquinone 11 g in the unsulfonated polymer synthesis and further processes to sulfonation and membrane formation were carried out.

The obtained sulfone compound had a sulfonic acid density of 2.7 mmol/g and a weight average molecular weight 220,000.

Rw1 was 65% by weight and Wnf was 0.46.

Two kinds of membranes with different thickness were obtained and one with a membrane thickness of 220 μm was found having methanol permeation amount A: 35 μmol·min$^{-1}$·cm$^{-2}$ and 780 nmol·min$^{-1}$·cm$^{-1}$ and the proton conductivity A: 6.1 S·cm$^{-2}$ and 135 mS·cm$^{-1}$.

The other one with membrane thickness of 95 μm was found having methanol permeation amount B: 77 nmol·min$^{-1}$·cm$^{-1}$ and the proton conductivity B: 105 mS·cm$^{-1}$.

As compared with Nafion 117, the synthesize polymer was excellent in both of the proton conductivity and the fuel shutting property.

Comparative Example 2

BISAPEPO

The process to the membrane formation was carried out in the same manner as Example 3, except that sulfonation was omitted and the solvent in the membrane formation was changed to chloroform from N,N-dimethylacetamide.

Wnf was 0

The membrane thickness was 90 μm.

Methanol permeation amount A was 0 μmol·min$^{-1}$·cm$^{-2}$ and 0 nmol·min$^{-1}$·cm$^{-1}$: the proton conductivity A was 0 S·cm$^{-2}$ and 0 mS·cm$^{-1}$: and there was no proton conductivity.

Example 4

Sulfonated BISAPEPO

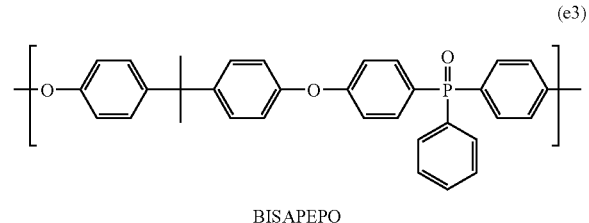

BISAPEPO

BISAPEPO defined by the above formula (e3) was synthesized in the same manner as Example 1, except that bisphenol A 22.8 g was used in place of hydroquinone 11 g in the unsulfonated polymer synthesis and further processes to sulfonation and membrane formation were carried out.

The obtained sulfone compound had a sulfonic acid density of 2.7 mmol/g and a weight average molecular weight 180,000.

Rw1 was 63% by weight and Wnf was 0.50.

Two kinds of membranes with different thickness were obtained and one with a membrane thickness of 205 μm was found having methanol permeation amount A: 39 μmol·min$^{-1}$·cm$^{-2}$ and 790 nmol·min$^{-1}$·cm$^{-1}$ and the proton conductivity A: 6.5 S·cm$^{-2}$ and 133 mS·cm$^{-1}$.

The other one with membrane thickness of 97 μm was found having methanol permeation amount B: 78 nmol·min$^{-1}$·cm$^{-1}$ and the proton conductivity B: 102 mS·cm$^{-1}$.

As compared with Nafion 117, the synthesize polymer was excellent in both of the-proton conductivity and the fuel shutting property.

Example 5

Sulfonated HQPEMPO

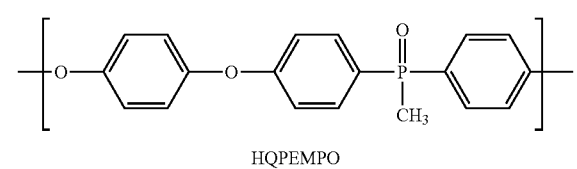

HQPEMPO

HQPEMPO defined by the above formula (e4) was synthesized in the same manner as Example 1, except that bis(4-fluorophenyl)methylphosphine oxide 25 g was used in place of bis(4-fluorophenyl)phenylphosphine oxide 31 g in the unsulfonated polymer synthesis and further processes to sulfonation and membrane formation were carried out.

The obtained sulfone compound had a sulfonic acid density of 2.7 mmol/g and a weight average molecular weight 150,000.

Rw1 was 63% by weight and Wnf was 0.48.

Two kinds of membranes with different thickness were obtained and one with a membrane thickness of 235 μm was found having methanol permeation amount A: 36 μmol·min$^{-1}$·cm$^{-2}$ and 840 nmol·min$^{-1}$·cm$^{-1}$ and the proton conductivity A: 4.7 S·cm$^{-2}$ and 111 mS·cm$^{-1}$.

The other one with membrane thickness of 105 μm was found having methanol permeation amount B: 85 nmol·min$^{-1}$·cm$^{-1}$ and the proton conductivity B: 85 mS·cm$^{-1}$.

As compared with Nafion 117, the synthesize polymer was excellent in the fuel shutting property.

Example 6

Sulfonated BISAPEPO/BISAPEEK

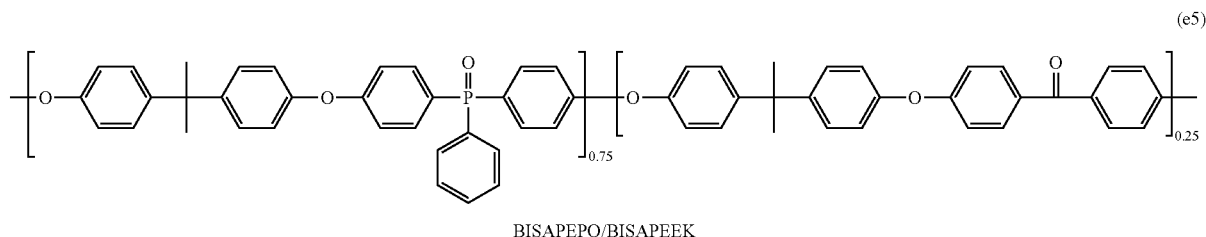

BISAPEPO/BISAPEEK

BISAPEPO/BISAPEEK defined by the above formula (e5) was synthesized in the same manner as Example 1, except that bisphenol A 22.8 g was used in place of hydrbquinone 11 g and bis(4-fluorophenyl)phenylphosphine oxide 31 g was changed to 23 g and bis(4-fluorophenyl) ketone 5 g was added in the unsulfonated polymer synthesis and further processes to sulfonation and membrane formation were carried out.

The obtained sulfone compound had a sulfonic acid density of 2.6 mmol/g and a weight average molecular weight 350,000.

Rw1 was 65% by weight and Wnf was 0.45.

Two kinds of membranes with different thickness were obtained and one with a membrane thickness of 220 μm was found having
methanol permeation amount A: 27 μmol·min$^{-1}$·cm$^{-2}$ and 600 nmol·min$^{-1}$·cm$^{-1}$ and the proton conductivity A: 6.1 S·cm$^{-2}$ and 134 mS·cm$^{-1}$.

The other one with membrane thickness of 104 μm was found having
methanol permeation amount B: 61 nmol·min$^{-1}$·cm$^{-1}$ and the proton conductivity B: 103 mS·cm$^{-1}$.

As compared with Nafion 117, the synthesize polymer was excellent in both of the proton conductivity and the fuel shutting property.

Example 7

Sulfonated HQPEPO/PEEK

HQPEPO/PEEK defined by the above formula (e6) was synthesized in the same manner as Example 1, except that bis(4-fluorophenyl)phenylphosphine oxide 31 g was changed to 23 g and bis(4-fluorophenyl)ketone 5 g was added in the unsulfonated polymer synthesis and further processes to sulfonation and membrane formation were carried out.

The obtained sulfone compound had a sulfonic acid density of 2.7 mmol/g and a weight average molecular weight 350,000.

Rw1 was 64% by weight and Wnf was 0.47.

Two kinds of membranes with different thickness were obtained and one with a membrane thickness of 205 μm was found having
methanol permeation amount A: 38 μmol·min$^{-1}$·cm$^{-2}$ and 780 nmol·min$^{-1}$·cm$^{-1}$ and the proton conductivity A: 6.3 S·cm$^{-2}$ and 130 mS·cm$^{-1}$.

The other one with membrane thickness of 104 μm was found having
methanol permeation amount B: 77 nmol·min$^{-1}$·cm$^{-1}$ and the proton conductivity B: 100 mS·cm$^{-1}$.

As compared with Nafion 117, the synthesize polymer was excellent in both of the proton conductivity and the fuel shutting property.

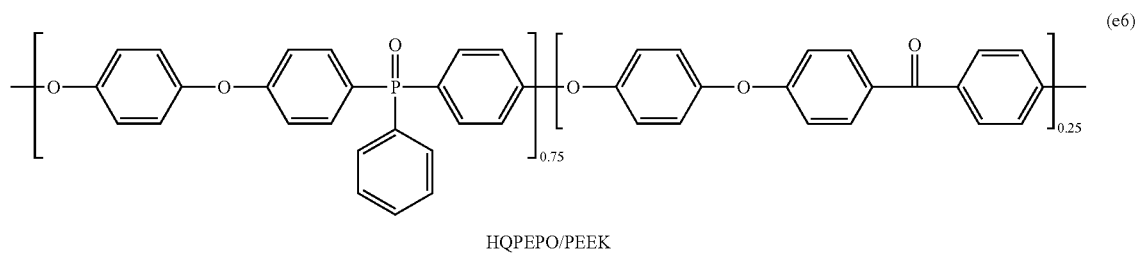

HQPEPO/PEEK

Example 8

Sulfonated HQPEPO/PEES

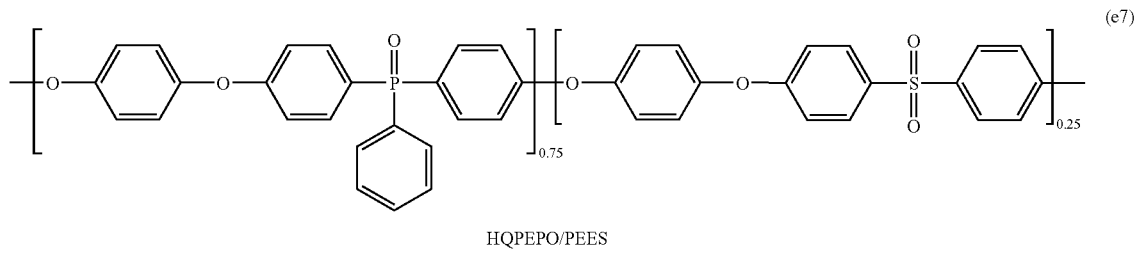

HQPEPO/PEES

HQPEPO/PEES defined by the above formula (e7) was synthesized in the same manner as Example 1, except that bis(4-fluorophenyl)phenylphosphine oxide 31 g was changed to 23 g and bis(4-fluorophenyl)sulfone 6 g was added in the unsulfonated polymer synthesis and further processes to sulfonation and membrane formation were carried out.

The obtained sulfone compound had a sulfonic acid density of 2.4 mmol/g and a weight average molecular weight 220,000.

Rw1 was 61% by weight and Wnf was 0.49.

Two kinds of membranes with different thickness were obtained and one with a membrane thickness of 220 μm was found having methanol permeation amount A: 39 μmol·min$^{-1}$·cm$^{-2}$ and 860 nmol·min$^{-1}$·cm$^{-1}$ and the proton conductivity A: 5.0 S·cm$^{-2}$ and 110 mS·cm$^{-1}$.

The other one with membrane thickness of 95 μm was found having methanol permeation amount B: 85 nmol·min$^{-1}$·cm$^{-1}$ and the proton conductivity B: 80 mS·cm$^{-1}$.

As compared with Nafion 117, the synthesize polymer was excellent in the fuel shutting property.

Example 9

Sulfonated Polyphosphate

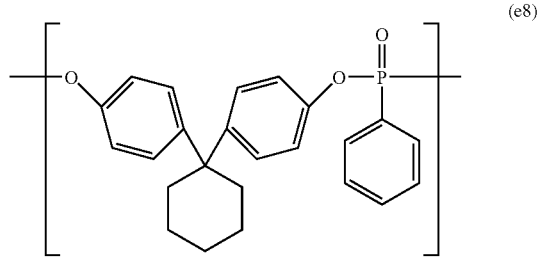

(Synthesis of Un-Sulfonated Polymer)

1,1-Bis(4-hydroxyphenyl)cyclohexane 40 mmol, phenylphosphonic acid dichloride 40 mmol, and triethylamine 88 mmol were used to carry out polymerization in 1,2-dichloroethane in ice cooling condition.

After the polymerization, refining was carried out by re-precipitation with a large quantity of methanol water to quantitatively obtain polyphosphate defined by the above-mentioned formula (e8).

Sulfonation and membrane formation were carried out in the same manner as Example 1.

The obtained sulfone compound had a sulfonic acid density of 2.3 mmol/g and a weight average molecular weight 80,000.

Rw1 was 62% by weight and Wnf was 0.45.

Two kinds of membranes with different thickness were obtained and one with a membrane thickness of 210 μm was found having methanol permeation amount A: 50 μmol·min$^{-1}$·cm$^{-2}$ and 1050 nmol·min$^{-1}$·cm$^{-1}$ and the proton conductivity A: 5.0 S·cm$^{-2}$ and 104 mS·cm$^{-1}$.

The other one with membrane thickness of 110 μm was found having methanol permeation amount B: 100 nmol·min$^{-1}$·cm$^{-1}$ and the proton conductivity B: 80 mS·cm$^{-1}$.

As compared with Nafion 117, the synthesize polymer was excellent in the fuel shutting property.

Example 10

Radiation-Crosslinked Sulfonated BISAPEPO

The polymer solid electrolytic membrane same as that obtained in Example 3 was radiated with beam of 300 kGy dose, in nitrogen atmosphere by an area beam type electron beam radiation apparatus (Curetron EBC 300-60, manufactured by NHV Corp.)

Rw1 was 65% by weight and Wnf was 0.50.

Two kinds of membranes with different thickness were obtained and one with a membrane thickness of 200 μm was found having methanol permeation amount A: 21 μmol·min$^{-1}$·cm$^{-2}$ and 410 nmol·min$^{-1}$·cm$^{-1}$ and the proton conductivity A: 5.5 S·cm$^{-2}$ and 110 mS·cm$^{-1}$.

The other one with membrane thickness of 90 μm was found having methanol permeation amount B: 40 nmol·min$^{-1}$·cm$^{-1}$ and the proton conductivity B: 85 mS·cm$^{-1}$.

As compared with Nafion 117, the synthesize polymer was remarkably excellent particularly in the fuel shutting property.

Comparative Example 3

Sulfonated Polyether Ether Ketone

As polyether ether ketone, 450 PF manufactured by Victrex was used to synthesize sulfonated polyether ether ketone by the method described in Polymer, 28, 1009 (1987).

The obtained sulfone compound had a sulfonic acid density of 2.5 mmol/g and a weight average molecular weight 180,000.

The membrane formation was carried out in the same manner as Example 1, except a trifle such as the coating thickness.

Rw1 was 47% by weight and Wnf was 0.43.

The membrane was very significantly swollen with water.

The membrane thickness was 280 μm and the methanol permeation amount A was 112 μmol·min$^{-1}$·cm$^{-2}$ and 3140 nmol·min$^{-1}$·cm$^{-1}$: and the proton conductivity A was 5.1 S·cm$^{-2}$ and 143 mS·cm$^{-1}$.

As compared with the Nafion 117, although the membrane had a similar proton conductivity, it was inferior in the fuel shutting property.

Example 11

Sulfonated FL50PEEK

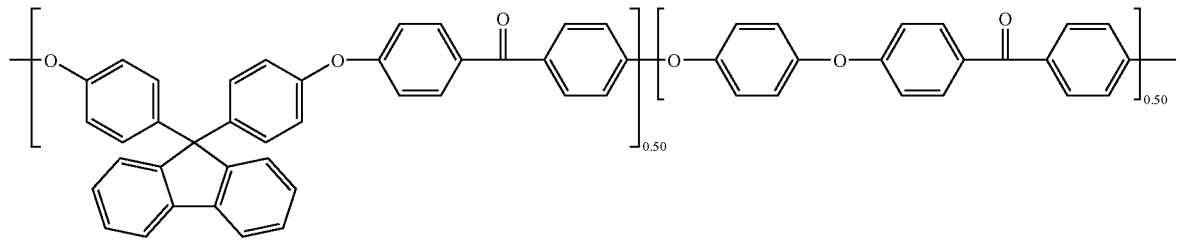

(e9)

(Synthesis of Un-Sulfonated Polymer)
Potassium carbonate 35 g,
hydroquinone 11 g,
4,4'-(9H-fluoren-9-ylidene)bisphenol 35 g, and 4,4'-difluorobenzophenone 44 g were used to carry out polymerization at 160° C. in N-methylpyrrolidone (NMP).

After the polymerization, refining was carried out by re-precipitation with a large quantity of methanol water to quantitatively obtain FL50PEEK defined by the above-mentioned formula (e9). The weight average molecular weight of it was 110,000.

(Sulfonation)

The above obtained polymer (FL50PEEK) 10 g was dissolved in chloroform at a room temperature in $N_2$ atmosphere and under strongly stirring condition, chlorosulfonic acid 14 mL was slowly dropwise added and reaction was carried out for 5 minutes. The obtained white precipitate was separated by filtration, crushed, and washed sufficiently with water, and then dried to obtain the aimed sulfonated FL50PEEK.

The obtained sulfonated FL50PEEK had a sulfonic acid density of 2.3 mmol/g.

(Membrane Formation)

After the above-mentioned sulfonated polymer was subjected to Na-substitution by immersion in saturated salt water, a solution of it using N,N-dimethylacetamide as a solvent was produced and poured on and applied to a glass substrate and dried at 100° C. for 4 hours to remove the solvent. Further, the membrane was heated to 200 to 300° C. in nitrogen gas atmosphere for 1 hour and heated in conditions of heating at 300° C. for 10 minutes and then spontaneously cooled. The membrane was immersed in 1N hydrochloric acid for 3 days or longer to carry out proton replacement and then immersed in an significantly excess amount of pure water for 3 days or longer to wash it sufficiently.

Rw1 was 86% by weight: Rw2 was 68% by weight: and Wnf was 0.54.

The obtained membrane was a membrane having a thickness of 160 μm and colorless and transparent and flexible.

The methanol permeation amount A was 19 μmol·min$^{-1}$·cm$^{-2}$ and 304 nmol·min$^{-1}$·cm$^{-1}$ and the proton conductivity A was 6.0 S·cm$^{-2}$ and 96 mS·cm$^{-1}$.

As compared with Nafion 117, the synthesize polymer was excellent in the proton conductivity and the fuel shutting property and had a very high unforeseeable water ratio.

(Production of the Membrane Electrode Assembly)

Two electrode substrates were produced by carrying out water repellent treatment for carbon fiber cloth substrates with 20% polytetrafluoroethylene (PTFE) suspension and firing the substrates.

An anode catalyst coating solution containing Pt—Ru-bearing carbon and the Nafion solution was applied to one of the electrode substrates and dried to produce an anode.

Also, a cathode catalyst coating solution containing Pt-bearing carbon and the Nafion solution was applied to the other electrode substrate and dried to produce a cathode.

The polymer solid electrode membranes obtained in the above-mentioned manner were sandwiched between the anode and the cathode and heated and pressed to produce a membrane electrode assembly (MEA).

(Production of Polymer Electrolytic Fuel Cell)

The obtained MEA was set in a cell manufactured by Electrochem. Corp. and an aqueous 30% methanol solution and air were passed through the anode side and cathode side, respectively, to obtain a polymer electrolytic fuel cell.

As compared with MEA using Nafion 117 (Comparative Example 1), the MEA using the polymer electrolytic membrane of Example 11 showed an output value (mW/cm$^2$) as high as 2.1 times and an energy capacity value (Wh) as high as 3.1 times and had excellent properties.

Example 12

Sulfonated FL50PEEK

A solution of the sulfonated FL50PEEK obtained in the same manner as Example 11 was produced using N,N-dimethylacetamide as a solvent and poured on and applied to a glass substrate and dried at 100° C. for 3 hours to remove the solvent and form a membrane.

The obtained membrane had a thickness of 240 μm and was a colorless and transparent and flexible membrane.

Rw1 was 68% by weight: Rw2 was 53% by weight: and Wnf was 0.56.

The methanol permeation amount A was 12 $\mu mol \cdot min^{-1} \cdot cm^{-2}$ and 288 $nmol \cdot min^{-1} \cdot cm^{-1}$: the proton conductivity A was 6.1 $S \cdot cm^{-2}$ and 145 $mS \cdot cm^{-1}$: and the proton conductivity B was 5.5 $S \cdot cm^{-2}$ and 132 $mS \cdot cm^{-1}$.

As compared with Nafion 117, the synthesize polymer was excellent in the proton conductivity and the fuel shutting property and had a very high unfreezable water ratio.

Example 13

Sulfonated FL75PEEK

As compared with MEA using Nafion 117 (Comparative Example 1), the MEA using the polymer electrolytic membrane of this Example showed an output value (mW/cm²) as high as 1.5 times and an energy capacity value (Wh) as high as 1.9 times and had excellent properties.

Example 14

Sulfonated FL75PEEK

A solution of the sulfonated FL75PEEK obtained in the same manner as Example 13 was produced using N,N-dimethylacetamide as a solvent and poured on and applied to a

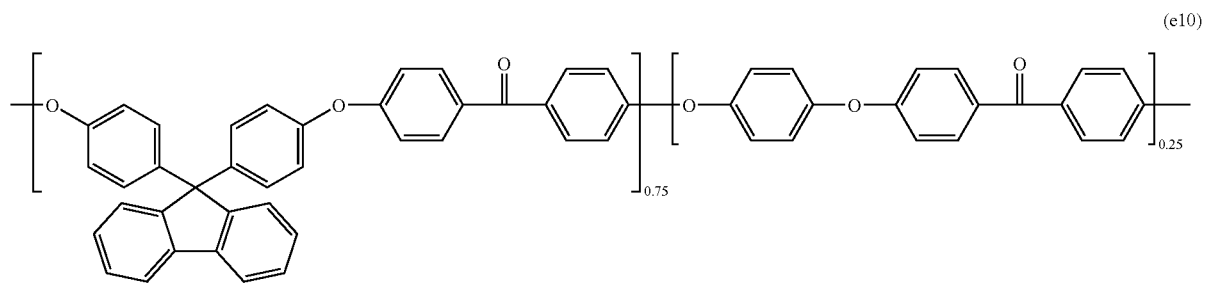

(e10)

FL75PEEK defined by the above formula (e10) was synthesized in the same manner as Example 11, except that hydroquinone 11 g was changed to 6 g and 4,4'-(9H-fluoren-9-ylidene)bisphenol 35 g was changed to 52 g and further processes to sulfonation, membrane formation, production of the membrane electrode assembly, and production of the polymer electrolytic fuel cell were carried out.

The obtained un-sulfonated polymer had a weight average molecular weight 130,000.

The obtained sulfonated FL75PEEK had a sulfonic acid group density of 2.2 mmol/g.

Rw1 was 71% by weight: Rw2 was 64% by weight: and Wnf was 0.52.

The obtained membrane had a membrane thickness of 150 µm and was a pale brown and transparent and flexible membrane.

glass substrate and dried at 100° C. for 3 hours to remove the solvent and form a membrane.

The obtained membrane had a thickness of 180 µm and was a colorless and transparent and flexible membrane.

Rw1 was 63% by weight.

The methanol permeation amount A was 15 $\mu mol \cdot min^{-1} \cdot cm^{-2}$ and 270 $nmol \cdot min^{-1} \cdot cm^{-1}$: the proton conductivity A was 6.4 $S \cdot cm^{-2}$ and 115 $mS \cdot cm^{-1}$: and the proton conductivity B was 5.8 $S \cdot cm^{-2}$ and 104 $mS \cdot cm^{-1}$.

As compared with Nafion 117, the synthesize polymer was excellent in the proton conductivity and the fuel shutting property and had a very high unfreezable water ratio.

Example 15

Sulfonated FL25PEEK

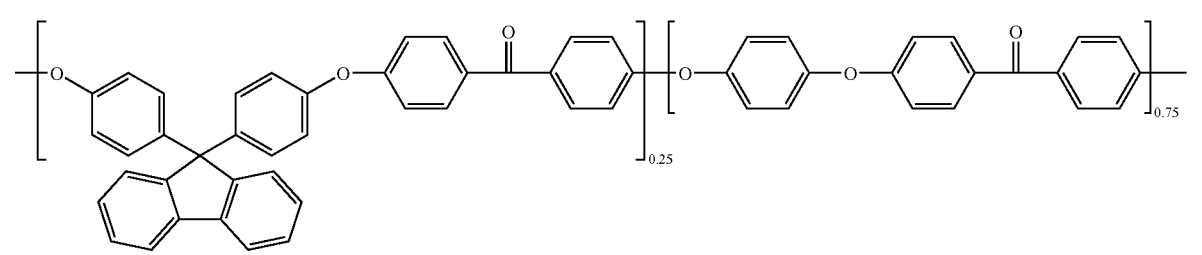

(e11)

The methanol permeation amount A was 29 $\mu mol \cdot min^{-1} \cdot cm^{-2}$ and 435 $nmol \cdot min^{-1} \cdot cm^{-1}$ and the proton conductivity A was 5.8 $S \cdot cm^{-2}$ and 87 $mS \cdot cm^{-1}$.

As compared with Nafion 117, the synthesize polymer had slightly high proton conductivity and was excellent in the fuel shutting property and the ratio of unfreezable water was high.

FL25PEEK defined by the above formula (e11) was synthesized in the same manner as Example 11, except that hydroquinone 11 g was changed to 17 g and 4,4'-(9H-fluorene-9-ylidene)bisphenol 35 g was changed to 18 g and further processes to sulfonation, membrane formation, production of the membrane electrode assembly, and production of the polymer electrolytic fuel cell-were carried but.

The obtained un-sulfonated polymer had a weight average molecular weight 50,000.

The obtained sulfonated FL25PEEK had a sulfonic acid group density of 2.5 mmol/g.

Rw1 was 69% by weight: Rw2 was 55% by weight: and Wnf was 0.63.

The obtained membrane had a membrane thickness of 180 μm and was a pale brown and transparent and flexible membrane.

The methanol permeation amount A was 35 μmol·min$^{-1}$·cm$^{-2}$ and 630 nmol·min$^{-1}$·cm$^{-1}$ and the proton conductivity A was 6.6 S·cm$^{-2}$ and 119 mS·cm$^{-1}$.

As compared with Nafion 117, the synthesize polymer had high proton conductivity and was excellent in the fuel shutting property and the ratio of unfreezable water was high.

As compared with MEA using Nafion 117 (Comparative Example 1), the MEA using the polymer electrolytic-membrane of this Example showed an output value (mW/cm$^2$) as high as 1.8 times and an energy capacity value (Wh) as high as 2.1 times and had excellent properties.

Example 16

Sulfonated FL25PEEK

A solution of the sulfonated FL25PEEK obtained in the same manner as Example 15 was produced using N,N-dimethylacetamide as a solvent and poured on and applied to a glass substrate and dried at 100° C. for 3 hours to remove the solvent and form a membrane.

The obtained membrane had a thickness of 180 μm and was a colorless and transparent and flexible membrane.

Rw1 was 61% by weight.

The methanol permeation amount A was 15 μmol·min$^{-1}$·cm$^{-2}$ and 270 nmol·min$^{-1}$·cm$^{-1}$: the proton conductivity A was 6.4 S·cm$^{-2}$ and 115 mS·cm$^{-1}$: and the proton conductivity B was 5.8 S·cm$^{-2}$ and 104 mS·cm$^{-1}$.

As compared with Nafion 117, the synthesize polymer was excellent in the proton conductivity and the fuel shutting property and had a very high unfreezable water ratio.

Comparative Example 4

Sulfonated FL100PEEK (e12)

FL100PEEK defined by the above formula (e12) was synthesized in the same manner as Example 11, except that hydroquinone 11 g was eliminated and 4,4'-(9H-fluoren-9-ylidene)bisphenol 35 g was changed to 70 g in the unsulfonated polymer synthesis and further process to sulfonation was carried out.

The obtained un-sulfonated polymer had a weight average molecular weight 150,000.

The obtained sulfonated FL100PEEK had a sulfonic acid group density of 2.5 mmol/g.

Although membrane formation was tried in the same manner as Example 11, the sulfonated FL100PEEK was not dissolved in N,N-dimethylacetamide and could not be formed into a membrane durable to the evaluation thereafter.

Example 17

Sulfonated CF50PEEK (e13)

CF50PEEK defined by the above formula (e13) was synthesized in the same manner as Example 11, except that 4,4'-(9H-fluoren-9-ylidene)bisphenol 35 g was changed to 4,4'-(9H-fluoren-9-ylidene)bis(2-methylphenol) 38 g and further processes to sulfonation, membrane formation, production of the membrane electrode assembly, and production of the polymer electrolytic fuel cell were carried out.

The obtained un-sulfonated polymer had a weight average molecular weight 150,000.

The obtained sulfonated CF50PEEK had a sulfonic acid group density of 2.2 mmol/g.

The obtained membrane had a membrane thickness, of 180 μm and was a pale brown and transparent and flexible membrane.

Rw1 was 97% by weight: Rw2 was 75% by weight: and Wnf was 0.37.

The methanol permeation amount A was 21 μmol·min$^{-1}$·cm$^{-2}$ and 378 nmol·min$^{-1}$·cm$^{-1}$ and the proton conductivity A was 6.2 S·cm$^{-2}$ and 112 mS·cm$^{-1}$.

As compared with Nafion 117, the synthesize polymer had slightly high proton conductivity and was excellent in the fuel shutting property and the ratio of unfreezable water was remarkably high.

As compared with MEA using Nafion 117 (Comparative Example 1), the MEA using the polymer electrolytic membrane of this Example showed an output value (mW/cm²) as high as 2.1 times and an energy capacity value (Wh) as high as 2.8 times and had excellent properties.

Example 18

Sulfonated CF50PEEK

A solution of the sulfonated CF50PEEK obtained in the same manner as Example 17 was produced using N,N-dimethylacetamide as a solvent and poured on and applied to a glass substrate and dried at 100° C. for 3 hours to remove the solvent and form a membrane.

The obtained membrane had a thickness of 220 μm and was a colorless and transparent and flexible membrane.

Rw1 was 73% by weight.

The methanol permeation amount A was 12 $\mu mol \cdot min^{-1} \cdot cm^{-2}$ and 264 $nmol \cdot min^{-1} \cdot cm^{-1}$: the proton conductivity A was 5.9 $S \cdot cm^{-2}$ and 131 $mS \cdot cm^{-1}$: and the proton conductivity B was 5.4 $S \cdot cm^{-2}$ and 119 $mS \cdot cm^{-1}$.

As compared with Nafion 117, the synthesize polymer was excellent in the proton conductivity and the fuel shutting property and had a very high unfreezable water ratio.

Example 19

Sulfonated TP50PEEK

The obtained membrane had a membrane thickness of 200 μm and was a pale brown and transparent and flexible membrane.

The methanol permeation amount A was 22 $\mu mol \cdot min^{-1} \cdot cm^{-2}$ and 440 $nmol \cdot min^{-1} \cdot cm^{-1}$ and the proton conductivity A was 6.0 $S \cdot cm^{-2}$ and 120 $mS \cdot cm^{-1}$.

As compared with Nafion 117, the synthesize polymer had high proton conductivity and was excellent in the fuel shutting property and the ratio of unfreezable water was remarkably high.

As compared with MEA using Nafion 117 (Comparative Example 1), the MEA using the polymer electrolytic membrane of this Example showed an output value (mW/cm²) as high as 1.9 times and an energy capacity value (Wh) as high as 2.5 times and had excellent properties.

Example 20

Sulfonated TP50PEEK

A solution of the sulfonated TP50PEEK obtained in the same manner as Example 19 was produced using N,N-dimethylacetamide as a solvent and poured on and applied to a glass substrate and dried at 100° C. for 3 hours to remove the solvent and form a membrane.

The obtained membrane had a thickness of 230 μm and was a colorless and transparent and flexible membrane.

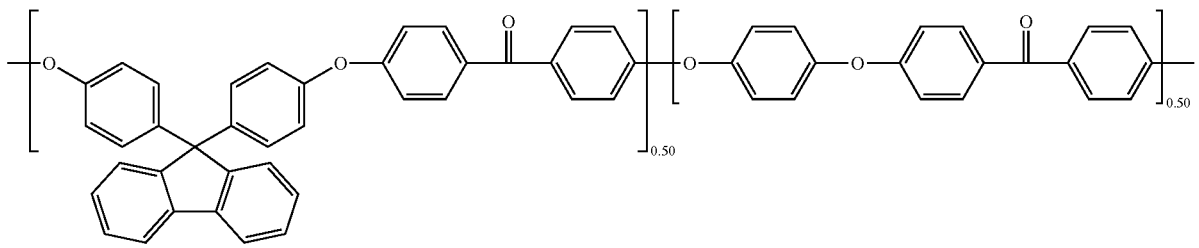

(e14)

TP50PEEK defined by the above formula (e14) was synthesized in the same manner as Example 11, except that 4,4'-(9H-fluoren-9-ylidene)bisphenol 35 g was changed to 4,4'-dihydroxytetraphenylmethane 35 g and further processes to sulfonation, membrane formation, production of the membrane electrode assembly, and production of the polymer electrolytic fuel cell were carried out.

The obtained un-sulfonated polymer had a weight average molecular weight 150,000.

The obtained sulfonated CF50PEEK had a sulfonic acid group density of 2.2 mmol/g.

Rw1 was 95% by weight: Rw2 was 74% by weight: and Wnf was 0.37.

Rw1 was 68% by weight.

The methanol permeation amount A was 15 $\mu mol \cdot min^{-1} \cdot cm^{-2}$ and 345 $nmol \cdot min^{-1} \cdot cm^{-1}$: the proton conductivity A was 6.6 $S \cdot cm^{-2}$ and 152 $mS \cdot cm^{-1}$: and the proton conductivity B was 6.0 $S \cdot cm^{-2}$ and 138 $mS \cdot cm^{-1}$.

As compared with Nafion 117, the synthesize polymer was excellent in the proton conductivity and the fuel shutting property and had a very high unfreezable water ratio.

Example 21

Sulfonated FL50R50PEEK

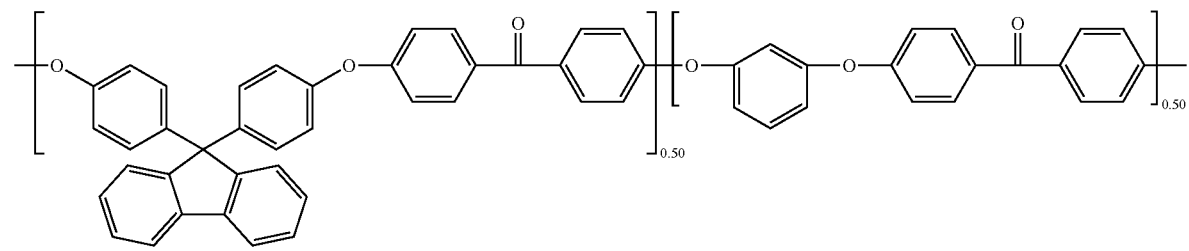

(e15)

FL50R50PEEK defined by the above formula (e15) was synthesized in the same manner as Example 11, except that hydroquinone 11 g was changed to resorcinol 11 g and further processes to sulfonation, membrane formation, production of the membrane electrode assembly, and production of the polymer electrolytic fuel cell were carried out.

The obtained un-sulfonated polymer had a weight average molecular weight 130,000.

The obtained sulfonated FL50R50PEEK had a sulfonic acid group density of 1.9 mmol/g.

Rw1 was 65% by weight: Rw2 was 55% by weight: and Wnf was 0.45.

The obtained membrane had a membrane thickness of 80 μm and was a pale brown and transparent and flexible membrane.

The methanol permeation amount A was 34 $\mu mol \cdot min^{-1} \cdot cm^{-2}$ and 272 $nmol \cdot min^{-1} \cdot cm^{-1}$ and the proton conductivity A was 5.1 $S \cdot cm^{-2}$ and 41 $mS \cdot cm^{-1}$.

As compared with Nafion 117, the synthesize polymer had almost same high proton conductivity and was excellent in the fuel shutting property and the ratio of unfreezable water was remarkably high.

As compared with MEA using Nafion 117 (Comparative Example 1), the MEA using the polymer electrolytic membrane of this Example showed an output value (mW/cm$^2$) as high as 1.5 times and an energy capacity value (Wh) as high as 1.8 times and had excellent properties.

Example 22

Sulfonated FL50R50PEEK

A solution of the sulfonated FL50R50PEEK obtained in the same manner as Example 21 was produced using N,N-dimethylacetamide as a solvent and poured on and applied to a glass substrate and dried at 100° C. for 3 hours to remove the solvent and form a membrane.

The obtained membrane had a thickness of 250 μm and was a colorless and transparent and flexible membrane.

Rw1 was 60% by weight.

The methanol permeation amount A was 40 $\mu mol \cdot min^{-1} \cdot cm^{-2}$ and 1000 $nmol \cdot min^{-1} \cdot cm^{-1}$: the proton conductivity A was 5.0 $S \cdot cm^{-2}$ and 124 $mS \cdot cm^{-1}$: and the proton conductivity B was 4.5 $S \cdot cm^{-2}$ and 113 $mS \cdot cm^{-1}$.

As compared with Nafion 117, the synthesize polymer was excellent in the fuel shutting property and had a very high unfreezable water ratio.

Example 23

Sulfonated FL50BPA50PEEK

FL50BPA50PEEK defined by the above formula (e16) was synthesized in the same manner as Example 11, except that hydroquinone 11 g was changed to 2,2-bis(4-hydroxyphenyl)propane 23 g.

The obtained un-sulfonated polymer had a weight average molecular weight 250,000.

Next, processes to sulfonation, membrane formation, production of the membrane electrode assembly, and production of the polymer electrolytic fuel cell were carried out in the same manner as Example 11, except that the sulfonation reaction time was changed from 5 minutes to 3 minutes.

The obtained sulfonated FL50BPA50PEEK had a sulfonic acid group density of 1.8 mmol/g.

The obtained membrane had a membrane thickness of 210 μm and was a pale brown and transparent and flexible membrane.

Rw1 was 62% by weight: Rw2 was 54% by weight: and Wnf was 0.48.

The methanol permeation amount A was 38 $\mu mol \cdot min^{-1} \cdot cm^{-2}$ and 798 $nmol \cdot min^{-1} \cdot cm^{-1}$ and the proton conductivity A was 5.5 $S \cdot cm^{-2}$ and 116 $mS \cdot cm^{-1}$.

As compared with Nafion 117, the synthesize polymer had a significant effect to suppress the fuel cross-over and the ratio of unfreezable water was remarkably high.

As compared with MEA using Nafion 117 (Comparative Example 1), the MEA using the polymer electrolytic membrane of this Example showed an output value (mW/cm$^2$) as high as 1.2 times and an energy capacity value (Wh) as high as 1.5 times and had excellent properties.

Example 24

Sulfonated FL50BPA50PEEK

A solution of the sulfonated FL50BPA50PEEK obtained in the same manner as Example 23 was produced using N,N-dimethylacetamide as a solvent and poured on and applied to a glass substrate and dried at 100° C. for 3 hours to remove the solvent and form a membrane.

The obtained membrane had a thickness of 210 μm and was a colorless and transparent and flexible membrane.

Rw1 was 61% by weight.

The methanol permeation amount A was 40 $\mu mol \cdot min^{-1} \cdot cm^{-2}$ and 840 $nmol \cdot min^{-1} \cdot cm^{-1}$: the proton conductivity A was 6.1 $S \cdot cm^{-2}$ and 127 $mS \cdot cm^{-1}$: and the proton conductivity B was 5.5 $S \cdot cm^{-2}$ and 116 $mS \cdot cm^{-1}$.

As compared with Nafion 117, the synthesize polymer was excellent in the fuel shutting property and had a very high unfreezable water ratio.

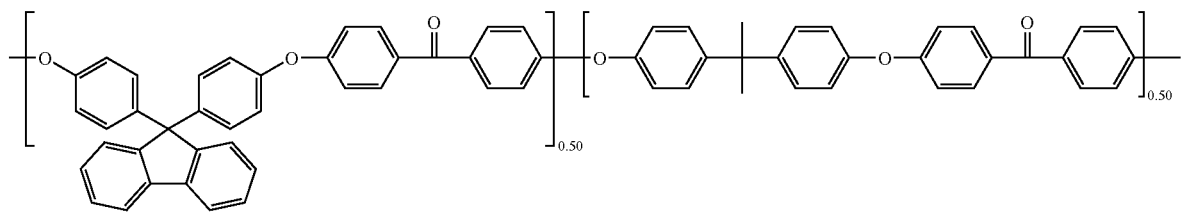

(e16)

Example 25

Sulfonated FL50BF50PEEK

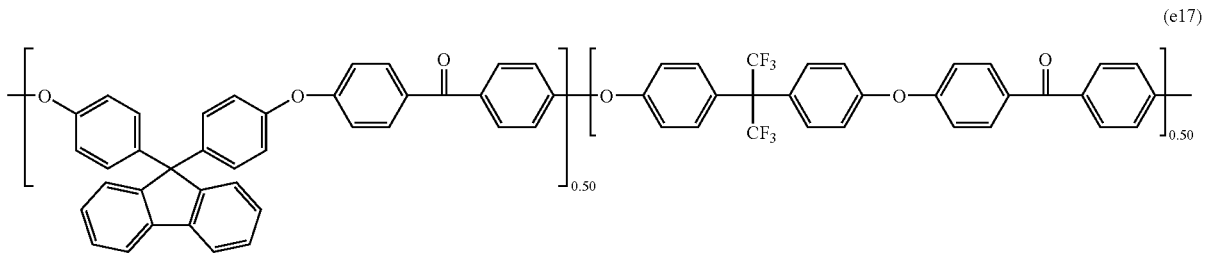

FL50BF50PEEK defined by the above formula (e17) was synthesized in the same manner as Example 11, except that hydroquinone 11 g was changed to 2,2-bis(4-hydroxyphenyl) 1,1,1,3,3,3-hexafluoropropane 34 g and further processes to sulfonation, membrane formation, production of the membrane electrode assembly, and production of the polymer electrolytic fuel cell were carried out.

The obtained un-sulfonated polymer had a weight average molecular weight 130,000.

The obtained sulfonated FL50BF50PEEK had a sulfonic acid group density of 2.2 mmol/g.

The obtained membrane had a membrane thickness of 180 μm and was a pale brown and transparent and flexible membrane.

Rw1 was 84% by weight: Rw2 was 68% by weight: and Wnf was 0.40.

The methanol permeation amount A was 19 μmol·min$^{-1}$·cm$^{-2}$ and 342 nmol·min$^{-1}$·cm$^{-1}$ and the proton conductivity A was 6.0 S·cm$^{-2}$ and 108 mS·cm$^{-1}$.

As compared with Nafion 117, the synthesize polymer had almost same high proton conductivity and was excellent in the fuel shutting property and the ratio of unfreezable water was remarkably high.

As compared with MEA using Nafion 117 (Comparative Example 1), the MEA using the polymer electrolytic membrane of this Example showed an output value (mW/cm$^2$) as high as 2.1 times and an energy capacity value (Wh) as high as 3.0 times and had excellent properties.

Example 26

Sulfonated FL50BF50PEEK

A solution of the sulfonated FL50BF50PEEK obtained in the same manner as Example 25 was produced using N,N-dimethylacetamide as a solvent and poured on and applied to a glass substrate and dried at 100° C. for 3 hours to remove the solvent and form a membrane.

The obtained membrane had a thickness of 230 μm and was a colorless and transparent and flexible membrane.

Rw1 was 65% by weight.

The methanol permeation amount A was 20 μmol·min$^{-1}$·cm$^{-2}$ and 460 nmol·min$^{-1}$·cm$^{-1}$: the proton conductivity A was 6.1 S·cm$^{-2}$ and 139 mS·cm$^{-1}$: and the proton conductivity B was 5.5 S·cm$^{-2}$ and 127 mS·cm$^{-1}$.

As compared with Nafion 117, the synthesize polymer was excellent in the proton conductivity and had a very high unfreezable water ratio.

Example 27

Sulfonated FL50PH50PEEK

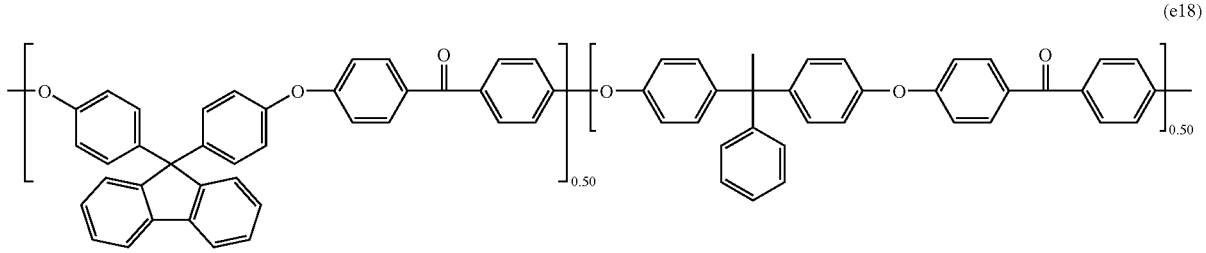

FL50PH50PEEK defined by the above formula (e18) was synthesized in the same manner as Example 11, except that hydroquinone 11 g was changed to 4,4'-(1-phenylethylidene) bisphenol 29 g and further processes to sulfonation, membrane formation, production of the membrane electrode assembly, and production of the polymer electrolytic fuel cell were carried out.

The obtained un-sulfonated polymer had a weight average molecular weight 130,000.

The obtained sulfonated FL50PH50PEEK had a sulfonic acid group density of 2.0 mmol/g.

The obtained membrane had a membrane thickness of 210 μm and was a pale brown and transparent and flexible membrane.

Rw1 was 80% by weight: Rw2 was 66% by weight: and Wnf was 0.40.

The methanol permeation amount A was 23 μmol·min$^{-1}$·cm$^{-2}$ and 483 nmol·min$^{-1}$·cm$^{-1}$ and the proton conductivity A was 5.5 S·cm$^{-2}$ and 116 mS·cm$^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value(mW/cm²) as high as 1.8 times and an energy capacity value (Wh) as high as 2.2 times and had excellent properties.

Example 28

Sulfonated FL50PH50PEEK

A solution of the sulfonated FL50PH50PEEK obtained in the same manner as Example 27 was produced using N,N-dimethylacetamide as a solvent and poured on and applied to a glass substrate and dried at 100° C. for 3 hours to remove the solvent and form a membrane.

The obtained membrane had a thickness of 240 μm and was a colorless and transparent and flexible membrane.

Rw1 was 66% by weight.

The methanol permeation amount A was 12 μmol·min$^{-1}$·cm$^{-2}$ and 288 nmol·min$^{-1}$·cm$^{-1}$: the proton conductivity A was 6.1 S·cm$^{-2}$ and 145 mS·cm$^{-1}$: and the proton conductivity B was 5.8 S·cm$^{-2}$ and 132 mS·cm$^{-1}$.

As compared with Nafion 117, the synthesize polymer was excellent in the proton conductivity and had a very high unfreezable water ratio.

Example 29

Sulfonated FL50PHQ50PEEK

Rw1 was 86% by weight: Rw2 was 66% by weight: and Wnf was 0.40.

The obtained membrane had a membrane thickness of 170 μm and was a pale brown and transparent and flexible membrane.

The methanol permeation amount A was 21 μmol·min$^{-1}$·cm$^{-2}$ and 357 nmol·min$^{-1}$·cm$^{-1}$ and the proton conductivity A was 6.0 S·cm$^{-2}$ and 102 mS·cm$^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value (mW/cm²) as high as 1.9 times and an energy capacity value (Wh) as high as 2.9 times and had excellent properties.

Example 30

Sulfonated FL50PHQ50PEEK

A solution of the sulfonated FL50PHQ50PEEK obtained in the same manner as Example 29 was produced using N,N-dimethylacetamide as a solvent and poured on and applied to a glass substrate and dried at 100° C. for 3 hours to remove the solvent and form a membrane.

The obtained membrane had a thickness of 200 μm and was a colorless and transparent and flexible membrane.

Rw1 was 67% by weight.

The methanol permeation amount A was 20 μmol·min$^{-1}$·cm$^{-2}$ and 400 nmol·min$^{-1}$·cm$^{-1}$: the proton con-

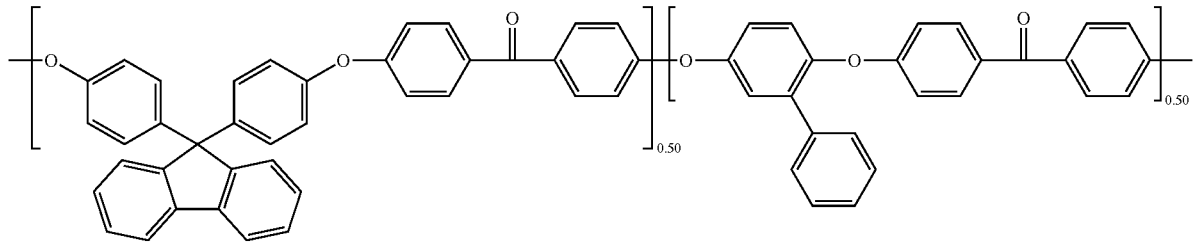

(e19)

FL50PHQ50PEEK defined by the above formula (e19) was synthesized in the same manner as Example 11, except that hydroquinone 11 g was changed to phenylhydroquinone 19 g and further processes to sulfonation, membrane formation, production of the membrane electrode assembly, and production of the polymer electrolytic fuel cell were carried out.

The obtained un-sulfonated polymer had a weight average molecular weight 120,000.

The obtained sulfonated FL50PHQ50PEEK had a sulfonic acid group density of 2.2 mmol/g.

ductivity A was 5.5 S·cm$^{-2}$ and 110 mS·cm$^{-1}$: and the proton conductivity B was 5.0 S·cm$^{-2}$ and 100 mS·cm$^{-1}$.

As compared with Nafion 117, the synthesize polymer was excellent in the proton conductivity and had a very high unfreezable water ratio.

Example 31

Sulfonated FL50PEES

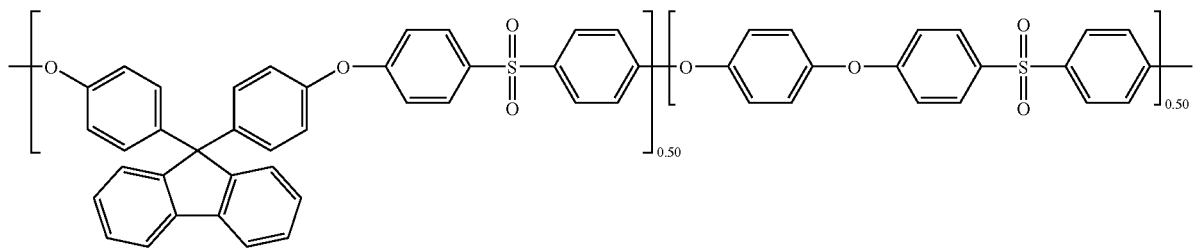

(e20)

FL50PEES defined by the above formula (e20) was synthesized in the same manner as Example 11, except that 4,4'-difluorobenzophenone 44 g was changed to bis(4-fluorophenyl)sulfone 51 g and further processes to sulfonation, membrane formation, production of the membrane electrode assembly, and production of the polymer electrolytic fuel cell were carried out.

The obtained un-sulfonated polymer had a weight average molecular weight 180,000.

The obtained sulfonated FL50PEES had a sulfonic acid group density of 1.7 mmol/g.

The obtained membrane had a membrane thickness of 120 μm and was a pale brown and transparent and flexible membrane.

Rw1 was 65% by weight: Rw2 was 52% by weight: and Wnf was 0.51.

The methanol permeation amount A was 35 $\mu mol \cdot min^{-1} \cdot cm^{-2}$ and 420 $nmol \cdot min^{-1} \cdot cm^{-1}$ and the proton conductivity A was 6.0 $S \cdot cm^{-2}$ and 72 $mS \cdot cm^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value (mW/cm$^2$) as high as 1.2 times and an energy capacity value (Wh) as high as 1.8 times and had excellent properties.

Example 32

Sulfonated FL50PEES

A solution of the sulfonated FL50PEES obtained in the same manner as Example 31 was produced using N,N-dimethylacetamide as a solvent and poured on and applied to a glass substrate and dried at 100° C. for 3 hours to remove the solvent and form a membrane.

The obtained membrane had a thickness of 250 μm and was a colorless and transparent and flexible membrane.

Rw1 was 60% by weight.

The methanol permeation amount A was 42 $\mu mol \cdot min^{-1} \cdot cm^{-2}$ and 1050 $nmol \cdot min^{-1} \cdot cm^{-1}$: the proton conductivity A was 5.5 $S \cdot cm^{-2}$ and 138 $mS \cdot cm^{-1}$: and the proton conductivity B was 5.0 $S \cdot cm^{-2}$ and 125 $mS \cdot cm^{-1}$.

As compared with Nafion 117, the synthesize polymer was excellent in the proton conductivity and had a very high unfreezable water ratio.

Example 33

Sulfonated FL50PEPO

FL50PEPO defined by the above formula (e21) was synthesized in the same manner as Example 11, except that 4,4'-difluorobenzophenone 44 g was changed to bis(4-fluorophenyl)phenylphosphine oxide 63 g and further processes to sulfonation, membrane formation, production of the membrane electrode assembly, and production of the polymer electrolytic fuel cell were carried out.

The obtained un-sulfonated polymer had a weight average molecular weight 70,000.

The obtained sulfonated FL50PEPO had a sulfonic acid group density of 2.2 mmol/g.

The obtained membrane had a membrane thickness of 170 μm and was a pale brown and transparent and flexible membrane.

Rw1 was 85% by weight: Rw2 was 65% by weight: and Wnf was 0.48.

The methanol permeation amount A was 21 $\mu mol \cdot min^{-1} \cdot cm^{-2}$ and 357 $nmol \cdot min^{-1} \cdot cm^{-1}$ and the proton conductivity A was 5.9 $S \cdot cm^{-2}$ and 100 $mS \cdot cm^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value(mW/cm$^2$) as high as 1.9 times and an energy capacity value (Wh) as high as 2.8 times and had excellent properties.

Example 34

Sulfonated FL50PEPO

A solution of the sulfonated FL50PEPO obtained in the same manner as Example 33 was produced using N,N-dimethylacetamide as a solvent and poured on and applied to a glass substrate and dried at 100° C. for 3 hours to remove the solvent and form a membrane.

The obtained membrane had a thickness of 210 μm and was a colorless and transparent and flexible membrane.

Rw1 was 61% by weight.

The methanol permeation amount A was 20 $\mu mol \cdot min^{-1} \cdot cm^{-2}$ and 420 $nmol \cdot min^{-1} \cdot cm^{-1}$: the proton conductivity A was 5.5 $S \cdot cm^{-2}$ and 116 $mS \cdot cm^{-1}$: and the proton conductivity B was 5.0 $S \cdot cm^{-2}$ and 105 $mS \cdot cm^{-1}$.

As compared with Nafion 117, the synthesize polymer was excellent in the proton conductivity and had a very high unfreezable water ratio.

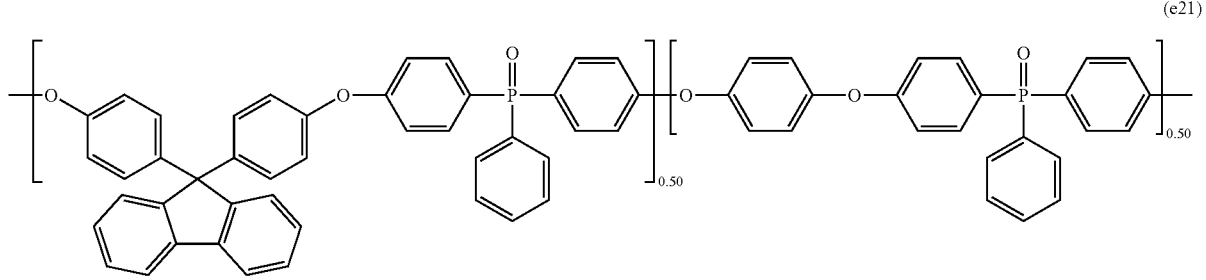

(e21)

Example 35

Sulfonated FL50CF50PEEK

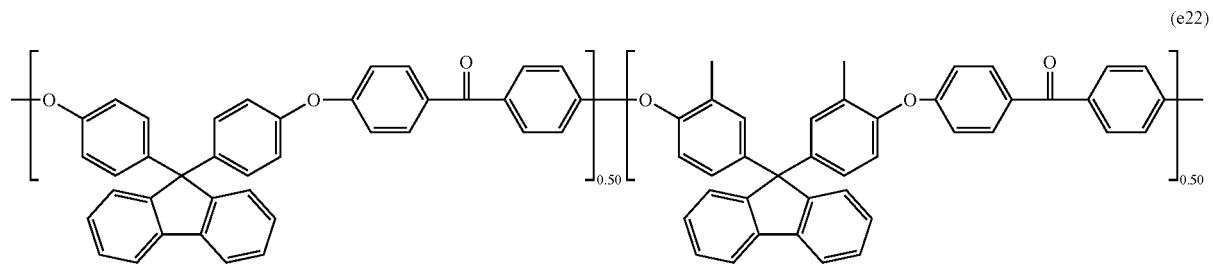

(e22)

FL50CF50PEEK defined by the above formula (e22) was synthesized in the same manner as Example 11, except that hydroquinone 11 g was changed to 4,4'-(9H-fluoren-9-ylidene)bis(2-methylphenol) 38 g and further processes to sulfonation, membrane formation, production of the membrane electrode assembly, and production of the polymer electrolytic fuel cell were carried out.

The obtained un-sulfonated polymer had a weight average molecular weight 150,000.

The obtained sulfonated FL50CF50PEEK had a sulfonic acid group density of 2.2 mmol/g.

The obtained membrane had a membrane thickness of 180 μm and was a pale brown and transparent and flexible membrane.

Rw1 was 84% by weight: Rw2 was 69% by weight: and Wnf was 0.45.

The methanol permeation amount A was 24 μmol·min$^{-1}$·cm$^{-2}$ and 432 nmol·min$^{-1}$·cm$^{-1}$ and the proton conductivity A was 6.2 S·cm$^{-2}$ and 112 mS·cm$^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value(mW/cm$^2$) as high as 2.0 times and an energy capacity value (Wh) as high as 2.5 times and had excellent properties.

Example 36

Radiation-Crosslinked Sulfonated FL50CF50PEEK

The sulfonated FL50CF50PEEK obtained in the same manner as Example 11 was radiated with beam of 300 kGy dose in nitrogen atmosphere by an area beam type electron beam radiation apparatus (Curetron EBC 300-60, manufactured by NHV Corp.)

The obtained membrane had a thickness of 190 μm and was a colorless and transparent and flexible membrane.

Rw1 was 86% by weight: Rw2 was 68% by-weight: and Wnf was 0.42.

The methanol permeation amount A was 17 μmol·min$^{-1}$·cm$^{-2}$ and 323 nmol·min$^{-1}$·cm$^{-1}$ and the proton conductivity A was 4.5 S·cm$^{-2}$ and 86 mS·cm$^{-1}$.

As compared with Nafion 117, the synthesize polymer was excellent in the fuel shutting property and had a very high unfreezable water ratio.

As compared with MEA using Nafion 117 (Comparative Example 1), the MEA using the polymer electrolytic membrane of this Example showed an output value (mW/cm$^2$) as high as 1.8 times and an energy capacity value (Wh) as high as 2.8 times and had excellent properties.

Comparative Example 5

FL50PEEK

The process to the membrane formation was carried out in the same manner as Example 11, except that sulfonation was omitted and the solvent in the membrane formation was changed to chloroform from N,N-dimethylacetamide.

Rw1 was 0% by weight.

The membrane thickness was 90 μm.

Methanol permeation amount A was 0 μmol·min$^{-1}$·cm$^{-2}$ and 0 nmol·min$^{-1}$·cm$^{-1}$: the proton conductivity A was 0 S·cm$^{-2}$ and 0 mS·cm$^{-1}$: and there was no proton conductivity.

Comparative Example 6

Sulfonated Polyether Ketone

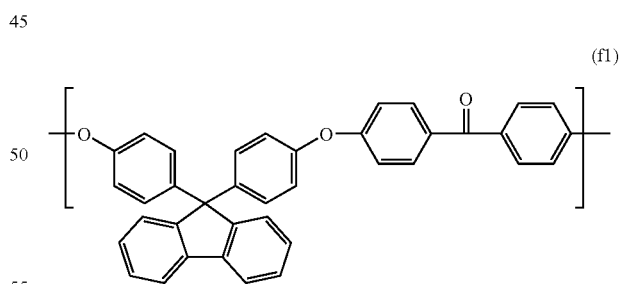

(f1)

A sulfone compound of polyether ketone defined by the formula (f1) was synthesized by the method described in Example 4 of Japanese Patent Application Laid-Open No. 2002-226575. The sulfonic acid density was 1.5 mmol/g and a weight average molecular weight 90,000. The obtained polymer was not dissolved in any solvent and difficult in membrane formation and could not stand to the evaluations of the proton conductivity, the methanol permeation amount, Rw1, Rw2, Wnf and MEA.

Comparative Example 7

Sulfonated Polyether Ketone

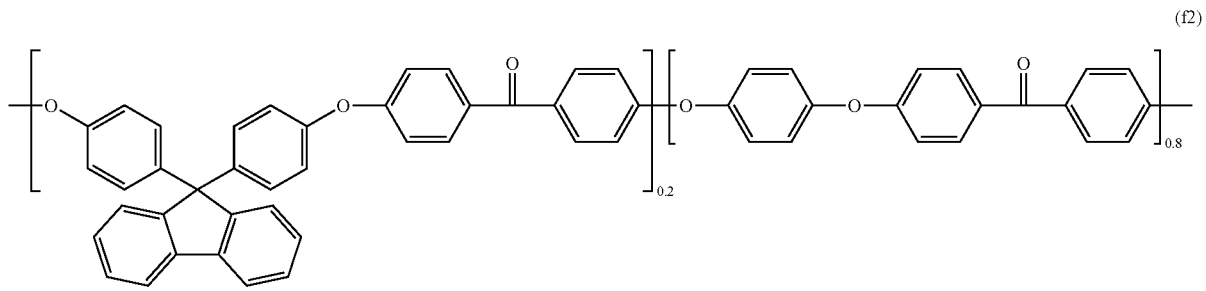

A sulfone compound of polyether ketone defined by the formula (f2) was synthesized by the method described in Examples 19 and 24 of Japanese Patent Application Laid-Open No. 2002-524631. The sulfonic acid density was 1.8 mmol/g and a weight average molecular weight 180,000.

A solution of the above-mentioned sulfonated polymer was produced using N-methylpyrrolidone as a solvent and poured on and applied to a glass substrate and vacuum-dried at 100° C. for 24 hours to remove the solvent.

The obtained membrane had a thickness of 101 μm and was a colorless and transparent and flexible membrane.

Rw1 was 51% by weight: Rw2 was 18% by weight: and Wnf was 0.43.

The methanol permeation amount A was 95 μmol·min$^{-1}$·cm$^{-2}$ and 960 nmol·min$^{-1}$·cm$^{-1}$ and the proton conductivity A was 4.8 S·cm$^{-2}$ and 48 mS·cm$^{-1}$.

As compared with Nafion 117, the synthesize polymer was inferior in the fuel shutting property and the unfreezable water ratio was approximately same as that of Nafion 117.

Since the polymer electrolytic membrane of this Comparative Example was significantly swollen with an aqueous 30% methanol solution, it was impossible to evaluate MEA.

Synthesis Example 1

(Synthesis of Disodium 3,3'-disulfonate-4,4'-difluorobenzophenone)

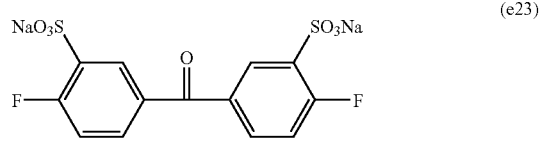

Reaction of 4,4'-Difluorobenzophenone 109.1 g was carried out at 100° C. for 10 h in fuming sulfuric acid (50% SO$_3$) 150 mL. Thereafter, the resulting reaction product was slowly loaded into a large quantity of water and neutralized with NaOH and thereafter, 200 g salt was added to precipitate the sythesized product. The obtained precipitate was separated by filtration and recrystallized in an aqueous ethanol solution to obtain disodium 3,3'-disulfonate-4,4'-difluorobenzophenone (yield amount 181 g, yield 86%).

Example 37

Sulfonated FL50BF50PEEK

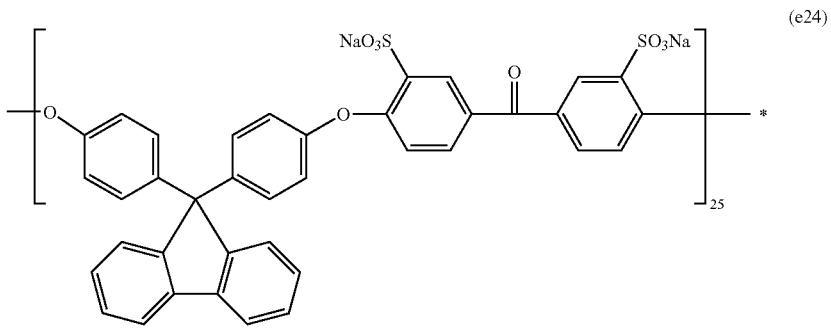

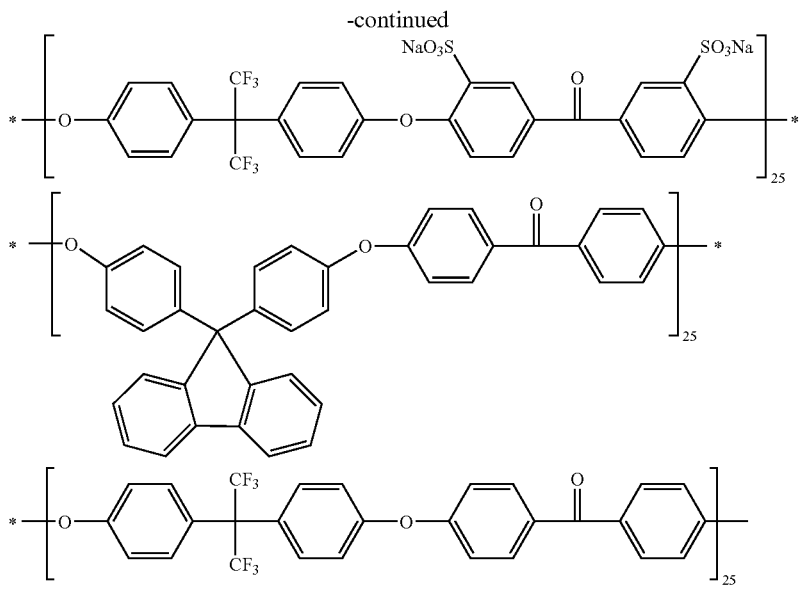

(In the formulas, * shows that the right end in the upper formula and the left end in the lower formula are bonded at the points)

Potassium carbonate 6.9 g, 2,2-bis(4-hydroxyphenyl)-1,1,1,3,3,3-hexafluoropropane 6.7 g, 4,4'-(9H-fluoren-9-ylidene)bisphenol 7.0 g, 4,4'-difluorobenzophenone 4.4 g, and disodium 3,3'-disulfonate-4,4'-difluorobenzophenone 8.4 g obtained in the above-described synthesis example 1 were used to carry out polymerization at 190° C. in N-methylpyrrolidone (NMP). Refining was carried out by re-precipitation with a large quantity of water to obtain sulfonated FL50BF50PEEK defined by the above-mentioned formula (e24).

The obtained sulfonated FL50BF50PEEK was found having a sulfonic acid density of 1.7 mmol/g and a weight average molecular weight 290,000 by elementary analysis.

A solution of the obtained polymer was produced using N,N-dimethylacetamide as a solvent and poured on and applied to a glass substrate and dried at 100° C. for 4 hours to remove the solvent. Further, the membrane was heated to 200 to 300° C. in nitrogen gas atmosphere for 1 hour and heated in conditions of heating at 300° C. for 10 minutes and then spontaneously cooled. The membrane was immersed in 1N hydrochloric acid for 3 days or longer to carry out proton replacement and then immersed in a significantly excess amount of pure water for 3 days or longer to wash it sufficiently.

Rw1 was 98% by weight: Rw2 was 80% by weight: and Wnf was 0.34.

The obtained membrane had a thickness 102 μm and was a pale brown and-transparent and flexible membrane.

The methanol permeation amount A was 12 μmol·min$^{-1}$·cm$^{-2}$ and 122 nmol·min$^{-1}$·cm$^{-1}$ and the proton conductivity A was 6.1 S·cm$^{-2}$ and 62 mS·cm$^{-1}$.

As compared with Nafion 117, the synthesize polymer had slightly high proton conductivity and was excellent in the fuel shutting property and the ratio of unfreezable water was high.

As compared with MEA using Nafion 117 (Comparative Example 1), the MEA using the polymer electrolytic membrane of this Example showed an output value (mW/cm$^2$) as high as 2.1 times and an energy capacity value (Wh) as high as 3.0 times and had excellent properties.

Example 38

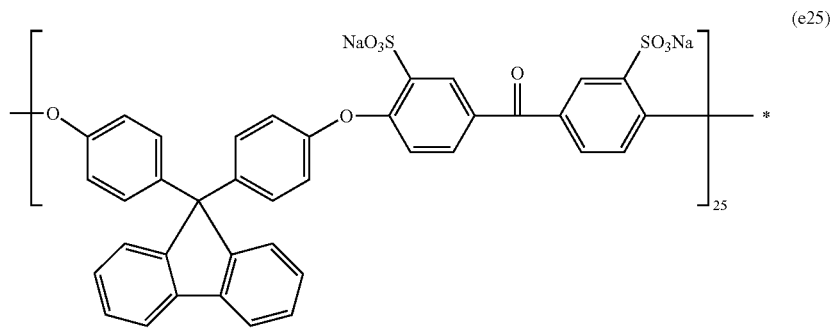

(e25)

-continued

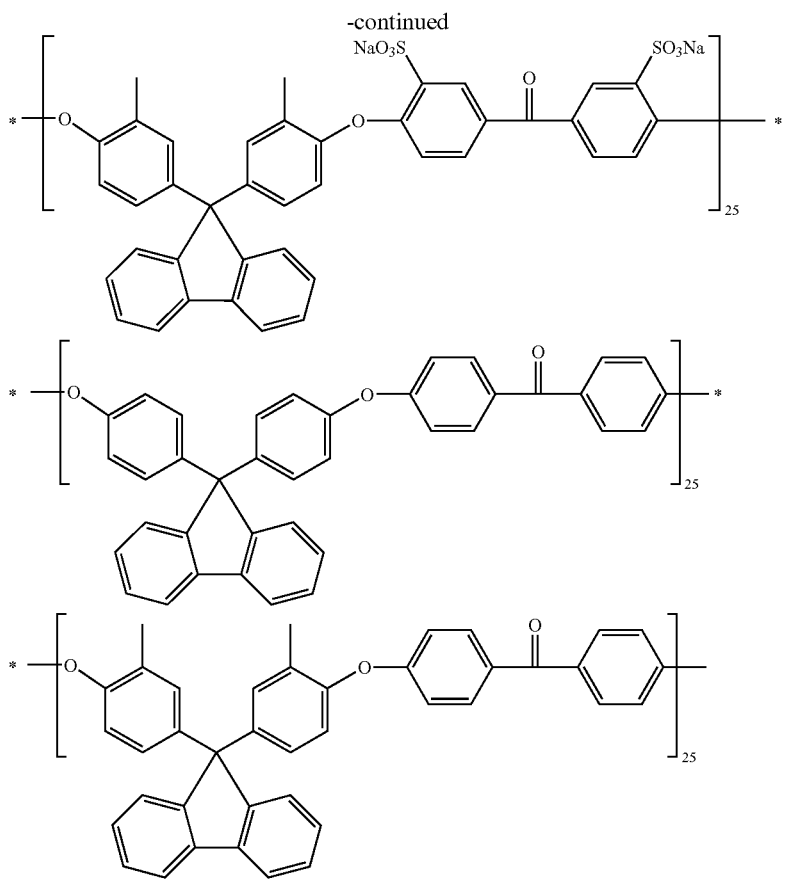

(In the formulas, * shows that the right end in the upper formula and the left end in the lower formula are bonded at the points)

A polymer defined by the above formula (e25) was synthesized in the same manner as Example 37, except that 2,2-bis (4-hydroxyphenyl)-1,1,1,3,3,3 -hexafluoropropane 6.7 g was changed to 4,4'-(9H-fluoren-9-ylidene)bis(2-methylphenol) 7.6 g and further processes to sulfonation, membrane formation, production of the membrane electrode assembly, and production of the polymer electrolytic fuel cell were carried out.

The obtained polymer had a sulfonic acid group density of 1.6 mmol/g and a weight average molecular weight 220,000.

The obtained membrane had a membrane thickness of 95 μm and was a pale brown and transparent and flexible membrane.

Rw1 was 83% by weight: Rw2 was 70% by weight: and Wnf was 0.45.

The methanol permeation amount A was 13 $\mu mol \cdot min^{-1} \cdot cm^{-2}$ and 124 $nmol \cdot min^{-1} \cdot cm^{-1}$ and the proton conductivity A was 5.9 $S \cdot cm^{-2}$ and 56 $mS \cdot cm^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value (mW/cm²) as high as 2.0 times and an energy capacity value (Wh) as high as 2.5 times and had excellent properties.

Example 39

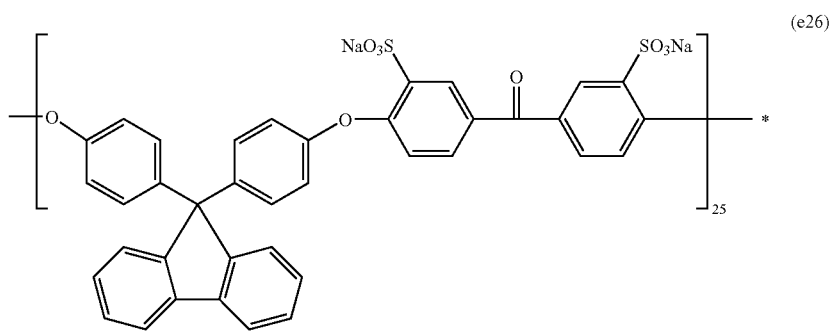

(e26)

-continued

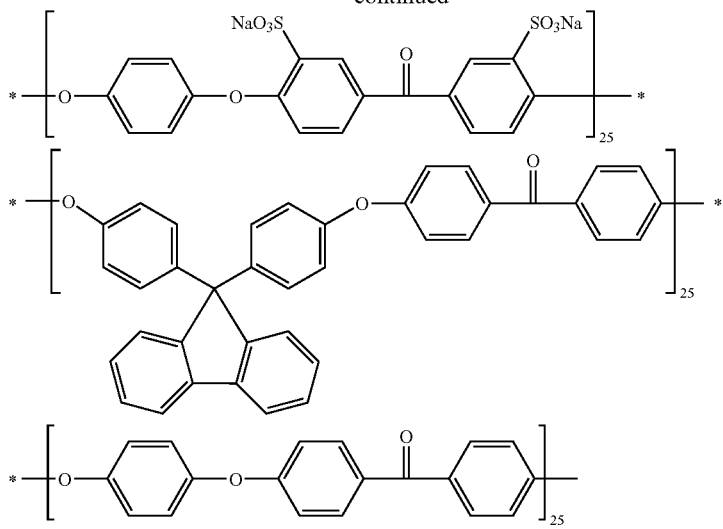

(In the formulas, * shows that the right end in the upper formula and the left end in the lower formula are bonded at the points)

A polymer defined by the above formula (e26) was synthesized in the same manner as Example 37, except that 2,2-bis(4-hydroxyphenyl)-1,1,1,3,3,3-hexafluoropropane 6.7 g was changed to hydroquinone 2.2 g and further processes to sulfonation, membrane formation, production of the membrane electrode assembly, and production of the polymer electrolytic fuel cell were carried out.

The obtained polymer had a sulfonic acid group density of 1.6 mmol/g and a weight average molecular weight 160,000.

The obtained membrane had a membrane thickness of 95 μm and was a pale brown and transparent and flexible membrane.

Rw1 was 86% by weight: Rw2 was 67% by weight: and Wnf was 0.43.

The methanol permeation amount A was 19 μmol·min$^{-1}$·cm$^{-2}$ and 181 nmol·min$^{-1}$·cm$^{-1}$ and the proton conductivity A was 5.9 S·cm$^{-2}$ and 56 mS·cm$^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value (mW/cm$^2$) as high as 2.0 times and an energy capacity value (Wh) as high as 3.0 times and had excellent properties.

Example 40

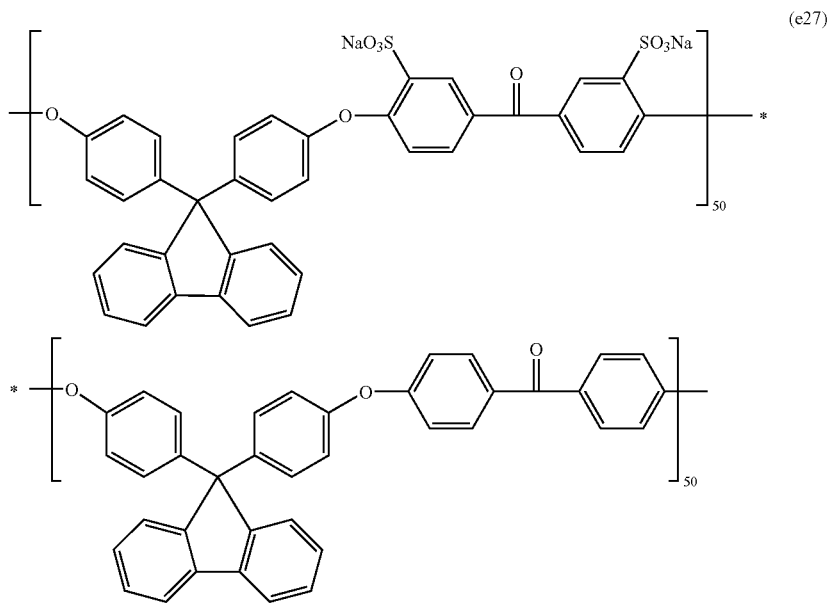

(e27)

(In the formulas, * shows that the right end in the upper formula and the left end in the lower formula are bonded at the points)

A polymer defined by the above formula (e27) was synthesized in the same manner as Example 37, except that 2,2-bis(4-hydroxyphenyl)-1,1,1,3,3,3-hexafluoropropane 6.7 g was not used and 4,4'-(9H-fluoren-9-ylidene)bisphenol 7.0 g was changed to 14.1 g and further processes to sulfonation, membrane formation, production of the membrane electrode assembly, and production of the polymer electrolytic fuel cell were carried out.

The obtained polymer had a sulfonic acid group density of 1.9 mmol/g and a weight average molecular weight 190,000.

The obtained membrane had a membrane thickness of 95 μm and was a pale brown and transparent and flexible membrane.

Rw1 was 98% by weight: Rw2 was 92% by weight: and Wnf was 0.29.

The methanol permeation amount A was 8 $\mu mol \cdot min^{-1} \cdot cm^{-2}$ and 76 $nmol \cdot min^{-1} \cdot cm^{-1}$ and the proton conductivity A was 5.7 $S \cdot cm^{-2}$ and 54 $mS \cdot cm^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value (mW/cm²) as high as 2.1 times and an energy capacity value (Wh) as high as 3.0 times and had excellent properties.

Example 41

A polymer defined by the above formula (e28) was synthesized in the same manner as Example 37, except that 2,2-bis(4-hydroxyphenyl)-1,1,1,3,3,3-hexafluoropropane 6.7 g was not used and 4,4'-(9H-fluoren-9-ylidene)bisphenol 7.0 g was changed to 4,4'-(9H-fluoren-9-ylidene)bis(2-phenyl)phenol 20.1 g and further processes to sulfonation, membrane formation, production of the membrane electrode assembly, and production of the polymer electrolytic fuel cell were carried out.

The obtained polymer had a sulfonic acid group density of 1.8 mmol/g and a weight average molecular weight 180,000.

The obtained membrane had a membrane thickness of 95 μm and was a pale brown and transparent and flexible membrane.

Rw1 was 91% by weight: Rw2 was 80% by weight: and Wnf was 0.55.

The methanol permeation amount A was 11 $\mu mol \cdot min^{-1} \cdot cm^{-2}$ and 105 $nmol \cdot min^{-1} \cdot cm^{-1}$ and the proton conductivity A was 5.8 $S \cdot cm^{-2}$ and 55 $mS \cdot cm^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value (mW/cm²) as high as 2.0 times and an energy capacity value (Wh) as high as 2.8 times and had excellent properties.

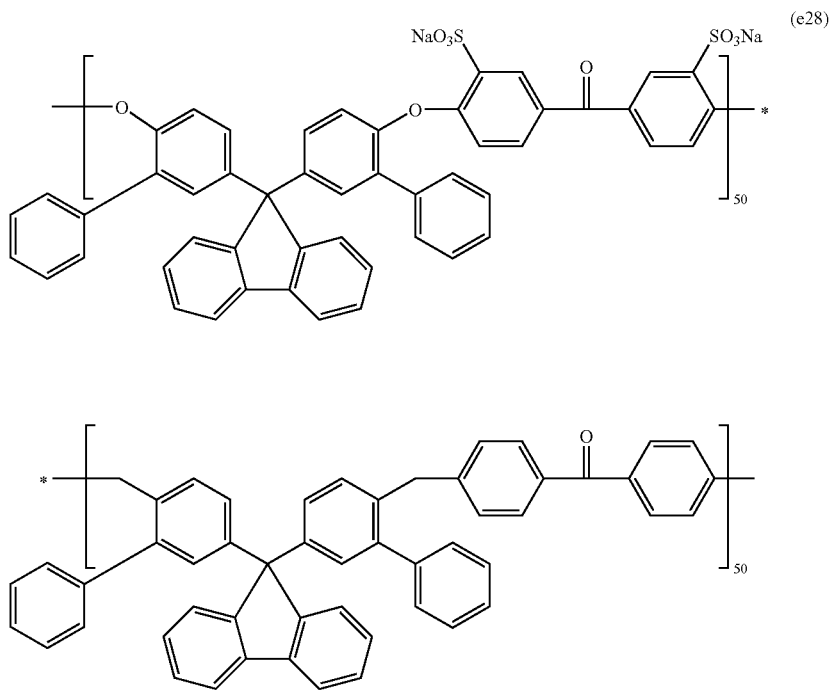

(In the formulas, * shows that the right end in the upper formula and the left end in the lower formula are bonded at the points)

Example 42

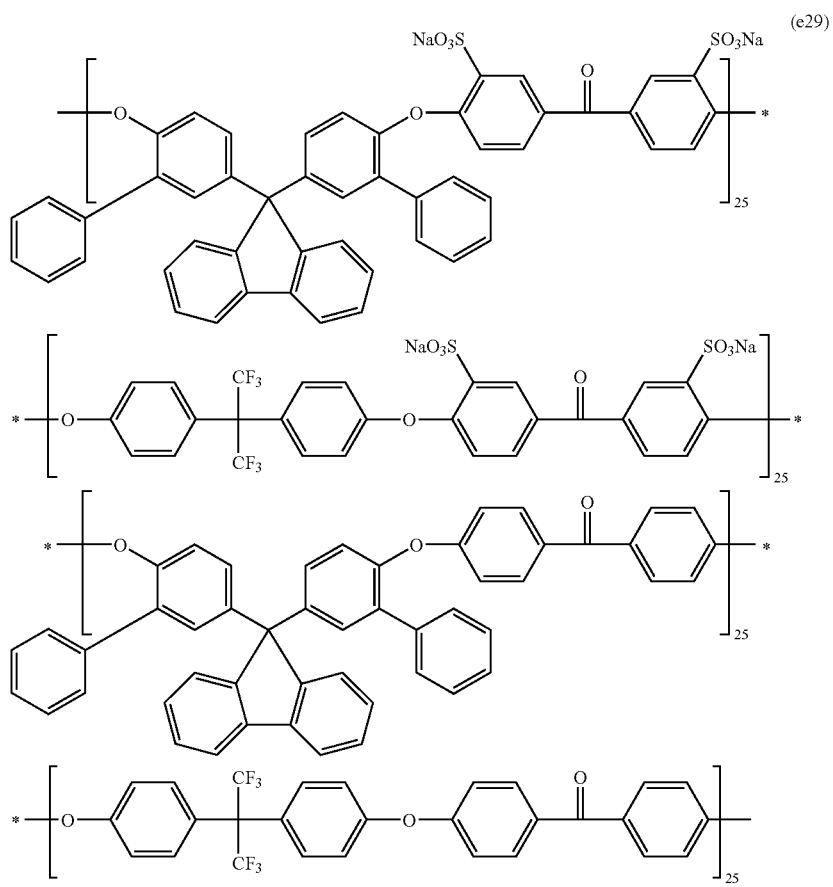

(In the formulas, * shows that the right end in the upper formula and the left end in the lower formula are bonded at the points)

A polymer defined by the above formula (e29) was synthesized in the same manner as Example 37, except that 4,4'-(9H-fluoren-9-ylidene)bisphenol 7.0 g was changed to 4,4'-(9H-fluoren-9-ylidene)bis(2-phenylphenol) 10.0 g and further processes to sulfonation, membrane formation, production of the membrane electrode assembly, and production of the polymer electrolytic fuel cell were carried out.

The obtained polymer had a sulfonic acid group density of 1.8 mmol/g and a weight average molecular weight 200,000.

The obtained membrane had a membrane thickness of 95 μm and was a pale brown and transparent and flexible membrane.

Rw1 was 88% by weight: Rw2 was 82% by weight: and Wnf was 0.50.

The methanol permeation amount A was 8 μmol·min$^{-1}$·cm$^{-2}$ and 76 nmol·min$^{-1}$·cm$^{-1}$ and the proton conductivity A was 5.7 S·cm$^{-2}$ and 54 mS·cm$^{-1}$.

As compared with Nafion 117, the synthesize polymer was excellent in the proton conductivity the fuel shutting property and the ratio of unfreezable water was remarkably high.

As compared with MEA using Nafion 117 (Comparative Example 1), the MEA using the polymer electrolytic membrane of this Example showed an output value(mW/cm$^2$) as high as 1.9 times and an energy capacity value (Wh) as high as 2.5 times and had excellent properties.

Example 43

Radiation-Crosslinked Sulfonated FL50PEEK

The sulfonated FL50PEEK obtained in the same manner as Example 12 was radiated with beam of 300 kGy dose in nitrogen atmosphere by an area beam type electron beam radiation apparatus (Curetron EBC 300-60, manufactured by NHV Corp.)

The obtained membrane had a thickness of 190 μm and was a colorless and transparent and flexible membrane.

Rw1 was 68% by weight.

The methanol permeation amount A was 10 μmol·min$^{-1}$·cm$^{-2}$ and 190 nmol·min$^{-1}$·cm$^{-1}$: the proton conductivity A was 5.0 S·cm$^{-2}$ and 94 mS·cm$^{-1}$: and the proton conductivity B was 4.5 S·cm$^{-2}$ and 86 mS·cm$^{-1}$.

As compared with Nafion 117, the synthesize polymer was excellent in the fuel shutting property and had a very high unfreezable water ratio.

Example 44

(Preparation of Monomer Composition)

Styrene 13 g, N-cyclohexylmaleimide 9 g, ethylene glycol dimethacrylate 6 g, which is a polyfunctional monomer), propylene carbonate 6 g, which is a cavity source, and 2,2'-azobisisobutyronitrile 0.05 g, which is a polymerization initiator, were loaded into a beaker and dissolved evenly by stirring with a magnetic stirrer to obtain a monomer composition solution.

(Cast Molding)

A mold was prepared by arranging two glass plates with a thickness of 5 mm and a size of 30 cm×30 cm at an interval of 0.2 mm adjusted by a gasket and the monomer composition solution was injected between the glass plates to the extent that the gasket was fully filled.

Next, after polymerization between the plates was carried out at 65° C. for 8 hours in a hot air dryer, the membrane-like polymer was drawn between the glass plates.

The membrane thickness was 190 μm.

(Polymer Electrolytic Membrane Formation)

To remove the cavity source and introduce an ionic group, the above-mentioned membrane-like polymer was immersed in 1,2-dichloroethane containing 5% by weight of chlorosulfonic acid for 30 minutes and then washed with methanol to wash out 1,2-dichloroethane, and further washed with water until the washing water became neutral to obtain a polymer electrolytic membrane.

According to observation of the distribution state of sulfonic acid group, the sulfonic acid group was found distributed in the entire cross-section of the polymer electrolytic member and thus it was confirmed that the ionic group was introduced into the voids.

(Production of Membrane Electrode Assembly)

Two carbon fiber cloth substrates were immersed in POLYFLON PTFE D-1 (R) (manufactured by Daikin Industries, Ltd.) and fired at 380° C. to carry out water-repellent treatment. Next, a dispersion containing acetylene black 4 g and POLYFLON PTFE D-1 4 g and water 10 g was applied to the carbon fiber cloth substrates subjected to water-repellent treatment and fired at 380° C. to obtain electrode substrates.

An anode catalyst coating solution containing Pt—Ru-bearing carbon and the Nafion solution was applied to one of the electrode substrates and dried to produce an anode.

Also, a cathode catalyst coating solution containing Pt-bearing carbon and the Nafion solution was applied to the other electrode substrate and dried to produce a cathode.

The polymer solid electrode membranes obtained in the above-mentioned manner were sandwiched between the anode and the cathode and heated and pressed to produce a membrane electrode assembly (MEA).

(Production of Polymer Electrolytic Fuel Cell)

The obtained MEA was set in a cell manufactured by Electrochem. Corp. and an aqueous 30% methanol solution and air were passed through the anode side and cathode side, respectively, to obtain a polymer electrolytic fuel cell.

As compared with MEA using Nafion 117 of Comparative Example 1, the MEA using the polymer electrolytic membrane of Example 44 showed an output value (mW/cm$^2$) as high as 1.9 times and an energy capacity value (Wh) as high as 3.0 times.

Examples 45 to 53

The monomer composition preparation, cast molding, polymer electrolytic membrane formation, production of the membrane electrode assembly, and production method of the polymer electrolytic fuel cell were carried out in the same manner as Example 44, except that the vinyl type monofunctional monomer, the polyfunctional monomer, the types and the amounts of the cavity source were changed as shown in Table 1.

The contents of the monomer composition loading of Examples 45 to 53 are shown in Table 1.

TABLE 1

| | Loaded composition (g) | | |
|---|---|---|---|
| | Monofunctional monomer | Polyfunctional monomer | Cavity source |
| Example 44 | St/CHM = 13/9 | 1G = 6 | PC = 6 |
| Example 45 | St/AN/CHM = 13/7/5 | DVB = 3 | PC = 6 |
| Example 46 | St/AN/CHM = 13/3/9 | DVB = 3 | PC = 6 |
| Example 47 | St/CHM = 12/9 | DVB = 4 | PC = 4 |
| Example 48 | St/CHM = 11/9 | 1G/BPEFA = 4/2 | NE = 3 |
| Example 49 | St/CHM = 11/9 | DVB/BPEFA = 2/1 | PC = 3 |
| Example 50 | St/17F/CHM = 10/8/6 | DVB = 4 | TMB = 3 |
| Example 51 | St/17F/CHM = 10/7/6 | 1G = 7 | PC = 3 |
| Example 52 | St/CHM = 14/8 | 1G = 6 | TOP = 6 |
| Example 53 | St/CHM = 15/10 | 1G = 3 | GBL = 6 |

Abbreviations in Table 1
St: styrene
CHM: N-cyclohexylmaleimide
AN: acrylonitrile
17F: 1H, 1H, 2H, 2H-heptadecafluorodecyl acrylate
DVB: divinylbenzene
1G: ethylene glycol dimethacrylate
BPEFL: bisphenoxyethanol fluorene diacrylate
PC: propylene carbonate
NE: nitroethane
TOP: trioctyl phosphate
TMB: trimethylbenzene
GBL: γ-butyrolactone The respective evaluation results of Examples 44 to 53 and Comparative Example are shown in Table 2 and Table 3.

TABLE 2

| | Judgment of cross linking | Rw1 (%) | Wnf | Porosity (%) | Average pore diameter (nm) | Total luminous transmittance (%) |
|---|---|---|---|---|---|---|
| Example 44 | o | 54.9 | 0.333 | 38.1 | <10 | 90 |
| Example 45 | o | 24.0 | 0.85 | 35.5 | <10 | 91 |
| Example 46 | o | 33.3 | 0.133 | 35.0 | <10 | 90 |
| Example 47 | o | 42.5 | 0.171 | 34.9 | <10 | 91 |
| Example 48 | o | 50.1 | 0.215 | 34.1 | <10 | 90 |
| Example 49 | o | 59.7 | 0.257 | 32.5 | <10 | 90 |
| Example 50 | o | 71.5 | 0.300 | 28.6 | <10 | 85 |
| Example 51 | o | 79.5 | 0.345 | 25.6 | <10 | 75 |
| Example 52 | o | 50.9 | 0.516 | 39.9 | <10 | 89 |
| Example 53 | o | 72.3 | 0.711 | 40.2 | <10 | 90 |
| Example 54 | x | 67.6 | 0.579 | 61 | 600 | Opaque |
| Comparative Example 1 | x | 49 | 0.18 | 15.9 | Impossible in pore measurement | 85 |

4 Judgment of crosslinked structure:
o: crosslinked structure
x: not crosslinked structure

TABLE 3

| Polymer electrolytic membrane used | Output ratio | Energy capacity ratio |
|---|---|---|
| Nafion 117 | 1 | 1 |
| Example 45 | 1.9 | 3.0 |

TABLE 3-continued

| Polymer electrolytic membrane used | Output ratio | Energy capacity ratio |
|---|---|---|
| Example 46 | 2.0 | 3.1 |
| Example 47 | 2.0 | 3.3 |
| Example 48 | 2.1 | 3.4 |
| Example 49 | 2.1 | 3.7 |
| Example 50 | 2.2 | 3.8 |
| Example 51 | 2.2 | 4.0 |
| Example 52 | 1.9 | 2.8 |
| Example 53 | 1.8 | 3.0 |

Further, as evaluation results of MEA and polymer electrolytic fuel cells of Examples 45 to 53, outputs and energy capacities expressed as the ratios to the standard values of Comparative Example 1 (using Nafion 117 membrane) are shown in Table 4.

TABLE 4

| Polymer electrolytic membrane used | Output ratio | Energy capacity ratio |
|---|---|---|
| Nafion 117 | 1 | 1 |
| Example 45 | 1.9 | 3.0 |
| Example 46 | 2.0 | 3.1 |
| Example 47 | 2.0 | 3.3 |
| Example 48 | 2.1 | 3.4 |
| Example 49 | 2.1 | 3.7 |
| Example 50 | 2.2 | 3.8 |
| Example 51 | 2.2 | 4.0 |
| Example 52 | 1.9 | 2.8 |
| Example 53 | 1.8 | 3.0 |

Being made clear from Table 3, both outputs (mW/cm$^2$) and energy capacities (Wh) of Examples 45 to 53 were found more excellent than the polymer electrolytic fuel cell using Nafion 117.

Comparative Example 8

A polymer electrolytic membrane was produced in the same manner as Example 44, except that no propylene carbonate, a cavity source, was used.

According to the result of observation of sulfonic acid group distribution, sulfonic acid group was distributed only in the surface layer of the membrane and no ionic group was introduced into the inside of the membrane.

Further, the proton conductivity A was 1.5 mS·cm$^{-1}$ and insufficient.

Comparative Example 9

The processes to cast molding were carried out in the same manner as-Example 44, except that no divinylbenzene was used.

However, although polymer electrolyte production was tried, the membrane was dissolved when it was immersed in 1,2-dichloroethane containing 5% by weight of chlorosulfonic acid to make it impossible to form a polymer electrolytic membrane.

Example 54

Sulfonated Polyphenylene Oxide

Polyphenylene oxide 100 g (trade name YPX-100L) manufactured by Mitsubishi Engineering-Plastics Corp. was dissolved in chloroform 1000 g at a room temperature in nitrogen atmosphere and then under stirring condition, chlorosulfonic acid (34 mL) was slowly dropwise added to the obtained solution and on completion of the titration, the mixture was continuously stirred further for 30 minutes at a room temperature. The precipitated polymer was separated by filtration, crushed by a mill, washed sufficiently with water, and vacuum-dried to obtain sulfonated polyphenylene oxide.

The sulfonated polyphenylene oxide was so dissolved in dimethylacetamide as to obtain a 15 wt. % solution. The polymer solution was applied to a glass plate by a knife coater, wet-solidified in water, and dried at 90° C. to obtain a polymer electrolytic membrane.

Example 55

(Preparation of Monomer Composition)

Styrene 10 g, divinylbenzene 5 g, phenylmaleimide 10 g, propylene carbonate 30 g, which is a cavity source, and 2,2'-azobisisobutyronitrile 0.1 g, which is a polymerization initiator, were loaded into a beaker and dissolved evenly by stirring with a magnetic stirrer to obtain a monomer composition solution.

(Cast Molding)

A mold was prepared by arranging two glass plates with a thickness of 5 mm and a size of 30 cm×30 cm at an interval of 0.2 mm adjusted by a gasket and the monomer composition solution was injected between the glass plates to the extent that the gasket was fully filled.

Next, after polymerization between the plates was carried out at 65° C. for 8 hours in a hot air dryer, the membrane-like polymer was drawn between the glass plates.

(Polymer Electrolytic Membrane Formation)

To remove the cavity source and introduce an ionic group, the above-mentioned membrane-like polymer was immersed in 1,2-dichloroethane containing 5% by weight of chlorosulfonic acid for 30 minutes and then washed with water until the washing water became neutral to obtain a polymer electrolytic membrane.

According to observation of the distribution state of sulfonic acid group, the sulfonic acid group was found distributed in the entire cross-section of the polymer electrolytic member and thus it was confirmed that the ionic group was introduced into the voids.

(Production of Membrane Electrode Assembly)

Two carbon fiber cloth substrates were subjected to water-repellent treatment with 20% tetrafluoroethylene solution and then a carbon black dispersion containing 20% tetrafluoroethylene was applied and fired to obtain electrode substrates.

An anode catalyst coating solution containing Pt—Ru-bearing carbon and the Nafion solution was applied to one of the electrode substrates and dried to produce an anode.

Also, a cathode catalyst coating solution containing Pt-bearing carbon and the Nafion solution was applied to the other electrode substrate and dried to produce a cathode.

The polymer solid electrode membranes obtained in the above-mentioned manner were sandwiched between the anode and the cathode and heated and pressed to produce a membrane electrode assembly (MEA).

(Production of Polymer Electrolytic Fuel Cell)

The obtained MEA was set in a cell manufactured by Electrochem. Corp. and an aqueous 30% methanol solution and air were passed through the anode side and cathode side, respectively, to obtain a polymer electrolytic fuel cell.

As compared with MEA using Nafion 117 of Comparative Example 1, the MEA using the polymer electrolytic membrane of Example 55 was found having excellent properties.

Example 56

A polymer electrolytic membrane was obtained in the same manner as Example 55, except that the propylene carbonate 6 g, a cavity source, was changed to 11 g in the monomer composition preparation.

Example 56

A polymer electrolytic membrane was obtained in the same manner as Example 55, except that the loading contents in the monomer composition preparation were changed to styrene 15 g, divinylbenzene 5 g, cyclohexylmaleimide 10 g, propylene carbonate 7.5 g, which is a cavity source, and 2,2'-azobisisobutyronitrile 0.2 g, which is a polymerization initiator.

The respective evaluation results of Examples 55 to 57 are shown in Table 5 and Table 6.

TABLE 5

| | Membrane thickness (μm) | Porosity (%) | Pore diameter (nm) | Proton conductivity B (S·cm$^{-2}$) | Proton conductivity B (mS·cm$^{-1}$) |
|---|---|---|---|---|---|
| Example 55 | 211 | 37.5 | <10 | 5.69 | 120.0 |
| Example 56 | 208 | 23.9 | <10 | 5.04 | 104.8 |
| Example 57 | 207 | 22.9 | <10 | 4.96 | 102.6 |

TABLE 6

| | Methanol permeation amount A ((mol(min−1(cm−2)) | Methanol permeation amount A (nmol(min−1(cm−1)) | Total luminous transmittance (%) |
|---|---|---|---|
| Example 55 | 37.9 | 800 | 90 |
| Example 56 | 32.7 | 680 | 90 |
| Example 57 | 31.4 | 650 | 90 |

The invention claimed is:

1. A polymer electrolytic material having a non-crosslinked structure and having an unfreezable water ratio Rw1 defined by the following expression (S1) in a range of 60 to 100% by weight in hydrated state:

$$Rw1 = [Wnf/(Wfc+Wnf)] \times 100 \quad (S1)$$

wherein Wnf represents the unfreezable water content per 1 g of the polymer electrolytic material in dry state and Wfc represents the low freezing point water content per 1 g of the polymer electrolytic material in dry state.

2. The polymer electrolytic material according to claim 1 having an unfreezable water ratio Rw2 defined by the following expression (S2) in a range of 50 to 100% by weight in hydrated state:

$$Rw2 = [Wnf/(Wnf+Wfc+Wf)] \times 100 \quad (S2)$$

wherein Wf represents the bulk water content per 1 g of the polymer electrolytic material in dry state.

3. The polymer electrolytic material according to claim 1 having the Wnf in a range of 0.05 to 2 in hydrated state.

4. The polymer electrolytic material according to claim 1 being in a membrane-like form.

5. The polymer electrolytic material according to claim 4 having methanol permeability per unit surface area for an aqueous solution of 30% by weight methanol 40 μmol·min$^{-1}$·cm$^{-2}$ or lower and proton conductivity per unit surface area 4 S·cm$^{-2}$ or higher.

6. The polymer electrolytic material according to claim 4 having methanol permeability per unit surface area and per unit thickness for an aqueous solution of 30% by weight methanol 1000 nmol·min$^{-1}$·cm$^{-1}$ or lower and proton conductivity per unit surface area and per unit thickness 10 mS·cm$^{-1}$ or higher.

7. The polymer electrolytic material according to claim 4 having total luminous transmittance 30% or higher in hydrated state.

8. The polymer electrolytic material according to claim 1 comprising an ionic group.

9. The polymer electrolytic material according to claim 8, wherein the ionic group is at least one type group selected from a sulfonic acid group, a sulfonimide group, a sulfuric acid group, a phosphonic acid group, a phosphoric acid group, and a carboxylic acid group.

10. The polymer electrolytic material according to claim 9, wherein the ionic group is a sulfonic acid group.

11. The polymer electrolytic material according to claim 10, wherein the density of the sulfonic acid group is 0.1 to 5.0 mmol/g.

12. The polymer electrolytic material according to claim 11, wherein the density of the sulfonic acid group is 0.5 to 3.5 mmol/g.

13. The polymer electrolytic material according to claim 12, wherein the density of the sulfonic acid group is 1.0 to 3.5 mmol/g.

14. The polymer electrolytic material according to claim 8 containing an aromatic phosphorus type polymer comprising a group defined by the following general formula (I) in the main chain:

wherein $R_1$ represents an organic group: X represents oxygen, sulfur, or selenium; and two or more of substituent groups comprising different $R_1$ and/or X may be contained in the polymer electrolytic material.

15. The polymer electrolytic material according to claim 14, wherein the aromatic phosphorus type polymer has a carbon-phosphorus-carbon bond in the main chain.

16. The polymer electrolytic material according to claim 15, wherein the aromatic phosphorus type polymer is an aromatic polyether phosphine oxide.

17. The polymer electrolytic material according to claim 15, wherein the aromatic phosphorus type polymer is an aromatic poly(ether phosphine oxide/ether ketone) copolymer.

18. The polymer electrolytic material according to claim 8 having voids and a porosity 5 to 80% by volume and an average pore diameter of the voids smaller than 50 nm.

19. The polymer electrolytic material according to claim 1 containing a divalent group having an aromatic ring.

20. The polymer electrolytic material according to claim 19 containing as the divalent group having an aromatic ring, a group defined by the following general formula (II):

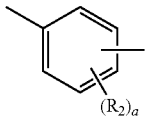

(II)

wherein $R_2$ represents a hydrogen atom, a halogen atom, a monovalent organic group, or an ionic group;
a represents an integer of 0 to 4; and
two or more groups having different $R_2$ and/or a may be contained in the polymer electrolytic material.

21. The polymer electrolytic material according to claim 19 containing as the divalent group having an aromatic ring, a group defined by the following general formula (III):

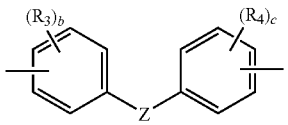

(III)

wherein $R_3$ and $R_4$ represent a hydrogen atom, a halogen atom, a monovalent organic group, or an ionic group; b and c represent an integer of 0 to 4;
Z represents direct bond, —O—, —S—, —Se—, —$CQ_1Q_2$-, an alkylene, an arylene, an alkylidene group, or a cycloalkylidene group;
$Q_1$ and $Q_2$ may be same or different and represent a hydrogen atom, a halogen atom, an alkyl, a halogen-substituted alkyl or aryl;
either one of $Q_1$ and $Q_2$ is at least one group selected from a hydrogen atom, a halogen group, an alkyl, and a halogen-substituted alkyl; and
two or more groups having different $R_3$, $R_4$ and/or b and c may be contained in the polymer electrolytic material.

22. The polymer electrolytic material according to claim 21, wherein Z in the general formula (III) represents direct bond or —$CQ_1Q_2$- wherein $Q_1$ and $Q_2$ may be same or different and represent a hydrogen atom, a halogen-substituted alkyl or aryl;
either one of $Q_1$ and $Q_2$ is at least one group selected from a hydrogen atom a halogen-substituted alkyl.

23. The polymer electrolytic material according to claim 19 containing as the divalent group having an aromatic ring, a group defined by the following general formula (IV):

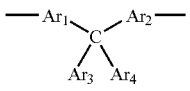

(IV)

wherein $Ar_1$ to $Ar_4$ represent an aryl or an arylene and may having a substituent group;
$Ar_1$ to $Ar_4$ may be bonded one or more optional positions; and
two or more groups having different $Ar_1$ to $Ar_4$ may be contained in the polymer electrolytic material.

24. The polymer electrolytic material according to claim 23 containing as the divalent group having an aromatic ring, a group defined by the following general formula (IV-2):

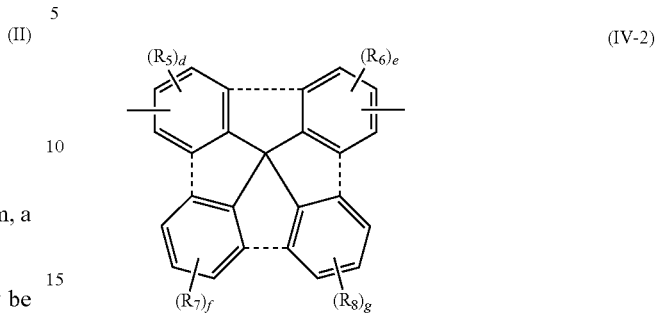

(IV-2)

wherein the dotted lines may be bonded or may not be bonded;
$R_5$ to $R_8$ represent a halogen atom, a monovalent organic group or an ionic group;
d and e represent an integer of 0 to 4;
f and g represents an integer of 0 to 5; and
two or more groups having different $R_5$ to $R_8$ and/or d to g may be contained in the polymer electrolytic material.

25. The polymer electrolytic material according to claim 24, wherein d to g in the general formula (IV-2) satisfy d+e+f+g≧2.

26. The polymer electrolytic material according to claim 23 containing as the divalent group having an aromatic ring, a group defined by the following general formula (IV-3):

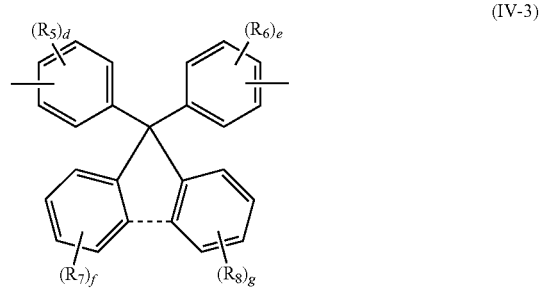

(IV-3)

wherein the dotted line may be bonded or may not be bonded;
$R_5$ to $R_8$ represent a halogen, a monovalent organic group or an ionic group;
d and e represent an integer of 0 to 4; f and g represents an integer of 0 to 5; and
two or more groups having different $R_5$ to $R_8$ and/or d to g may be contained in the polymer electrolytic material.

27. The polymer electrolytic material according to claim 26, wherein d to g in the general formula (IV-3) satisfy d+e+f+g≧2.

28. The polymer electrolytic material according to claim 27, wherein at least 2 of $R_5$ to $R_8$ in the general formula (IV-3) represent an alkyl.

29. The polymer electrolytic material according to claim 19, comprising a polymer defined by the following general formula (V):

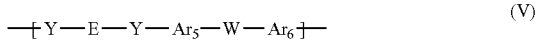

(V)

wherein E represents a divalent group having an aromatic ring and defined by general formula (II), (III), (IV), (IV-2) or (IV-3);

$Ar_5$ to $Ar_6$ represent an (un)substituted arylene;

W represents a divalent electron attractive group;

Y represents oxygen, sulfur, or selenium;

E, $Ar_5$, $Ar_6$, W and/or Y may represent two or more groups, respectively.

30. The polymer electrolytic material according to claim 29, wherein W in the general formula (V) represents at least one group selected from —CO—, —$SO_2$—, —P($R_1$)O— wherein $R_1$ represents an optional organic group.

31. The polymer electrolytic material according to claim 29, wherein W in the general formula (V) represents —CO— and Y represents oxygen.

32. The polymer electrolytic material according to claim 29, wherein —$Ar_5$—W—$Ar_6$— in the general formula (V) includes a group unit defined by the following general formula (VI)

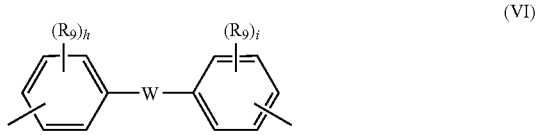

(VI)

wherein W represents a divalent electron attractive group;

$R_9$ represents at least one kind ionic group selected from sulfonic acid group, a sulfonimide group, a sulfuric acid group, a phosphonic acid group, a phosphoric acid group, and a carboxylic acid group; and h and i represents an integer of 1 to 4.

33. The polymer electrolytic material according to claim 32, wherein W in the general formula (VI) represents —CO—.

34. The polymer electrolytic material according to claim 32, wherein a group defined by the general formula (IV-3) is contained as the group represented by E in the general formula (V).

35. A polymer electrolytic member using the polymer electrolytic material according to claim 1.

36. A membrane electrode assembly using the polymer electrolytic material according to claim 1.

37. A polymer electrolytic fuel cell using the polymer electrolytic material according to claim 1.

38. The polymer electrolytic fuel cell according to claim 37, wherein the fuel cell is a direct type fuel cell using at least one mixture selected from mixtures of an organic compound having 1 to 6 carbon atoms and water as fuel.

39. The polymer electrolytic fuel cell according to claim 37, wherein the content of the organic compound having 1 to 6 carbon atoms in the fuel to be supplied to the membrane electrode assembly is 20 to 70% by weight.

\* \* \* \* \*

UNITED STATES PATENT AND TRADEMARK OFFICE
CERTIFICATE OF CORRECTION

PATENT NO. : 7,713,449 B2
APPLICATION NO. : 10/548110
DATED : May 11, 2010
INVENTOR(S) : Shinya Adachi et al.

It is certified that error appears in the above-identified patent and that said Letters Patent is hereby corrected as shown below:

On the title page:

Under (57), Abstract, please replace "Rw1=[Wnf/Wfc+Wnf)]×100" with --Rw1=[Wnf/(Wfc+Wnf)]×100--.

In Claim 23, column 97, line 64, please add --to-- between the words "bonded" and "one".

Signed and Sealed this

Seventh Day of September, 2010

David J. Kappos
*Director of the United States Patent and Trademark Office*